United States Patent [19]

Danielson et al.

[11] Patent Number: 4,912,309
[45] Date of Patent: Mar. 27, 1990

[54] PROCESSING MEANS AND TERMINAL INCORPORATING SAME, PARTICULARLY FOR POINT OF SALE SYSTEMS

[75] Inventors: Arvin D. Danielson, Solon; Lyndon L. Dunbar; Kevin Fischer, both of Cedar Rapids; Edward R. Miller, Cedar Rapids; Thomas W. Pepper, Jr., Cedar Rapids, all of Iowa

[73] Assignee: Norand Corporation, Cedar Rapids, Iowa

[21] Appl. No.: 282,443

[22] Filed: Dec. 9, 1988

Related U.S. Application Data

[63] Continuation of Ser. No. 61,341, Jun. 30, 1987.

[51] Int. Cl.⁴ .............................................. G06K 5/00
[52] U.S. Cl. ....................................... 235/380; 902/22; 235/375
[58] Field of Search ................ 235/375, 380; 364/401; 902/22

[56] References Cited

U.S. PATENT DOCUMENTS 4,713,811 12/1987 Frey ....................................... 902/22

Primary Examiner—Harold I. Pitts
Attorney, Agent, or Firm—Neuman, Williams, Anderson & Olson

[57] ABSTRACT

A point of sale system as illustrated comprised of a terminal with input or output devices including a manual data input, a coded data input (e.g., bar code scanner and/or smart card reader), an on-line display, and a hard copy output. A primary processing module has ten expansion connectors such that the primary module can become any level of processor from powerful peripheral controller to a master processor with a large nonvolatile database, such flexibility giving a point of sale terminal configuration advantages such as the following: (1) reduced cost in volume production because one common computing core is used to control different functions; (2) improved system redundancy since the primary processor unit can control localized peripherals at the bus level independently of a point of sale system network; and (3) improved system performance by (a) reducing the amount of peripheral network communication traffic, and (b) direct access to database information in small to medium size point of sale systems.

5 Claims, 53 Drawing Sheets

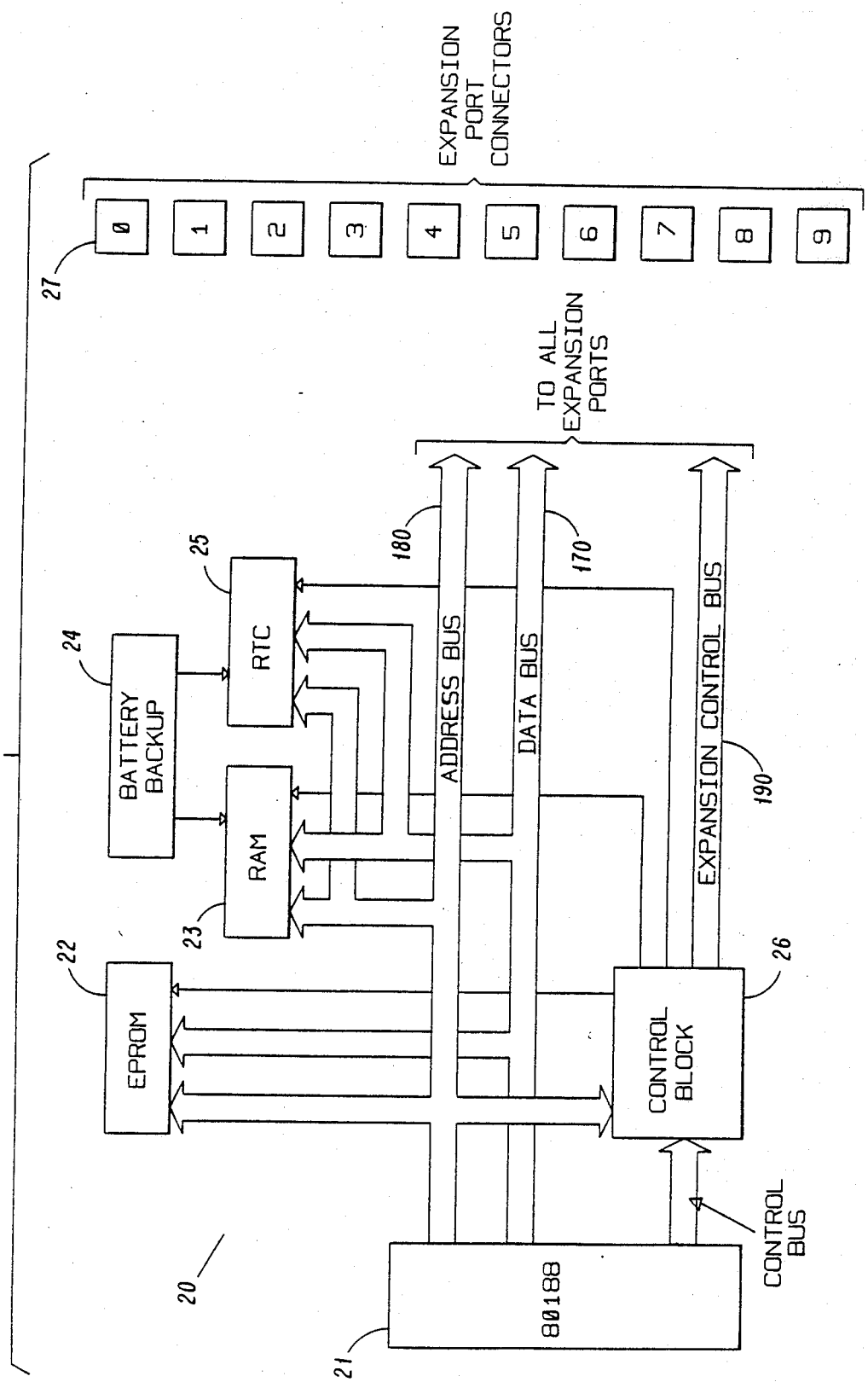

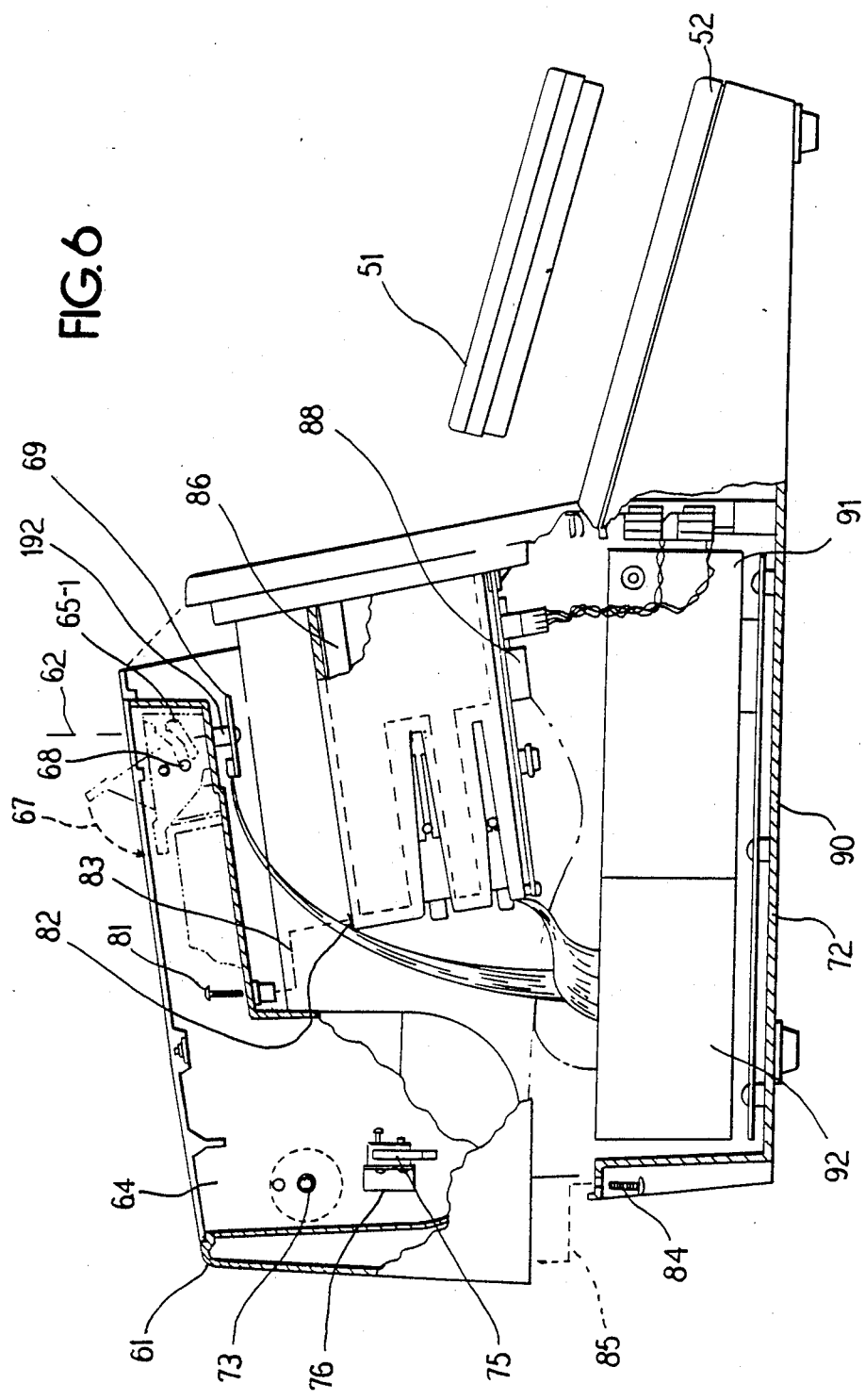

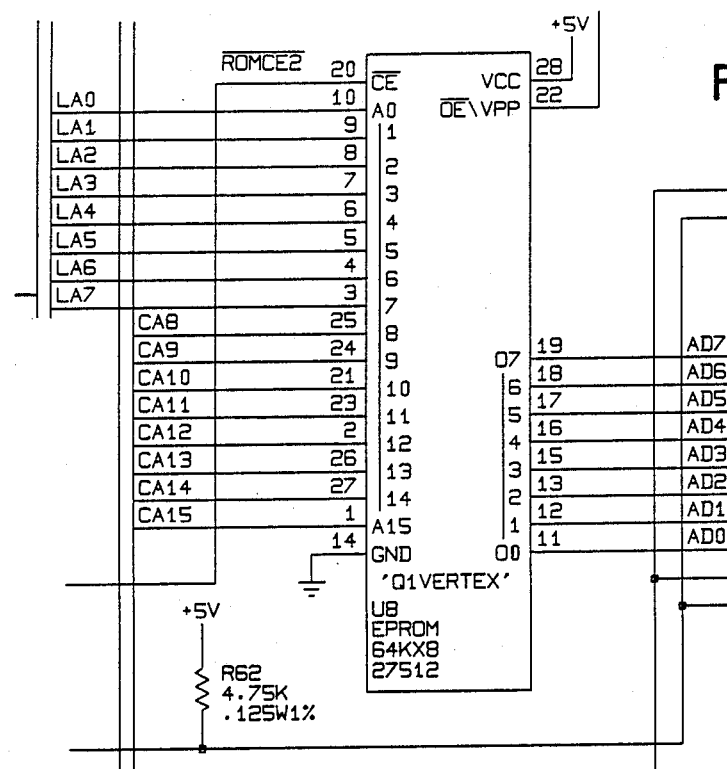
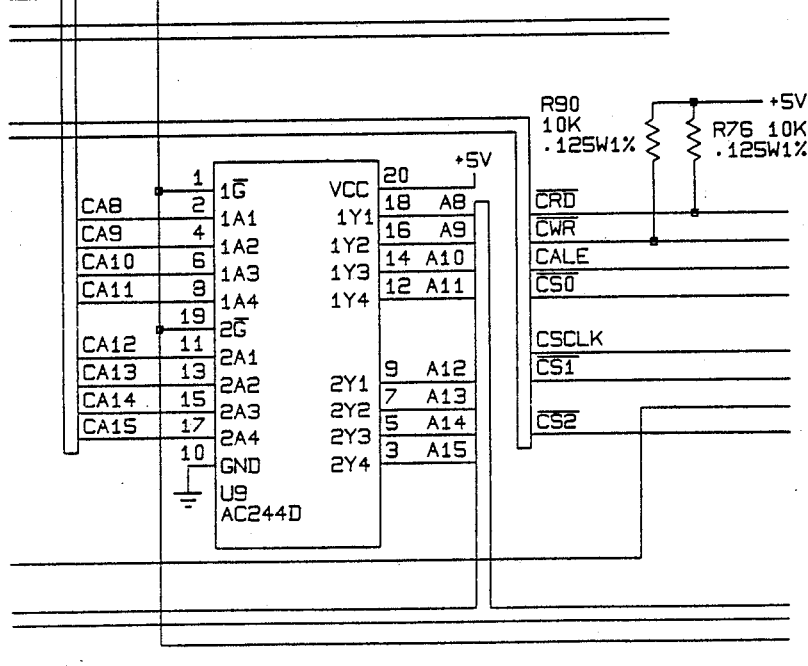
FIG 11H

FIG 14A MEMORY SPACE

FIG 14B I/O SPACE — EACH PSEL IS STRICTLY I/O MAPPED AND HAS A 4K SPACE

| STARTING ADDRESS (BASE ADDRESS) | MEMORY BLOCK SIZE | UMCS VALUE (ASSUMING R0=R1=R2=0) |
|---|---|---|
| FFC00 | 1K | FFF8H |
| FF800 | 2K | FFB8H |
| FF000 | 4K | FF38H |
| FE000 | 8K | FE38H |
| FC000 | 16K | FC38H |
| F8000 | 32K | F838H |
| F0000 | 64K | F038H |
| E0000 | 128K | E038H |
| C0000 | 256K | C038H |

| UPPER ADDRESS | MEMORY BLOCK SIZE | LMCS VALUE (ASSUMING R0=R1=R2=0) |
|---|---|---|
| 003FFH | 1K | 0038H |
| 007FFH | 2K | 0078H |
| 00FFFH | 4K | 00F8H |
| 01FFFH | 8K | 01F8H |
| 03FFFH | 16K | 03F8H |
| 07FFFH | 32K | 07F8H |
| 0FFFFH | 64K | 0FF8H |
| 1FFFFH | 128K | 1FF8H |
| 3FFFFH | 256K | 3FF8H |

| BUS CYCLE STATUS INFORMATION ||||
|---|---|---|---|
| BS2 | BS1 | BS0 | BUS CYCLE INITIATED |
| 0 | 0 | 0 | INTERRUPT ACKNOWLEDGE |
| 0 | 0 | 1 | REQD I/O |
| 0 | 1 | 0 | WRITE I/O |
| 0 | 1 | 1 | HALT |
| 1 | 0 | 0 | INSTRUCTION FETCH |
| 1 | 0 | 1 | READ DATA FROM MEMORY |
| 1 | 1 | 0 | WRITE DATA TO MEMORY |
| 1 | 1 | 1 | PASSIVE (NO BUS CYCLE) |

THE STATUS PINS FLOAT DURING 'HOLD'.
$\overline{BS2}$ MAY BE USED AS A LOGICAL M/$\overline{IO}$ INDICATOR, AND $\overline{S1}$ AS A DT/$\overline{R}$ INDICATOR.
THE STATUS LINES ARE DRIVEN HIGH FOR ONE CLOCK DURING RESET, AND THEN FLOATED UNTIL A BUS CYCLE BEGINS.

FIG 15

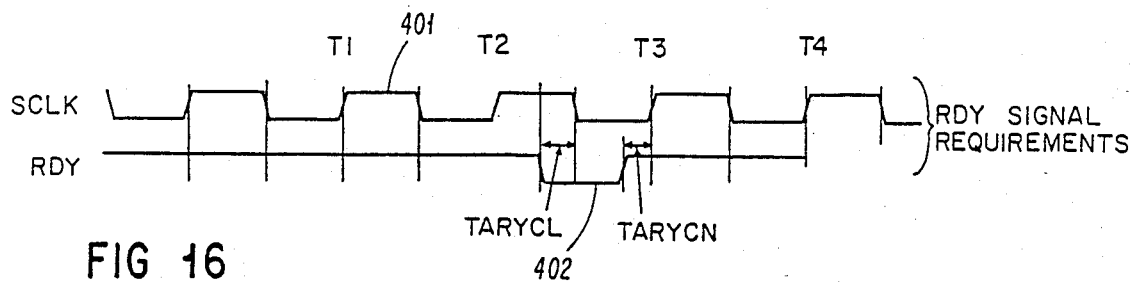

FIG 16

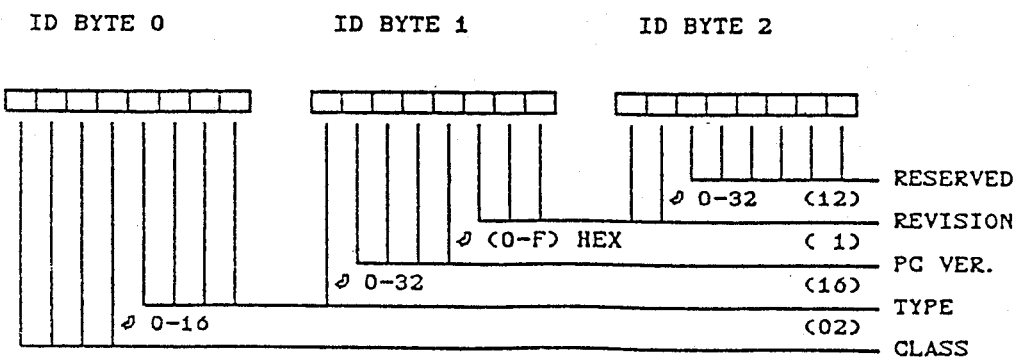

FIG 17

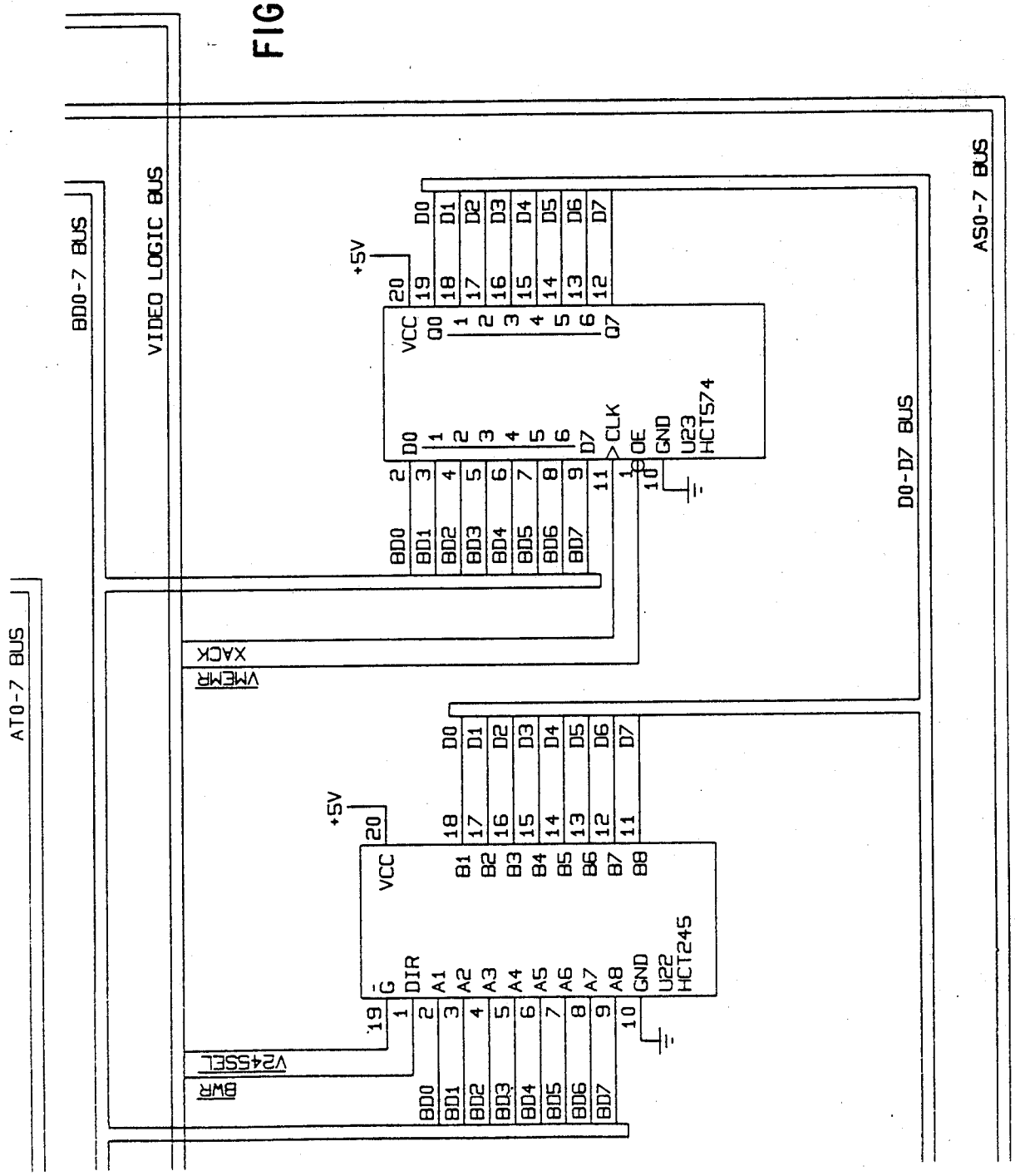

FIG 20

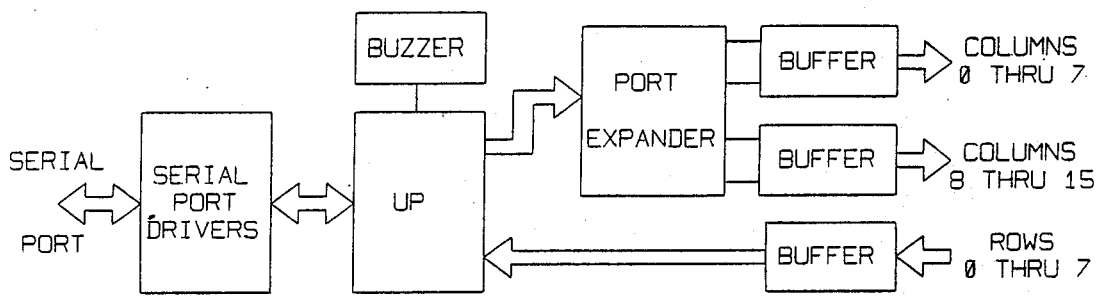

FIG 21

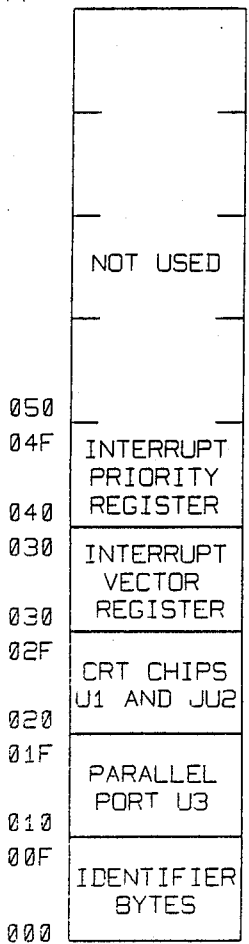

| Address | Block | Description |
|---|---|---|
| 04F–040 | INTERRUPT PRIORITY REGISTER | THIS REGISTER SETS UP THE INTERRUPT PRIORITY AND THE DMA CHANNEL WHICH THIS CARD WILL USE. SEE TABLE 1. |
| 030–030 | INTERRUPT VECTOR REGISTER | THIS REGISTER IS LOADED WITH THE INTERRUPT VECTOR THAT WILL BE PRESENTED TO THE CPU WHEN AN INTERRUPT REQUEST IS GRANTED. |
| 02F–020 | CRT CHIPS U1 AND JU2 | NOTE: FE2200 REGISTERS ARE OVERLAPED WITH 6845 SO ACCESS FE2200 AT 28 HEX (A WRITE) AND 2A HEX (READ). THEN ACCESS 6845 WHEN A3=0 AT ANY OTHER ADDRESS WHERE A0=1 FOR DATA REGISTER. |
| 01F–010 | PARALLEL PORT U3 | |
| 00F–000 | IDENTIFIER BYTES | ONLY THREE BYTES ARE USED. |

PSEL = 0

4,912,309

PROCESSING MEANS AND TERMINAL INCORPORATING SAME, PARTICULARLY FOR POINT OF SALE SYSTEMS

This is a continuation of application Ser. No. 061,341, filed June 10, 1987, the text of which is hereby incorporated by reference.

SUMMARY OF THE INVENTION

This invention relates to processing circuitry and to a terminal incorporating such circuitry and particularly adaptable to point of sale systems.

According to the present invention, a primary processing unit is provided which is adaptable to a basic point of sale terminal, but is also flexible to the point where multiple such primary processing units can be configured together to form a sophisticated and powerful point of sale system. In a preferred exemplary implementation, the terminal configuration derives its flexibility from two primary factors:

(1) ten peripheral expansion ports which can be loaded with various peripheral devices or memory; and (2) a primary processing unit which can utilize such expansion ports to become any level of processor necessary from powerful peripheral controller to a master processor with a large non-volatile database.

This flexibility gives the terminal configuration several advantages:

(1) reduced cost in volume production because one common computing core is used to control different functions;

(2) improved system redundancy since the primary processor unit can control localized peripherals at the bus level independently of a point of sale system network; and (3) improved system performance by (a) reducing the amount of peripheral network communication traffic, and (b) direct access to database information in small to medium size systems.

A feature of the preferred terminal configuration resides in its compact and efficient layout particularly adapting it to use in point of sale systems.

A further feature relates to the ease and flexibility of expansion with programmable chip select logic and with self-identification of expansion boards to the system.

Other objects features and advantages of the present invention will be apparent from the following detailed description taken in connection with the accompanying drawings, and from the respective individual features of the individual claims appended hereto.

BRIEF DESCRIPTION OF THE DRAWINGS

FIG. 2 is a block diagram of a preferred form of primary processor module for the terminal of FIGS. 1 and 1A;

FIG. 6 is a diagrammatic exploded view partly in section showing the manner of assembly and disassembly of the preferred terminal configuration of FIG. 5;

FIGS. 11A through 11J show a preferred implementation of the primary processing module for a preferred terminal configuration as illustrated in FIGS. 1, 1A and 5-10, FIG. 11B being a continuation of FIG. 11A to the right, FIG. 11C being a continuation of FIG. 11B to the right FIG. 11B being a continuation of FIG. 11C to the right, FIG. 11E being a continuation of FIG. 11D to the right, FIG. 11F being a continuation of FIG. 11A in a downward direction, FIG. 11G being a continuation of FIGS. 11A and 11B in a downward direction and being a continuation of FIG. 11F to the right, FIG. 11H being a continuation of FIG. 11C in a downward direction and being a continuation of FIG. 11G to the right, FIG. 11I being a continuation of FIGS. 11D and 11E in a downward direction, and being a continuation of FIG. 11H to the right, FIG. 11J being a continuation of FIG. 11E in a downward direction and being a continuation of FIG. III to the right.

FIGS. 12A et seq., FIG. 13A showing the first thirty-four output positions of the tenth, ninth and eighth connectors, and FIG. 13B showing positions fifty-nine through ninety-six of the tenth, ninth and eighth connectors, and FIGS. 13A and 13B showing circuitry common to all ten of the peripheral device connectors;

FIGS. 14A, 14B and 14C show a memory map for he primary processor means of FIGS. 11A et seq.

FIG. 15 shows a chart of Bus Cycle Status Information for the primary processor means;

FIG. 16 shows a timing diagram illustrating ready cycle timing for the primary processor means;

FIG. 17 is a diagrammatic illustration of the peripheral module (expansion card) identification system of the illustrated embodiment;

FIG. 18F being a continuation of FIG. 18A in the downward direction, FIG. 18G being a continuation of FIG. 18B in a downward direction and being a continuation of FIG. 18F to the right, FIG. 18H being a continuation of FIG. 18B in a downward direction and being a continuation of FIG. 18G to the right, FIG. 18I being a continuation of FIG. 18C in a downward direction and being a continuation of FIG. 18H to the right;

FIG. 20 is a diagrammatic illustration of a keyboard matrix control circuit such as the circuit illustrated in detail in FIGS. 18A, 18B and 18D;

FIG. 21 is a diagrammatic illustration of the cathode ray tube input/output address map for the circuitry of FIGS. 19A et seq.

DETAILED DESCRIPTION

Figure 1:
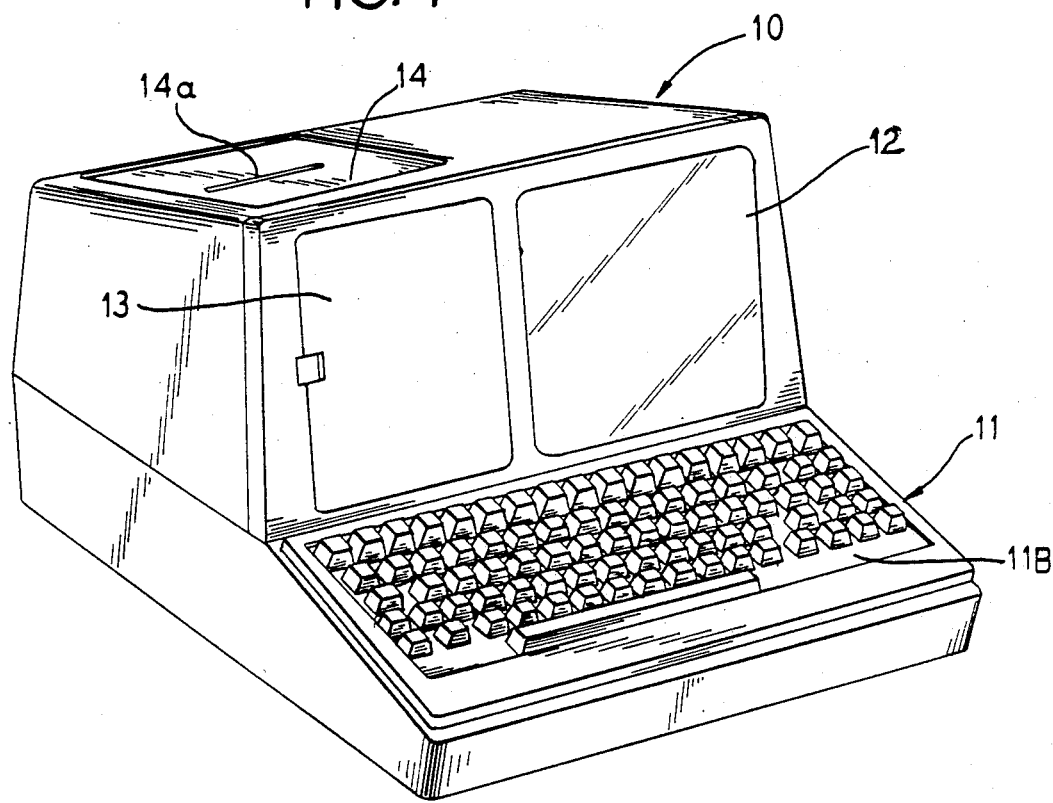
FIG. 1 is a diagrammatic perspective view of a point of sale terminal, and wherein the keyboard may be as shown or may comprise a membrane-type keyboard with a keyboard matrix of 128 contact closure points.
Figure 1A:
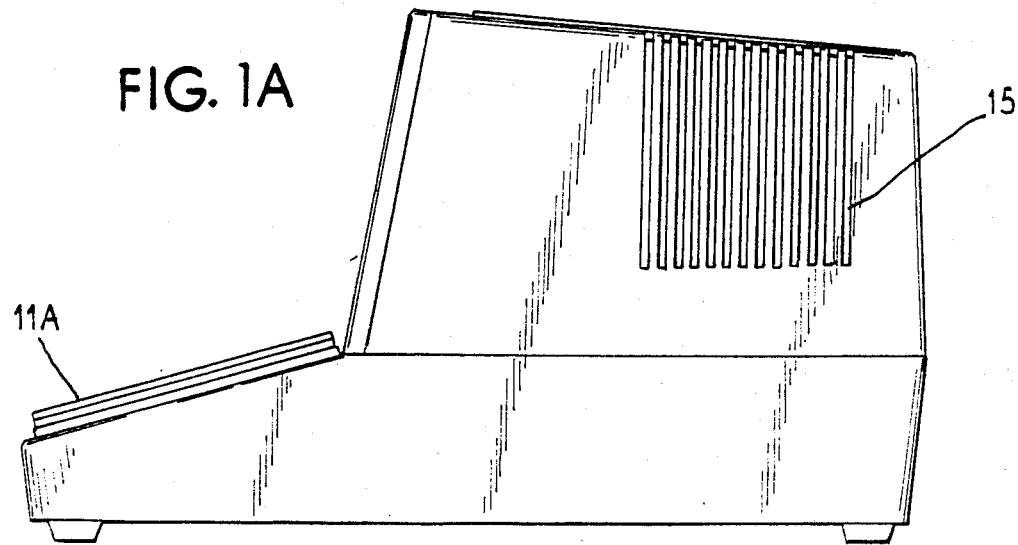
FIG. 1A is a diagrammatic right side elevational view of the terminal of FIG. 1, but showing a membrane-type keyboard adapting the terminal for manual entry of data concerning point of sale transactions.

FIGS. 1 and 1A show a terminal 10 especially adapted for use in point of sale systems, which embodies the concepts and teachings of the present invention, and may comprise the following components:

11 - manual entry keyboard such as a conventional point of sale keyboard (11A, FIG. 1A) or a conventional computer keyboard (11B, FIG. 1) such as used with personal computers and the like;

12 - video display screen, e.g. of a conventional high resolution cathode ray tube, or the equivalent;

13 - access door for providing access to a bulk data storage system, such as disk drive units including one or more removable data storage units (e.g. a floppy disk drive with a removable disk unit and a hard disk drive with a fixed disk);

14 - printer access door

14a - slot for guiding the output of a paper tape from a printer, or the like, for providing a hard copy output.

15 - ventilating slots for allowing exit of a cooling air flow (a fan preferably being located at the right hand side of the terminal directed toward louvers 15)

FIG. 2 shows an exemplary basic circuit forming an extremely adaptable primary processing unit 20. This unit is conceived as a product which can serve a point of sale terminal such as 10, FIG. 1, but is also flexible to a point where multiple such processing units can be configured together to form a sophisticated and powerful point of sale system. Components of primary processing unit 20 may comprise the following:

21 - primary processor, e.g. 80188

22 - non-volatile program memory, e.g., EPROM containing basic bootstrap routine, interrupt vector pointers, and other pertinent information 23 - random access memory e.g. CMOS static RAM with battery backup 24

25 - real time clock, e.g. CMOS RTC CHIP providing time, day, month and year information as well a capability to provide periodic interrupts to processor 21 based on timers internal to the RTC chip. Where battery backup 24 is provided by a 3.6 volt nickel cadmium battery pack, minimum battery backup time for the RTC chip is two weeks.

26 - control block may monitor the incoming five volt supply to ensure proper operational supply limits and if the supply fails outside established limits, the main CPU board components and any expansion port devices at expansion ports 27 will be reset.

A primary processing unit 20 as shown in FIG. 2 may derive its flexibility from the following primary (1) the presence o ten expansion ports as indicated at 27 which can be loaded with various peripheral devices or memory:

(2) a basic processing unit can utilize the expansion ports 27 to become any level of processor necessary from a powerful peripheral controller to a "master" processor with a large non-volatile database.

The flexibility of the primary processor unit results in several advantages:

(1) reduced cost in volume production because one common computing core is used to control different functions;

(2) improved system redundancy primary processor unit can control localized peripherals at the bus level independently of a point of sale system network such as the A-line network of the Norand Corporation; and (3) improved system performance by (a) reducing the amount of peripheral network communication traffic, and (b) direct access to a database information in small to medium size systems.

Figure 3:
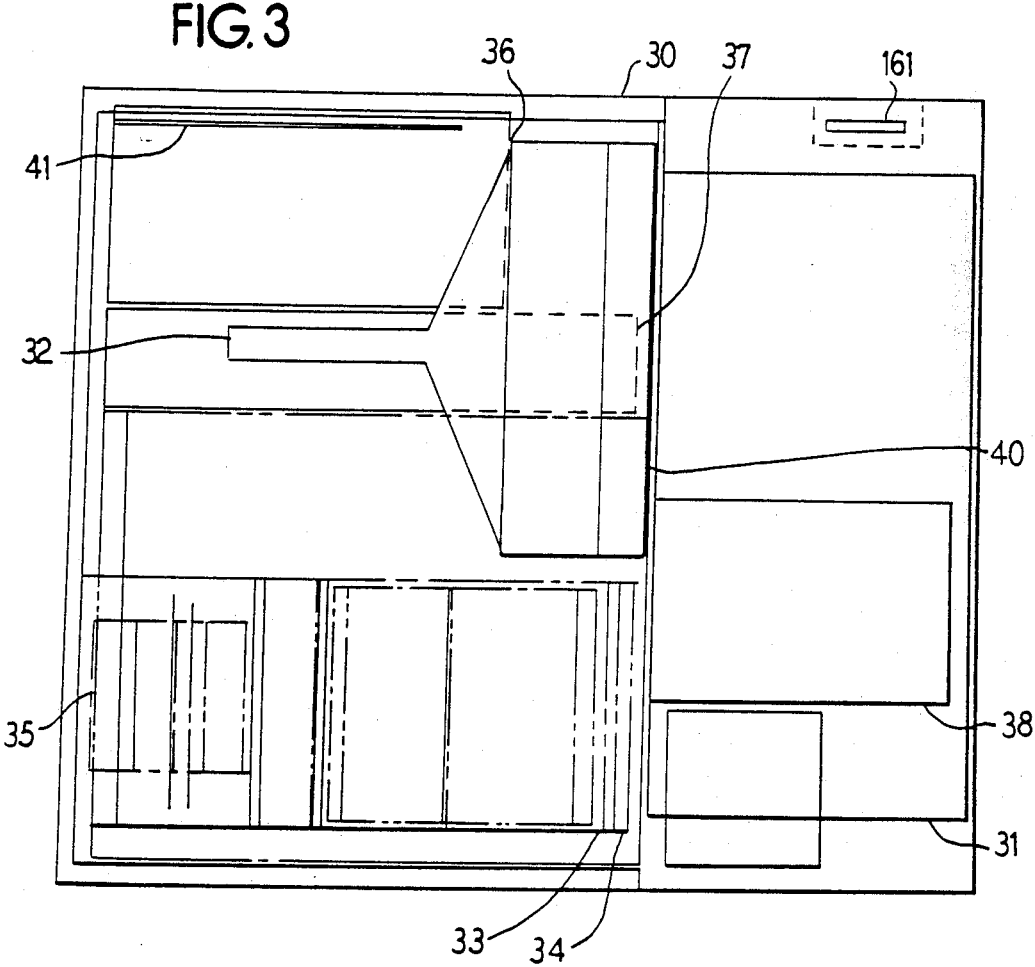
FIG. 3 is a diagrammatic plan view of an early layout of parts for the terminal of FIGS. 1 and 1A.
Figure 4:
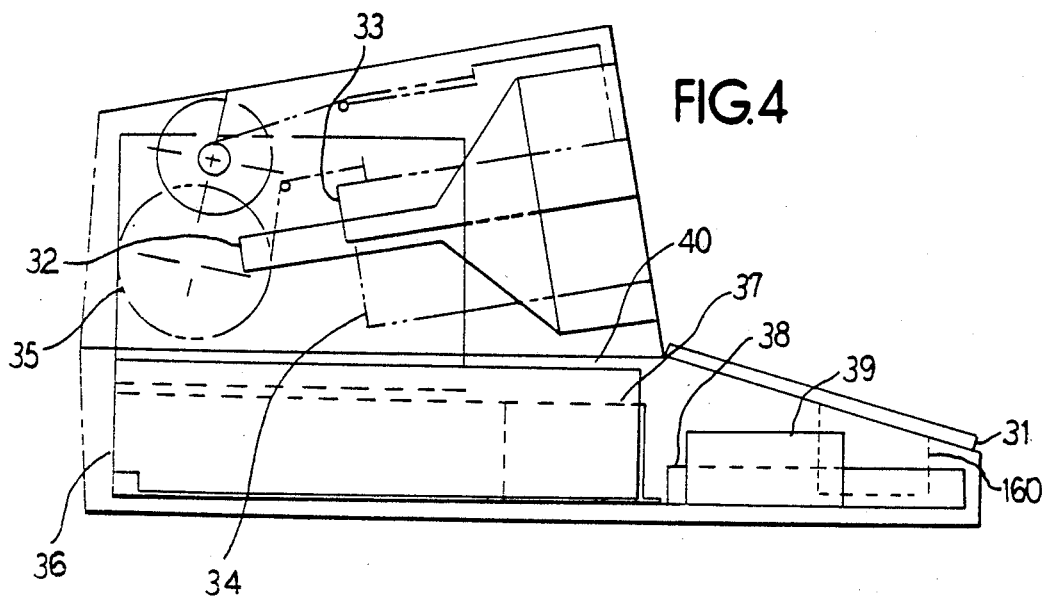
FIG. 4 is a diagrammatic side elevational view illustrating the layout of parts for the early version of FIG. 3.
Figure 5:
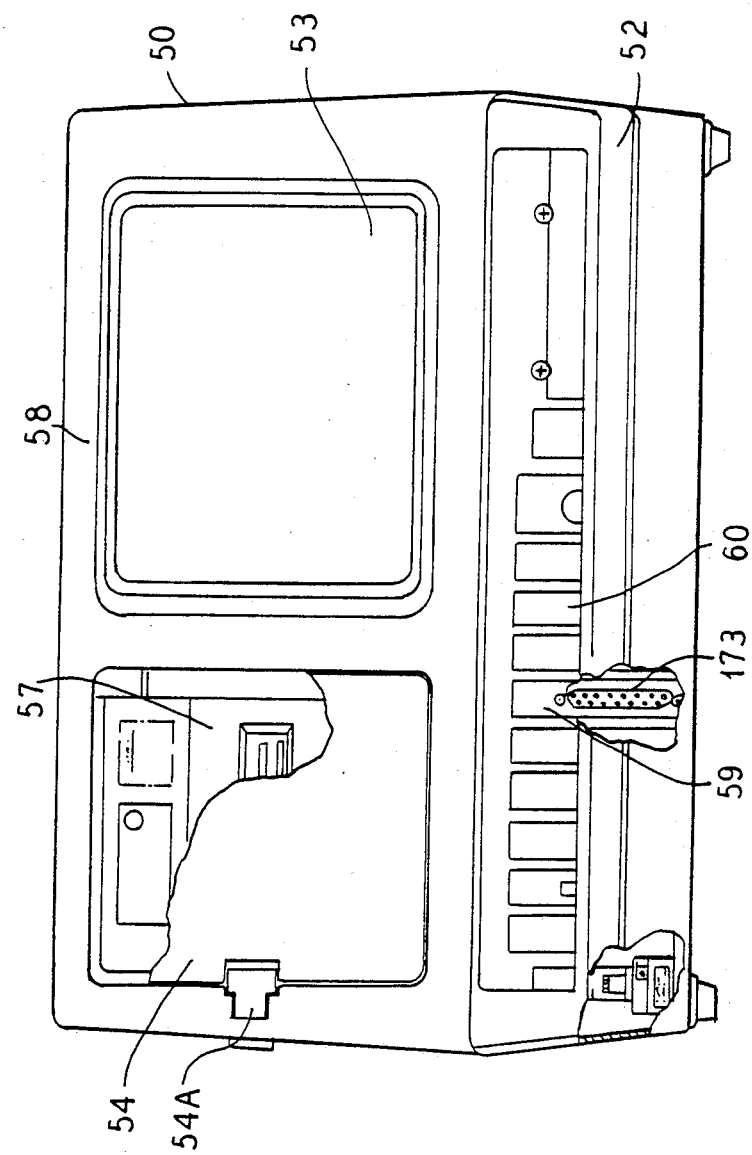
FIG. 5 is a diagrammatic front elevational view of a preferred terminal configuration in accordance with the present invention, with certain parts broken away, and the keyboard removed, to reveal interior structure.

FIGS. 3 and 4 are diagrammatic layout views, showing an early proposed arrangement of the following parts of a point of sale terminal 30 as seen from the left side and top, respectively, of the terminal of FIGS. 1 and 1A, by way of example:

31 - keyboard
32 - cathode ray tube
33 - floppy disk drive
34 - hard disk drive
35 - printer subassembly
36 - power supply
37 - backup batteries
38 - modem
39 - fan
40 - CPU mother board
41 - CRT controller board FIGS. 5 through 7, 7A, 8, 9 and 10 show a presently referred arrangement of parts, and details of construction, of a successful implementation of a console incorporating the primary processing unit of FIG. 2. The somewhat diagrammatic views showing this specific embodiment according to the present invention, comprise the following parts:

FIG. 5 (Front View)

50 - terminal with keyboard 51 (FIG. 6) removed
52 - keyboard base
53 - video display screen
54 - access door with latch 54A providing access to disk drives 55 and 56 (FIG. 7), and broken away to show disk plate 57 (FIG. 5)
58 - bezel
59 - scanner interface bracket
60 - printed circuit board access plate (one of three)

FIG. 6 (Side View)

Figure 6B:
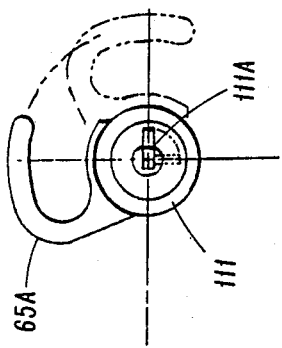
FIG. 6B is a detail elevational view illustrating a preferred cam locking arrangement for the mechanism of FIG. 6A.
Figure 6A:
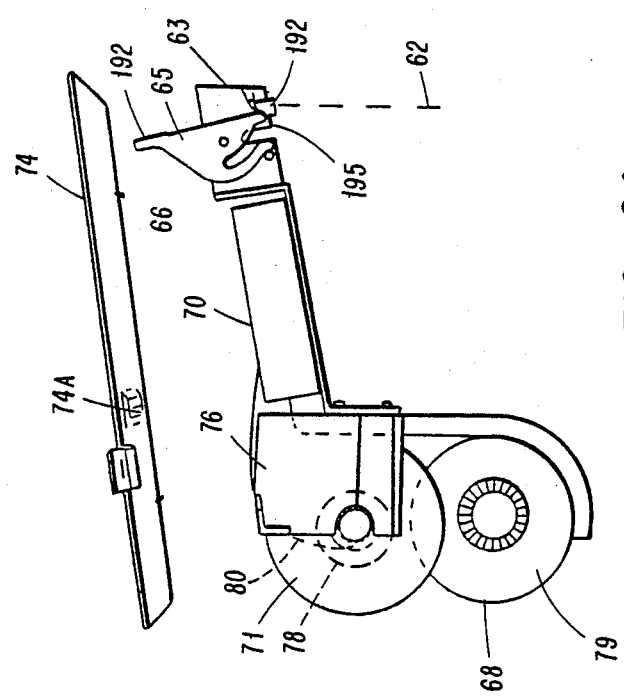
FIG. 6A is a continuation of FIG. 6 in an upward direction as indicated by the dash line shown in FIGS. 6 and 6A.

61 - printer housing, dash line 62 indicating separation of the printer subassembly of FIG. 6A
63 - printer subassembly (FIG. 6A) (shown displaced upwardly from its receptacle 64 and showing a cam lock mechanism 65 wit an actuating shaft 66 (see FIG. 6A) which is manually turned to rotate cam lock 65 (FIG. 6A) as indicated by dash line arrow 67 (FIG. 6); FIG. 6 also showing the locking position of cam lock mechanism 5 in dot-dash outline at 65-1 in relation to a pin 68 of the printer housing 61
69 - printer converter printed circuit board
70 - printer mechanism, e.g., Epsom 260
71 - paper takeup spool
72 - terminal base
73 - gear on output shaft of takeup motor which automatically couples with takeup spool 71
74 - printer door, FIG. 6A, with slot 74A, FIG. 7, for feeding printed paper tape
75 - switch lever actuator of printer housing 61, mounted on switch bracket 76
76 - plastic printer carrier (FIG. 6A)
77 - metal printer carrier bracket (FIG. 6A)
78 - takeup drive gear (FIG. 6A) which automatically meshes with gear 73, FIG. 6, when printer assembly 63 is inserted and latched in receptacle 64
79 - supply spool
80 - paper path
81 - screw for fastening printer housing 61 at clip nut 82, as represented by dash line 83, also screw 84 associated with base 72 and engaging printer housing 61 as represented by dash line 85
86 - disk drive shield
88 - modem printed circuit board, 2400 bad
90 - CPU printed circuit board
91 - interrupt module printed circuit board (see FIG. 10)
92 - video control printed circuit board (see FIG. 10)

FIG. 7 (Rear View)

110 rear cover with printer access door 74 and carrying cam lock mechanism 65A, FIG. 6B, with a modified actuator assembly 111 including a slot 111A, FIG. 6B, secured with actuator shaft 66, FIG. 6A, and turned by means of a suitable manually operated tool
115- printer take-up cable
117- CRT chassis
120 power supply
122- disk interface cable
124- modem control cable
126- disk controller printed circuit board
128- ¾ megabyte DRAM printed circuit board
130- printer controller printed circuit board
134- scanner cable

FIG. 9 (Top View)

Figure 9:
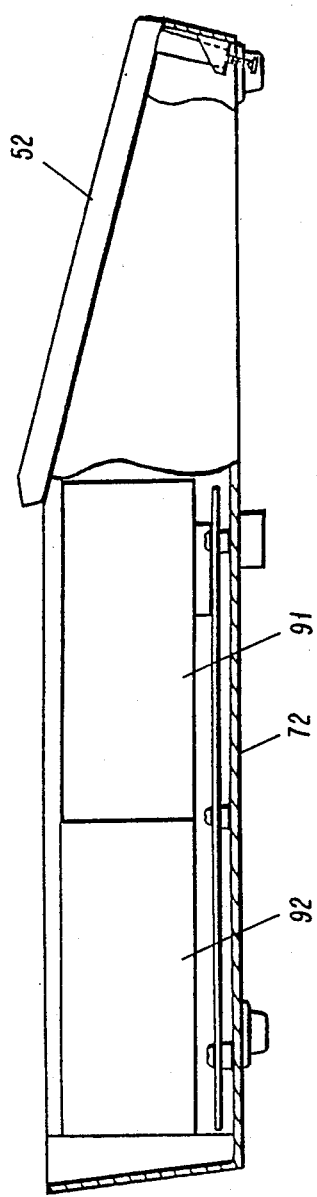
FIG. 9 is a diagrammatic side elevational view of a base portion of the terminal of FIG. 5 with a portion thereof broken away and in section.

150- laser processor printed circuit board (for laser bar code scanner)
152- support bracket FIG. 9 is a somewhat diagrammatic left side view of the lower portion of the terminal 50 showing the terminal base 72 and the keyboard base 52 at a forward portion of the terminal, and a portion of the terminal base 72 being broken away, to indicate the positions of printed circuit boards 91 and 92 at a rear central part of the terminal base.

Figure 10:
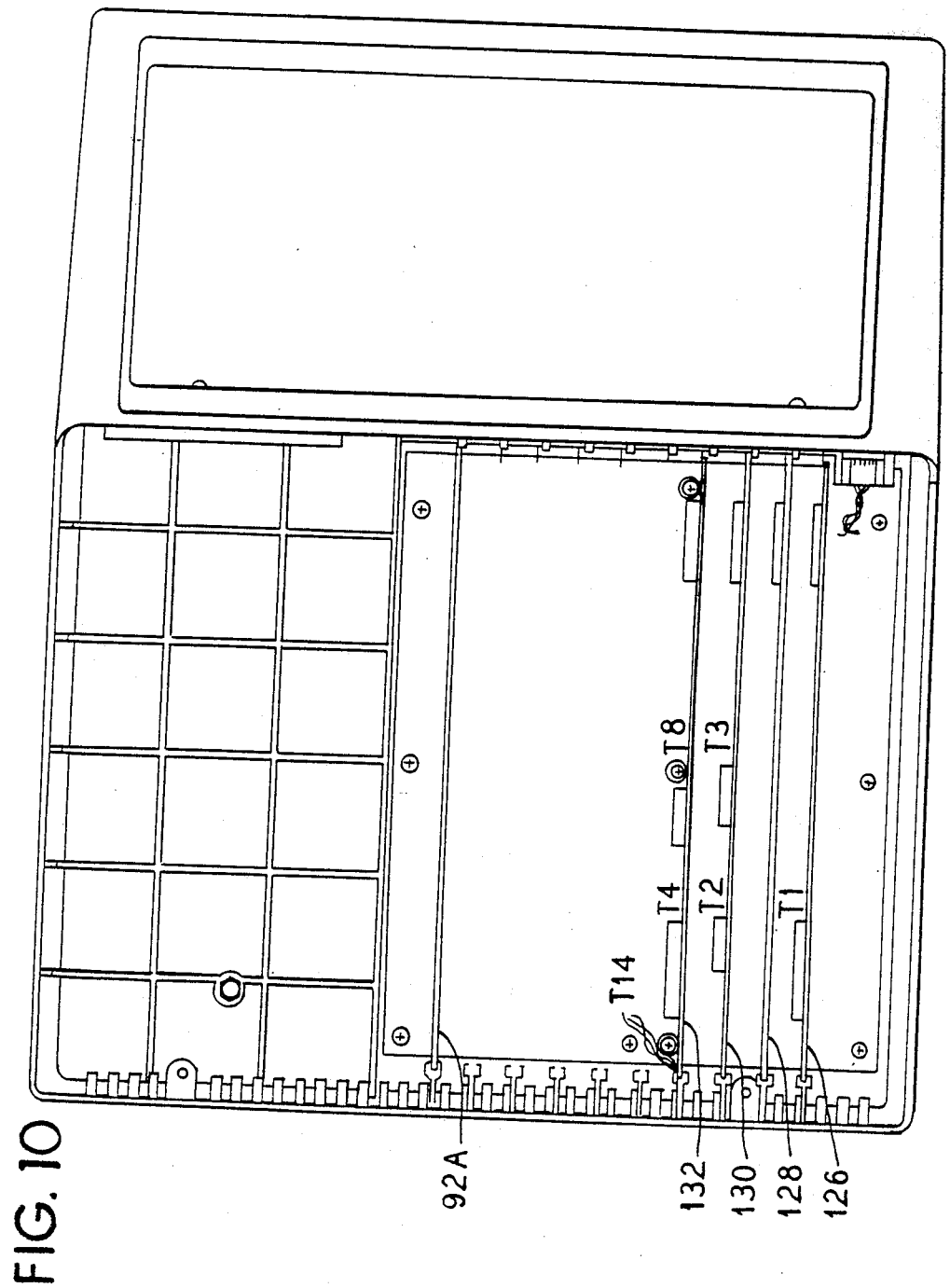
FIG. 10 is a diagrammatic top plan view of the base portion of the terminal as shown in FIG. 9.

FIG. 10 is a somewhat diagrammatic top plan view of the base portion of the terminal 50, showing printed circuit boards 126, 128, 130, 132, and 92A in expansion slots zero, one, two, three and nine. Board 90 may incorporate the interrupt circuitry so that board 91 of FIG. 7 may be omitted.

Figure 7:
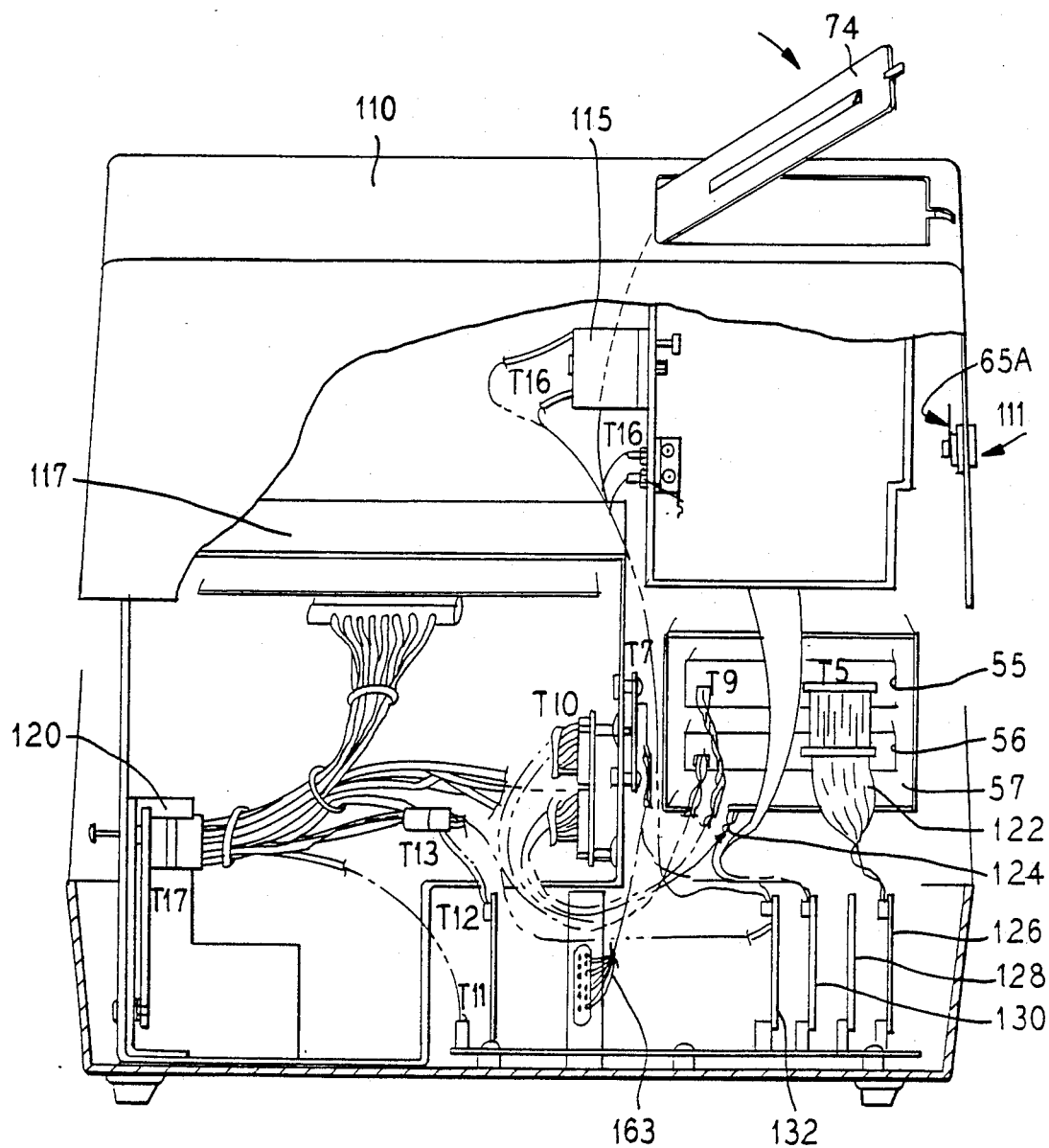
FIG. 7 is a diagrammatic rear view of the parts as shown in FIG. 6 prior to complete assembly thereof, with parts broken away to diagrammatically indicate internal arrangement.

Connectors of the terminal 50 may include the following:

| From | To | Cable Description |
|---|---|---|
| T1(FIG. 10) | T5(FIG. 6) | Disk Interface Cable 122, FIG. 7 |
| T2(FIG. 10) | T6(FIG. 6) | Modem Control Cable 162, FIG. 6 |
| T3(FIG. 10) | T7(FIG. 7) | Scanner Cable 163, FIG. 7 |
| T4(FIG.10) | T15(FIG. 6) | Printer Converter Cable 164, FIGS. 6, 7 |
| T6(FIG. 6) | T16(FIG.7) | Printer Takeup Cable 166, FIG. 7 |
| T14(FIG. 10) | T13(FIG.7) | Printer Controller cable |
| T9(FIG. 7) | T10(FIG. 7) | Disk Power Cable 169, 170 |
| T17(FIG. 7) | T11(FIG. 7) | CRT Cable |
| T17(FIG. 7) | T12(FIG. 7) | CRT Cable |

| Items (Not Shown) Which May Be Supplied With The Terminal |
|---|
| Interface Cable |
| Floppy Disks |
| Power Cable |
| Cash Drawer |
| Digital Scanner (The connector of the digital scanner plugs inreceptacle 173, FIG. 5.) |

Discussion Re FIGS. 1, 1A, 2 through 6, 6A, 6B and 7, 8, 9 and 10 Including Related Processor and Expansion Module Features The subject drawing figures illustrate a point of sale system wherein a point of sale terminal such as 10, FIG. 1, 30, FIGS. 3 and 4, or 50, FIGS. 5 et seq. has input-/output means such as manual data input means as represented by membrane type keyboard 51, FIG. 6, coded data input means such as represented by smart card reader 160, FIG. 4 having a smart card receiving slot 161 FIG. 3, on-line display means such as cathode ray tube display 33, FIGS. 3 and 4, and hard copy output means such as printer subassembly 63, FIG. 6A. Also illustrated are mass data storage means such as floppy disk drive 33, FIG. 4, and hard disk drive 34, FIG. 4. The point of sale terminal further includes primary processing module means such as represented in FIG. 2 having a series of expansion connector means such as indicated at 27, each having data bus, address bus, and control bs connection means coupled with respective conductors of data bus 170, address bus 180 and control bus 190. The primary processing module means includes for example expansion port connectors providing for releasable coupling of data, address and control signals with respective associated peripheral devices such as the input/output means just discussed. As another example, the expansion port connectors 27, FIG. 2, may receive memory expansion modules, communication controller modules, and the like. Such peripheral expansion module means detachably engage with the expansion connector means such as 27 for data processing interaction with the primary processing module means of FIG. 22, and such peripheral expansion module means may be operatively connected for example with at least the coded data input means 51, FIG. 6, and with the on line display means such as represented by the cathode ray tube chassis 117, FIG. 7.

A detailed example of primary processing module means is found in FIGS. 11A through 11J, 12A through 12I, and 13A and 13B. A detailed example of peripheral expansion module means for input/output devices and for a cash drawer is found in FIGS. 18A-18I and 19A-19I.

Further details concerning data input means accommodating input of data by an operator may be obtained by reference to a copending application in the name of George E. Hanson, U.S. Ser. No. 049,778 filed May 12, 1987, attorney's case DN 5837, and this disclosure is incorporated herein by reference in its entirety.

With respect to coded data input means such as represented by scanner interface bracket 59, FIG. 5, reference may be made to Chadima, Jr., et al, U.S. Pat. No. 4,570,057 issued Feb. 11, 1986. With respect to the smart card embodiment, reference may be made to a pending patent application of Dennis A. Durbin, et al, U.S. Ser. No. 897,547 filed Aug. 15, 1986, attorney's case DN 5769. For details of a slotted card-receiving construction which may incorporate a smart card reader such as indicated at 160 and 161, FIGS. 3 and 4, reference may be made to a pending U.S. patent application of Harry R. Soza, et al, U.S. Ser. No. 892,751 filed July 31, 1986, DN 5746, and the disclosures of said pending applications Ser. No. 897,547 and 892,751 are incorporated herein by reference in their entirety. In general, a printer converter printed circuit board such as 69, FIG. 6, a modem printed circuit board such as indicated at 88, FIG. 6, and a video control printed circuitboard such as indicated at 92, FIG. 6, and the peripheral device module means such as indicated at 126, 128, 130 and 132, FIG. 7, may correspond in their basic novel features with those of the video interface module means indicated at 92A, FIG. 10, and as described in detail in connection with FIGS. 18A et seq., and FIG. 19A et seq. Disk controller printed circuit boards such as 126, dynamic random access memory printed circuit boards such as 128, communications interface printed circuit boards such as 130 and printer controller printed circuit boards such as 132, except for the features in common with printed circuit board 92A, FIG. 10, and FIG. 18A et seq. and FIG. 19A et seq., may be of essentially known construction. In this connection, reference is made to the A-Line point of sale system of Noand Corporation of Cedar Rapids, Iowa, such a system including a loop local communications network, for example, generally as illustrated in Chadima, Jr., et al, U.S. Pat. No. 4,604,693 issued Aug. 5, 1986.

Figure 18A:
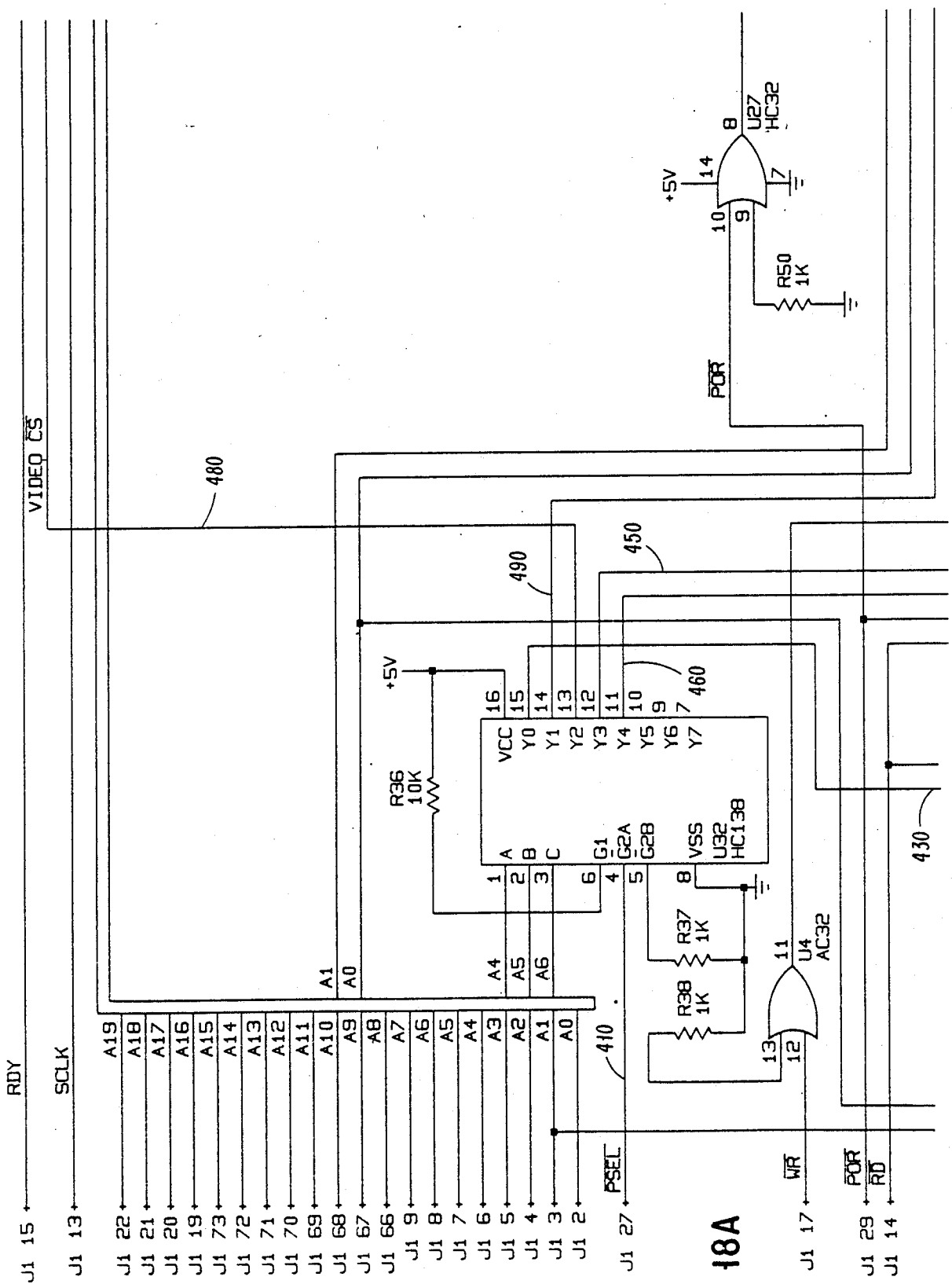
FIGS. 18A through 18I show an exemplary video interface circuit for insertion in a peripheral expansion port of the primary processor means of FIGS. 11A et seq.
Figure 18B:
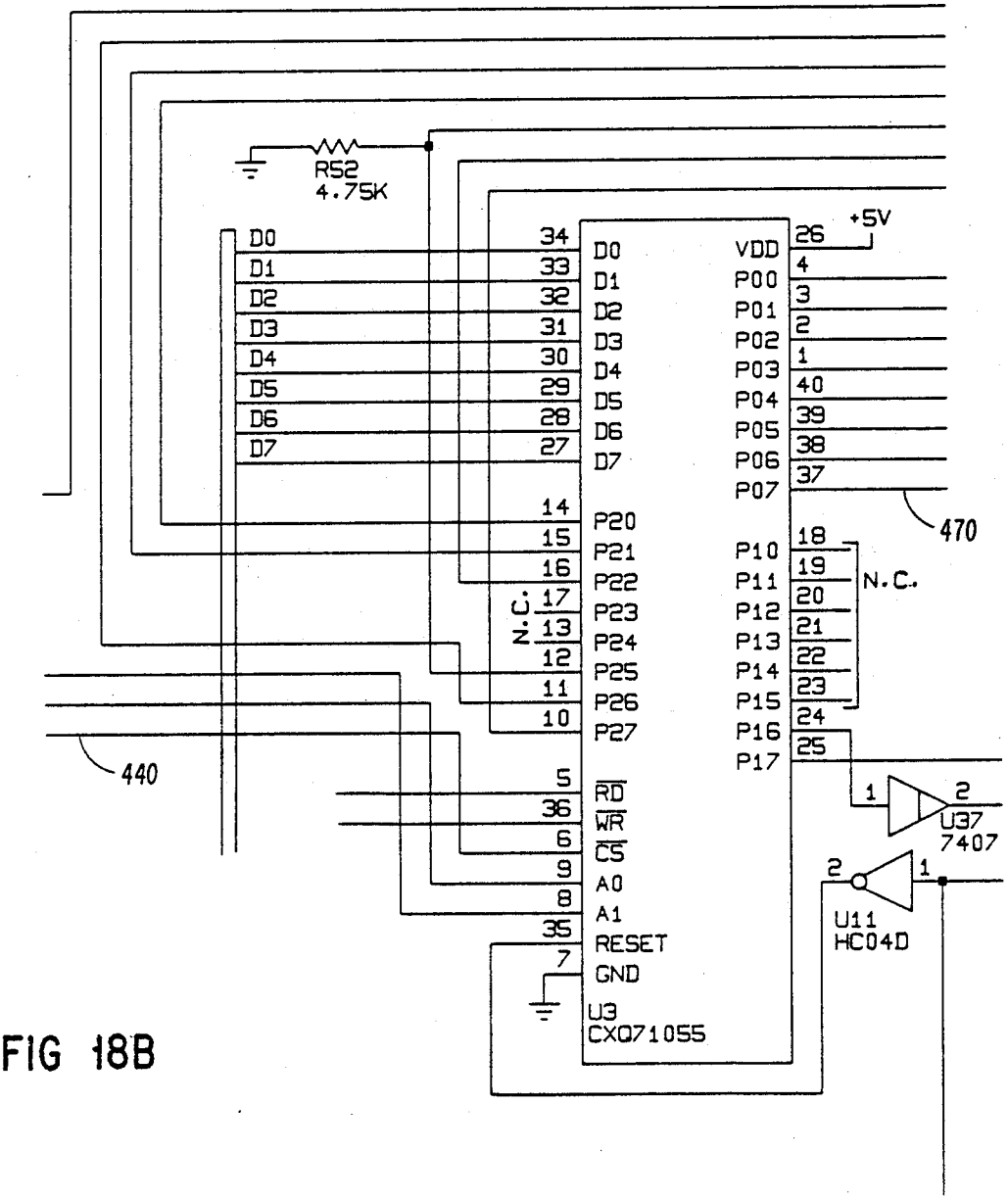
Figure 18C:
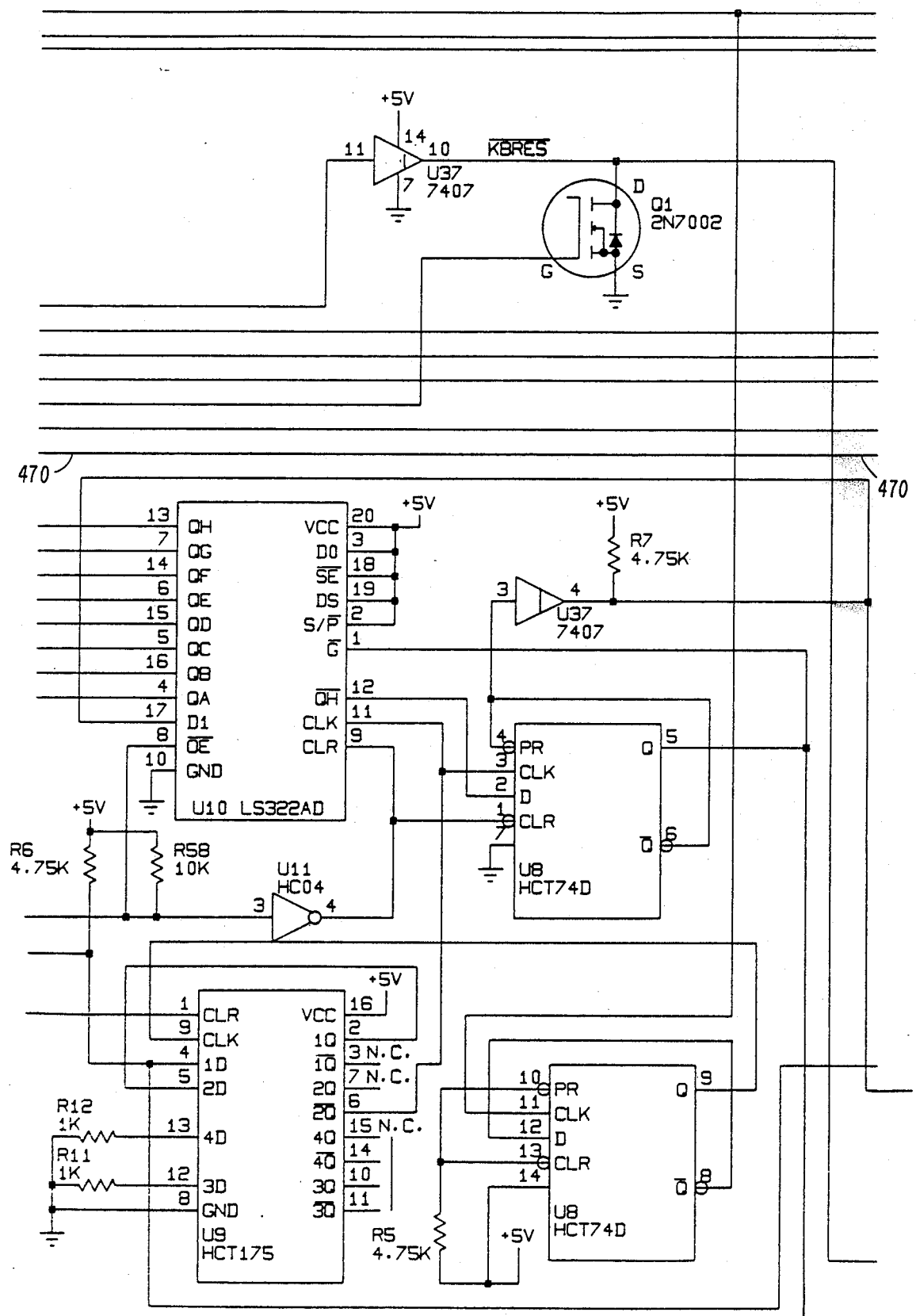
Figure 18D:
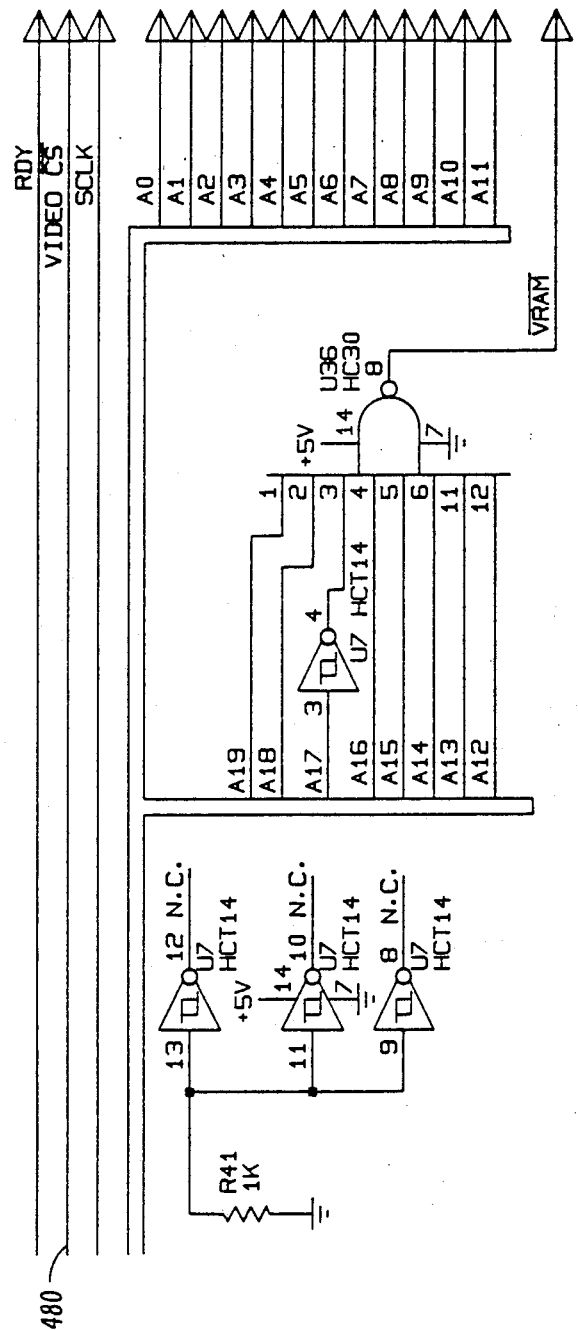
Figure 18E:
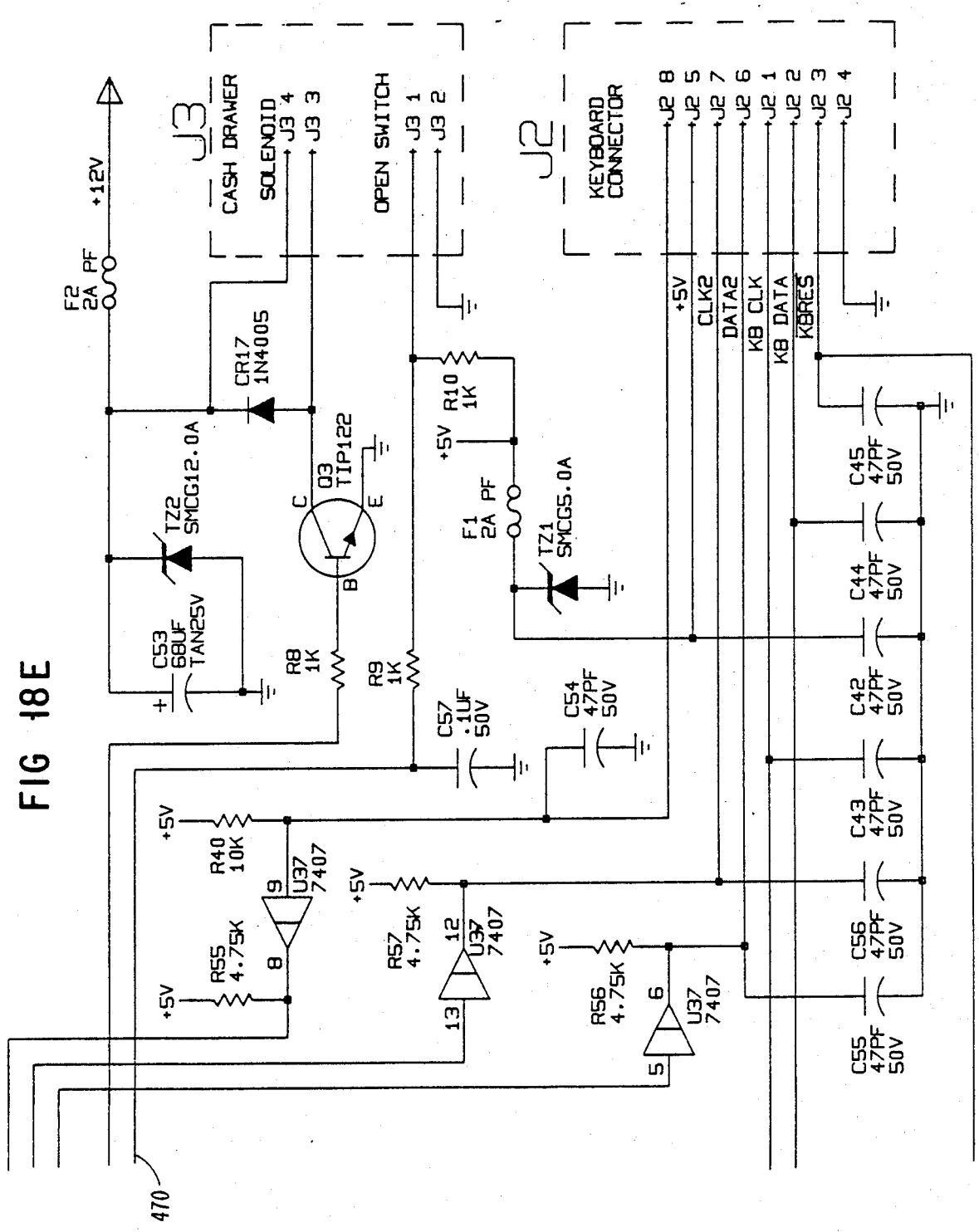
Figure 18F:
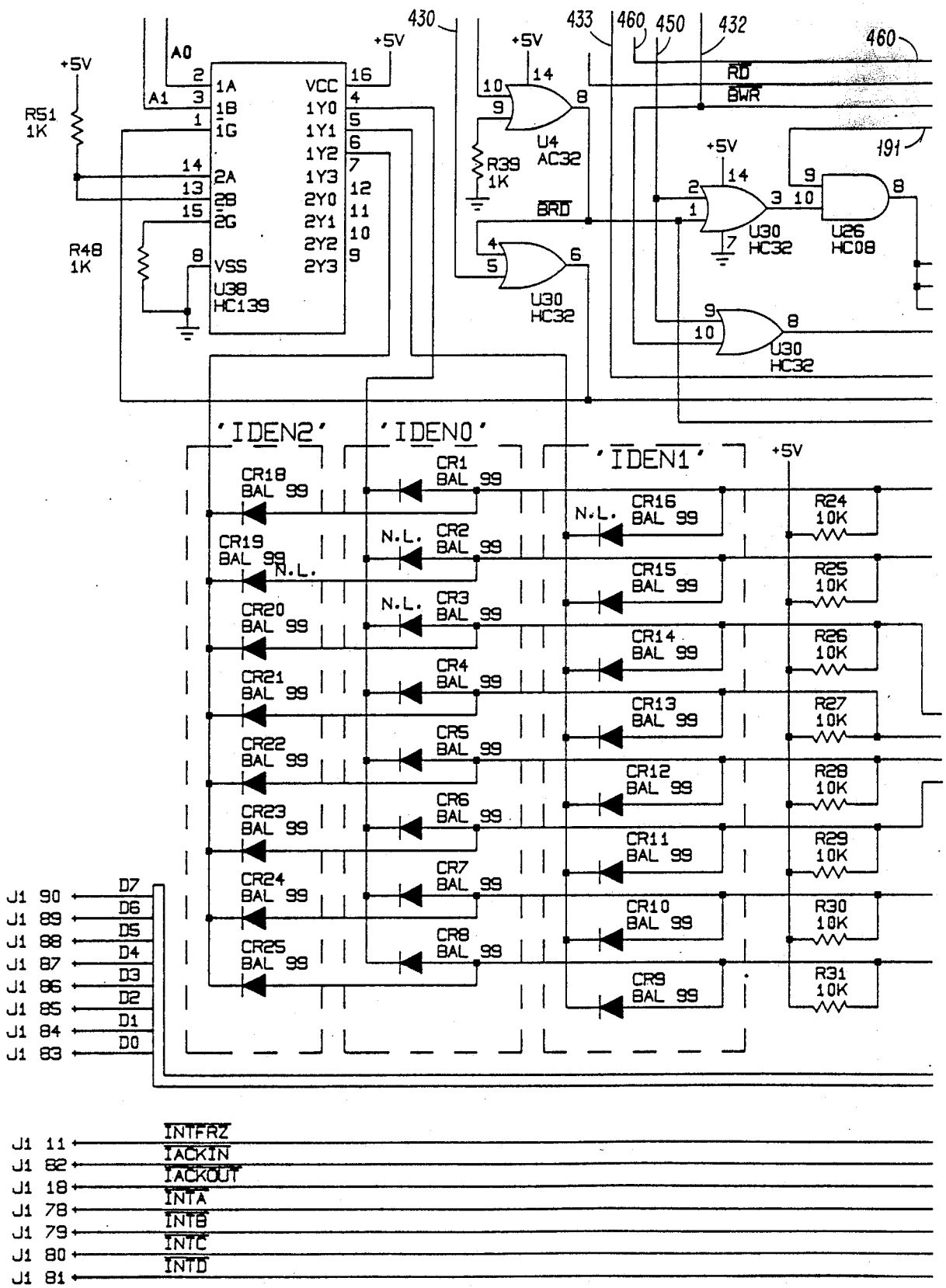
Figure 18G:
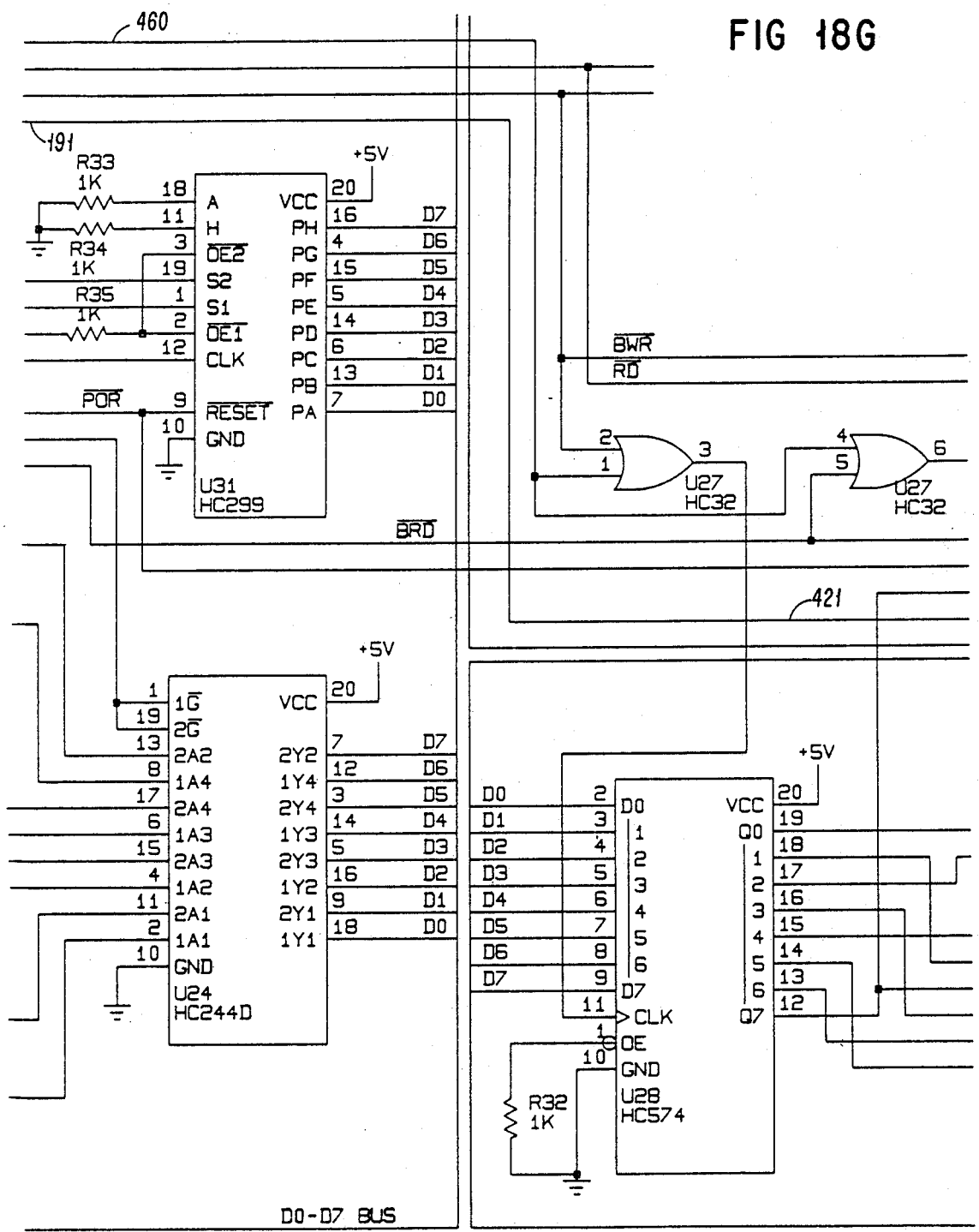
Figure 18I:
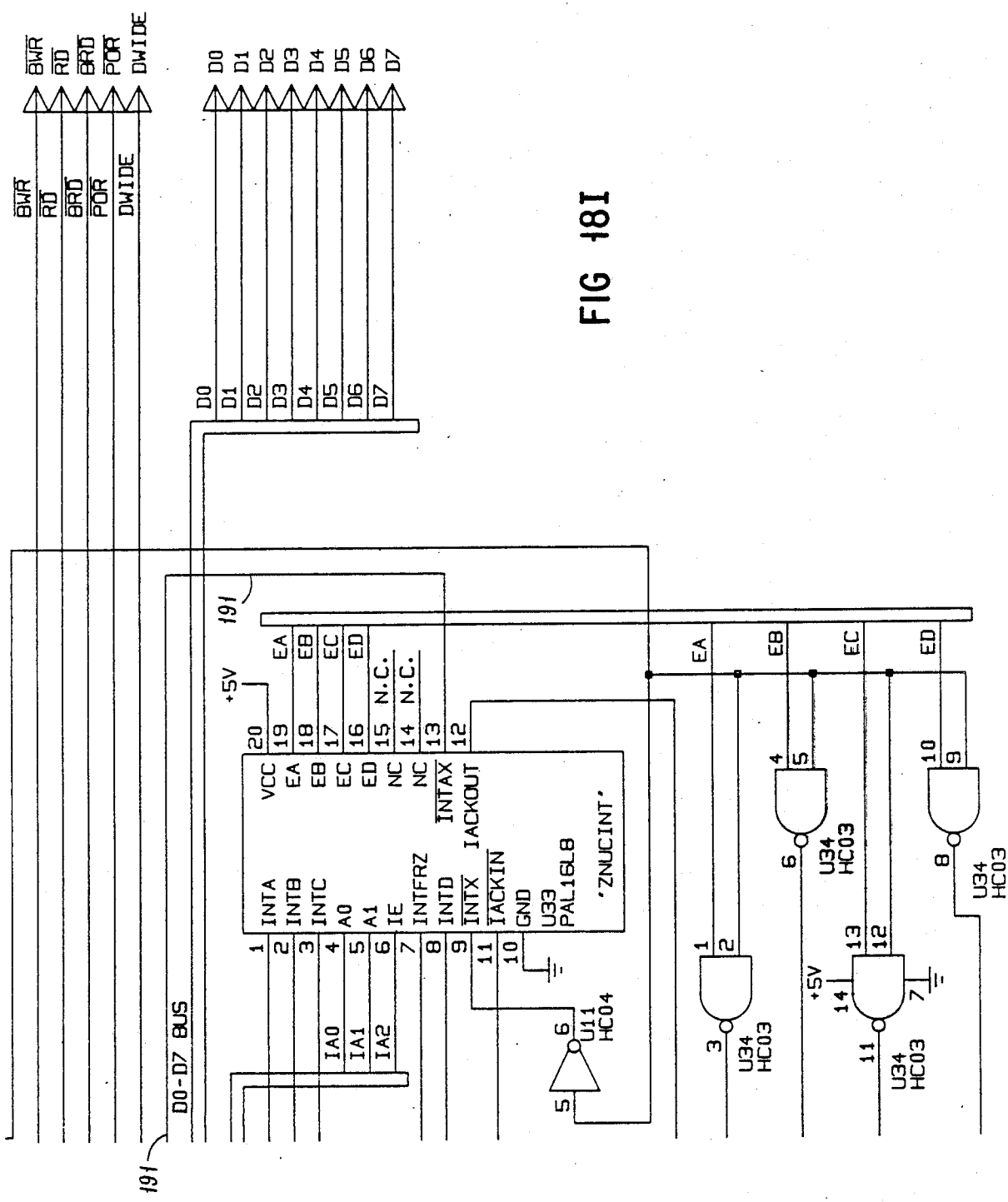
Figure 19A:
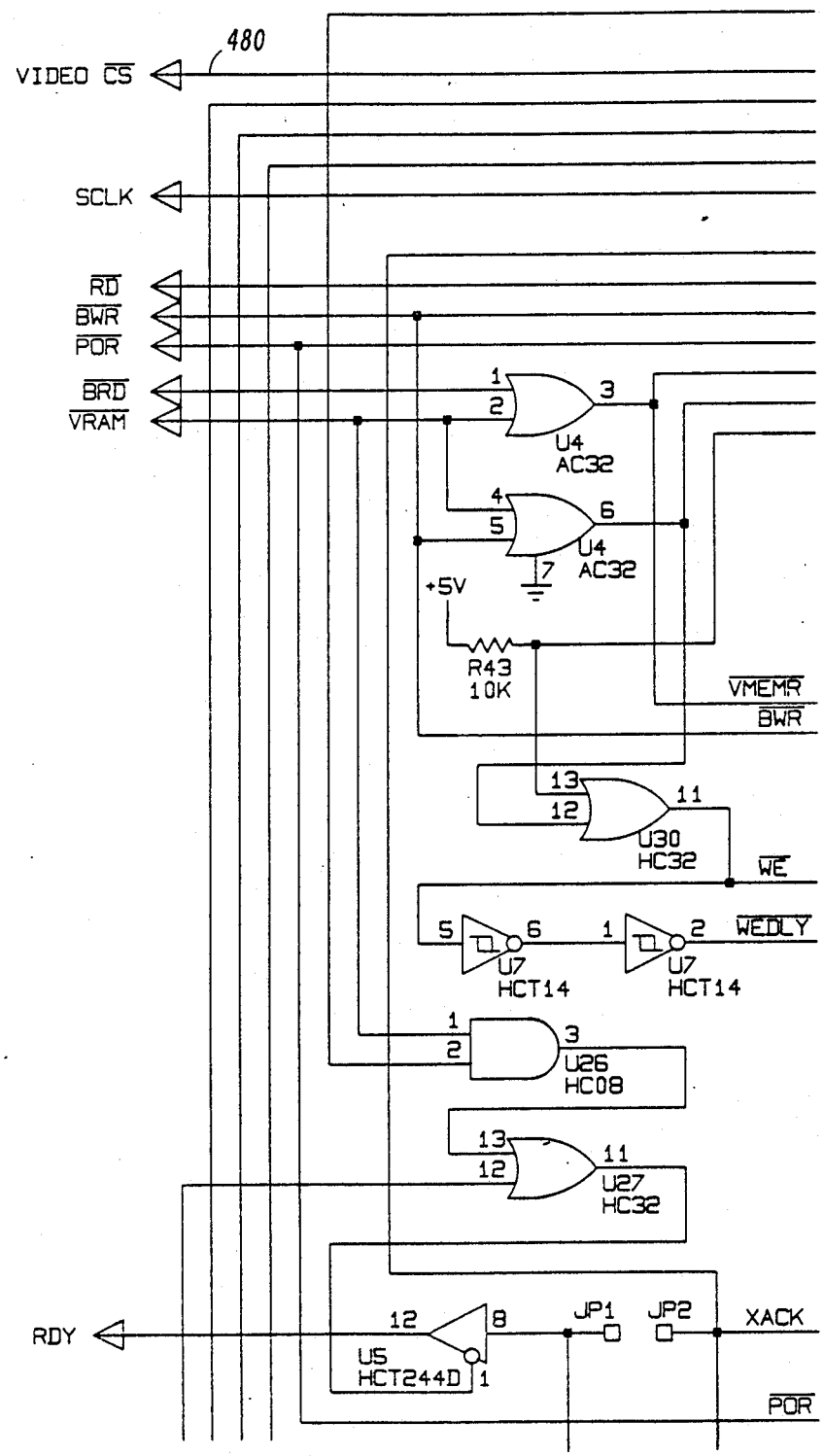
FIGS. 19A through 19I show an exemplary circuit for a video interface module connected with one of the peripheral device connectors of FIGS. 13A and 13B, FIG. 19B being a continuation of FIG. 19A to the right, FIG. 19C being a continuation of FIG. 19B to the right, FIG. 19D being a continuation of FIG. 19C to the right, FIG. 19E being a continuation of FIG. 19D to the right, FIG. 19F being a continuation of FIG. 19E to the right, FIG. 19G being a continuation of FIGS. 19A and 19B in a downward direction, FIG. 19H being a continuation of FIGS. 19B and 19C in a downward direction and being a continuation of FIG. 19G to the right, FIG. 19I being a continuation of FIG. 19C in a downward direction and being a continuation of FIG. 19H to the right, FIG. 19J being a continuation of FIG. 19E in a downward direction.

A function of the circuitry of FIG. 18A et seq. and FIG. 19A et seq. is the provision of a function decoder means (e.g. including component U32, FIG. 18A), connected with only a few of the address lines of a peripheral expansion module means such as 27, FIG. 2, and operable for selectively addressing various circuit means such as the individual identification circuit means of FIG. 18F, the keyboard interface circuit such as associated with connector J2, FIG. 18E, and including components U3, FIG. 18B, U8A, U8B, U and U10, FIG. 18C. The function decoder also selectively activates a video chip select board output as will be apparent from the input line "Video CS" of FIGS. 19A, 19B and 19C. A further output of the function decoder circuit goes to the interrupt circuit comprised of bidirectional shift register component U31, FIG. 18G, in conjunction with the gate circuitry U30, U26, of FIG. 18F, gate component U26 receiving an input via line 191 from component U33, FIG. 18I; operation being explained in greater detail in a pending patent application of Keith K. Cargin, Jr., et al, U.S. Ser. No. 928,916 filed Nov. 7, 1986, attorney's case DN 5865, this disclosure being incorporated herein by reference in its entirety. With this circuitry, the primary processor means of FIG. 2 receives an interrupt vector identifying a particular peripheral expansion module means which has transmitted an interrupt signal via its associated expansion port connector means 27, FIG. 2, to the primary processing means. Suitable circuitry for an interrupt module printed circuit board such as indicated at 91, FIG. 6, for example in connection with a multiple line communications controller, will be apparent from the incorporated pending patent application Ser. No. 928,916 just referred to.

Figure 18H:
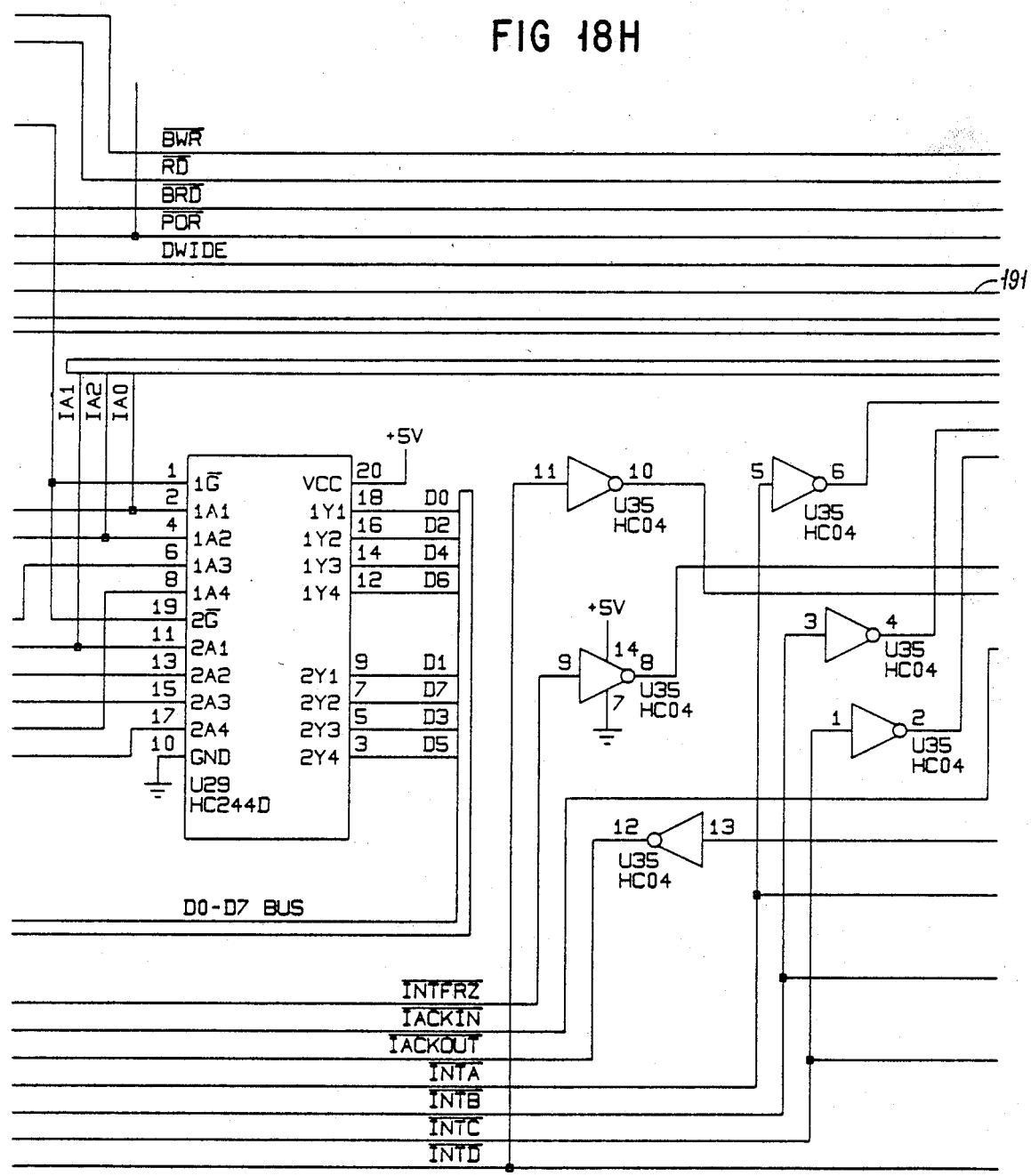

A further output of the function decoder circuit of each expansion module may enable a read or write operation, for example to the data latch U28, FIG. 18G, or the buffer U29, FIG. 18H.

It may be noted that each of the expansion port connectors 27, FIG. 2, may receive at least about sixteen address lines of address bus 180, and may for example receive thirty-two address lines of address bus 180, while the function decoder circuit such as U32, FIG. 18A, may receive only a few address lines, for example address lines designated A4, A5, and A6, FIG. 18A along with a peripheral select signal (PSEL).

Many other features of the illustrated point of sale system will be apparent from the following detailed description of the exemplary circuit configuration.

Figure 8:
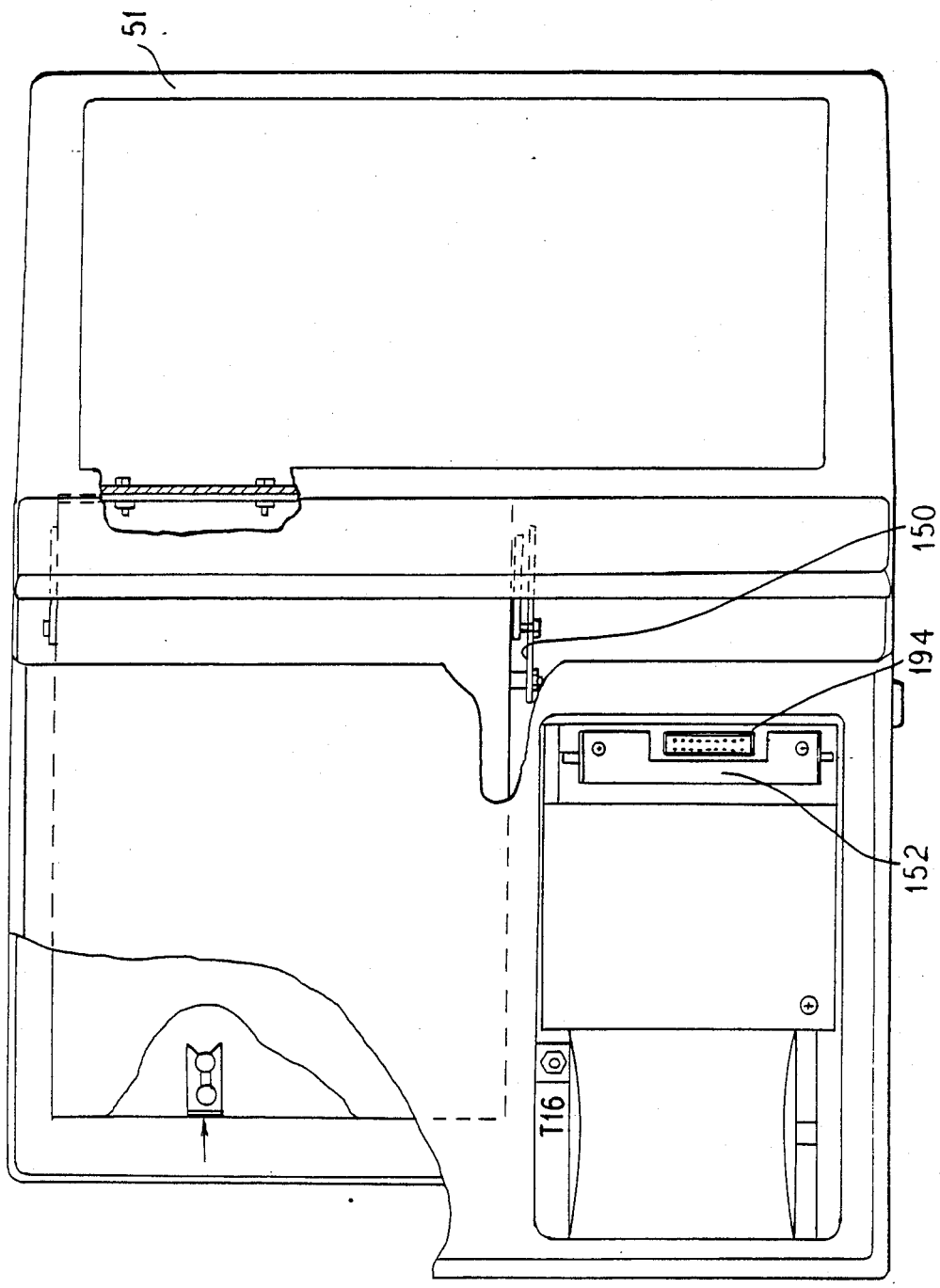
FIG. 8 is a diagrammatic plan view of the terminal with parts partially assembled as shown in FIG. 6, and with portions broken away to show internal details.

It will be noted that the printer subassembly 63 may be removed as a unit from its receiving compartment 64 upon manual turning of the actuator lever 192, FIG. 6A, or 111A, FIG. 6B, the associated electrical connector 193, FIG. 6A, being automatically disengaged from receptacle 194, FIG. 8. Thus, in the event of a malfunction, the printer subassembly can be removed and replaced by the end user of the system connector 193, FIG. 6A, of the printer subassembly being automatically guided into correct relationship with receptacle 194 by means of pin 68, FIG. 6, entering into receiving slot 195, FIG. 6A.

The coupling of the module 92A, FIG. 10, with a cash drawer is adequately depicted by the connector J3, FIG. 18E, the actual cash drawer being for example of conventional construction such as known from the A-Line point of sale system of Norand Corporation.

Description of FIGS. 11A-11J, 12A-12I and 13A-13B

Figure 11A:
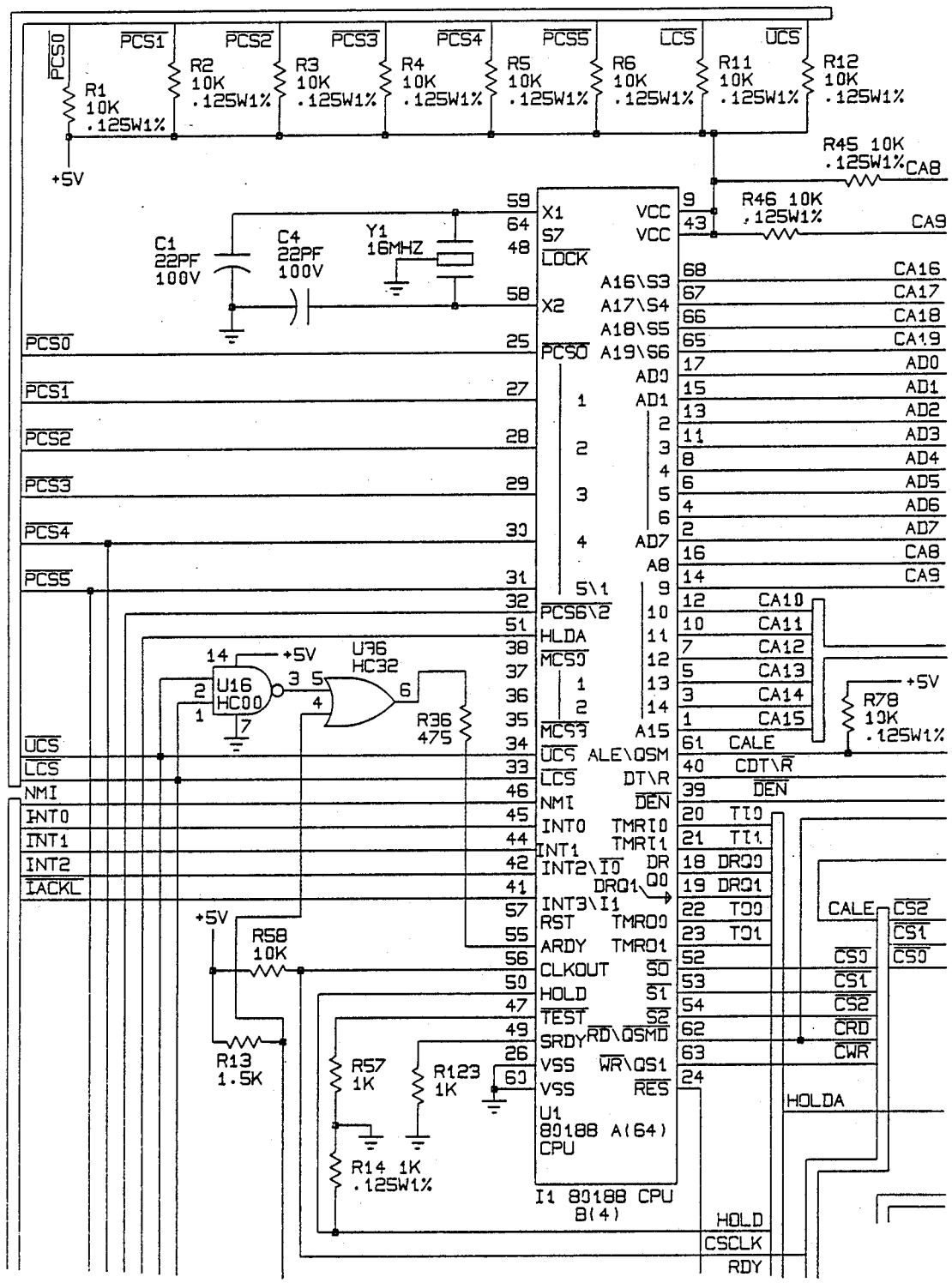

An exemplary detailed circuit for the primary processor module of FIG. 2 had the following parameters:

| Component | Description (with Exemplary Type or Value) |
|---|---|
| FIG. 11A | |
| Y1 | Crystal, 16 megahertz |

-continued

Figure 11B:
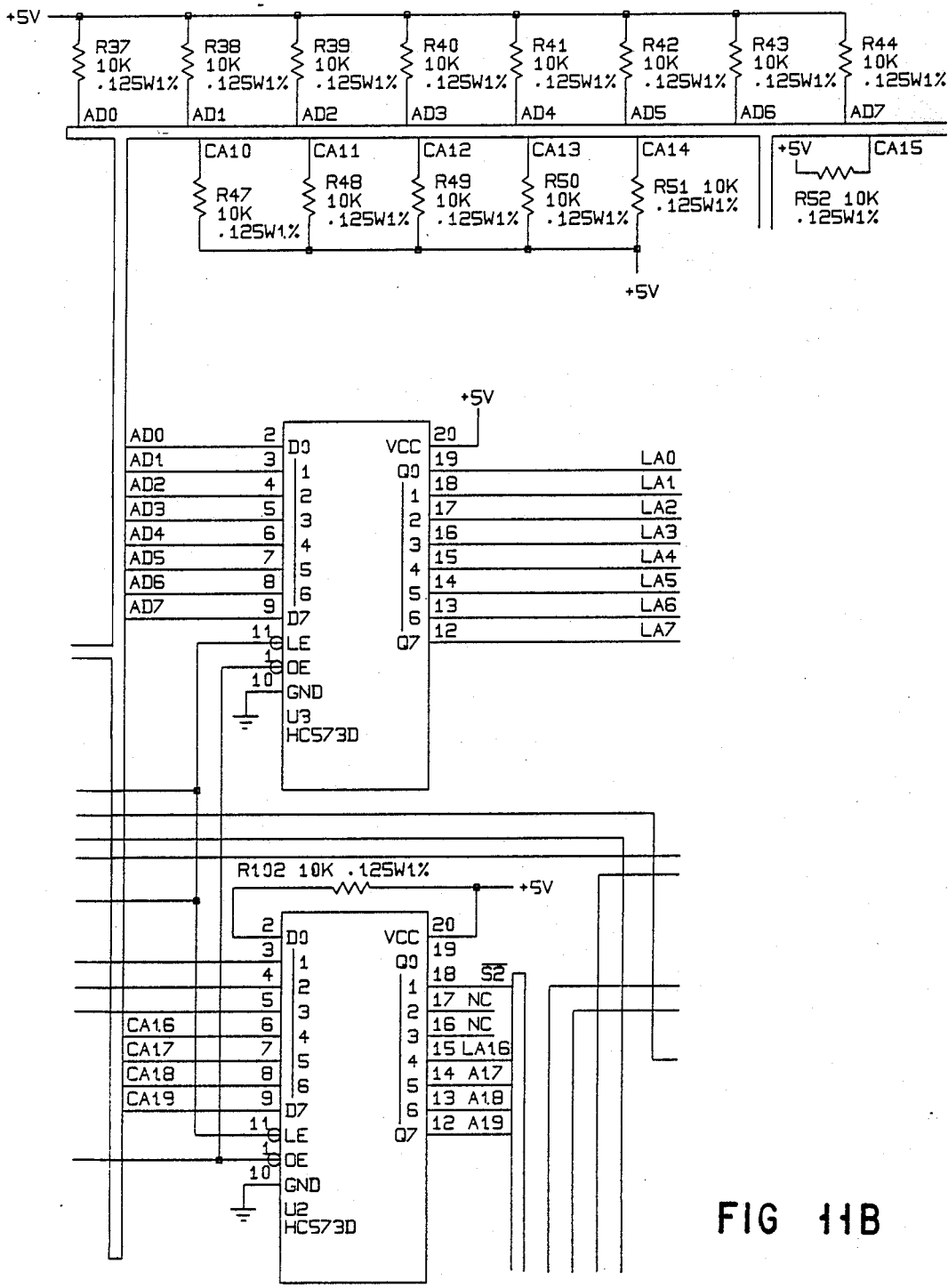
Figure 11C:
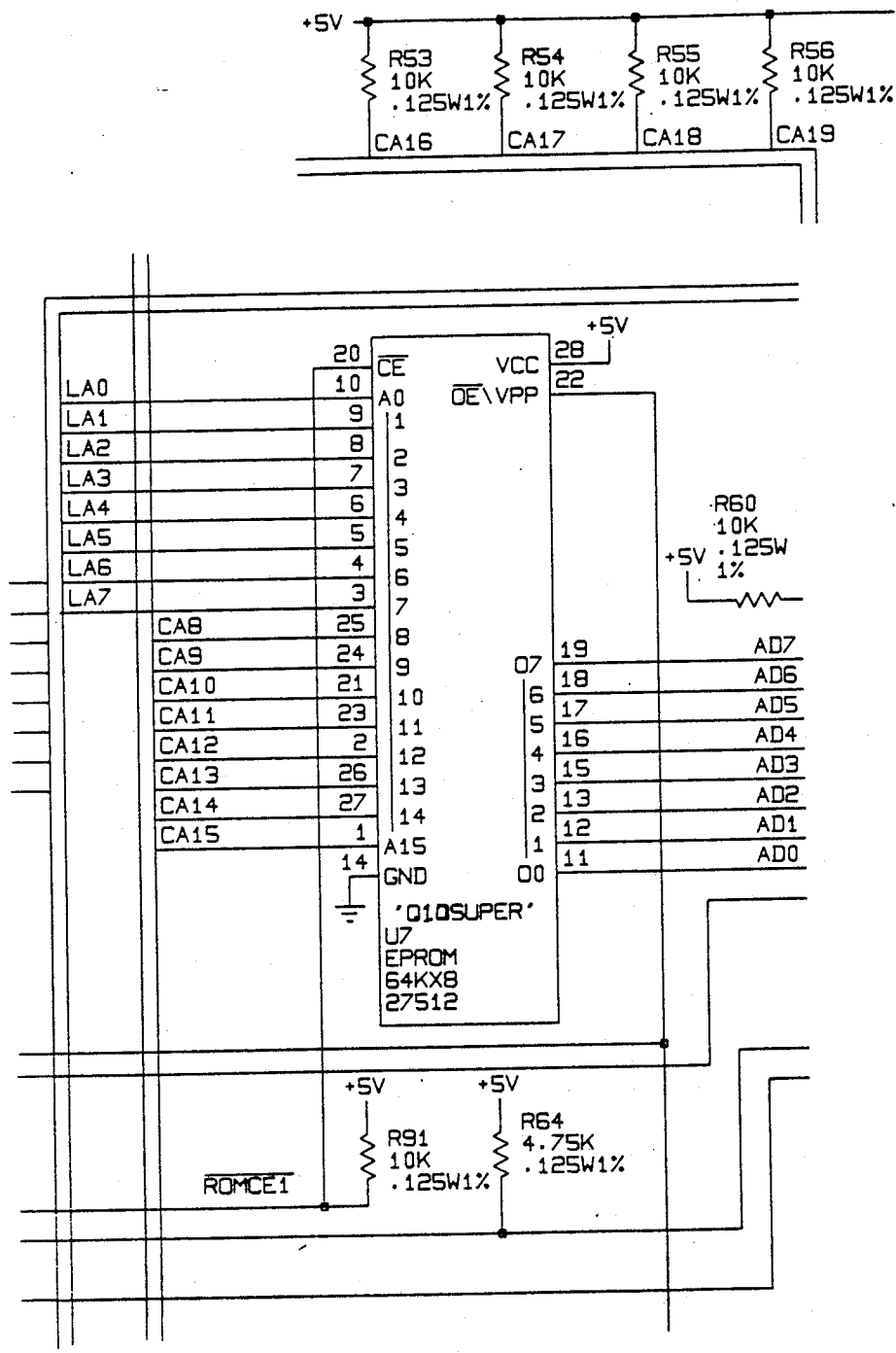
Figure 11D:
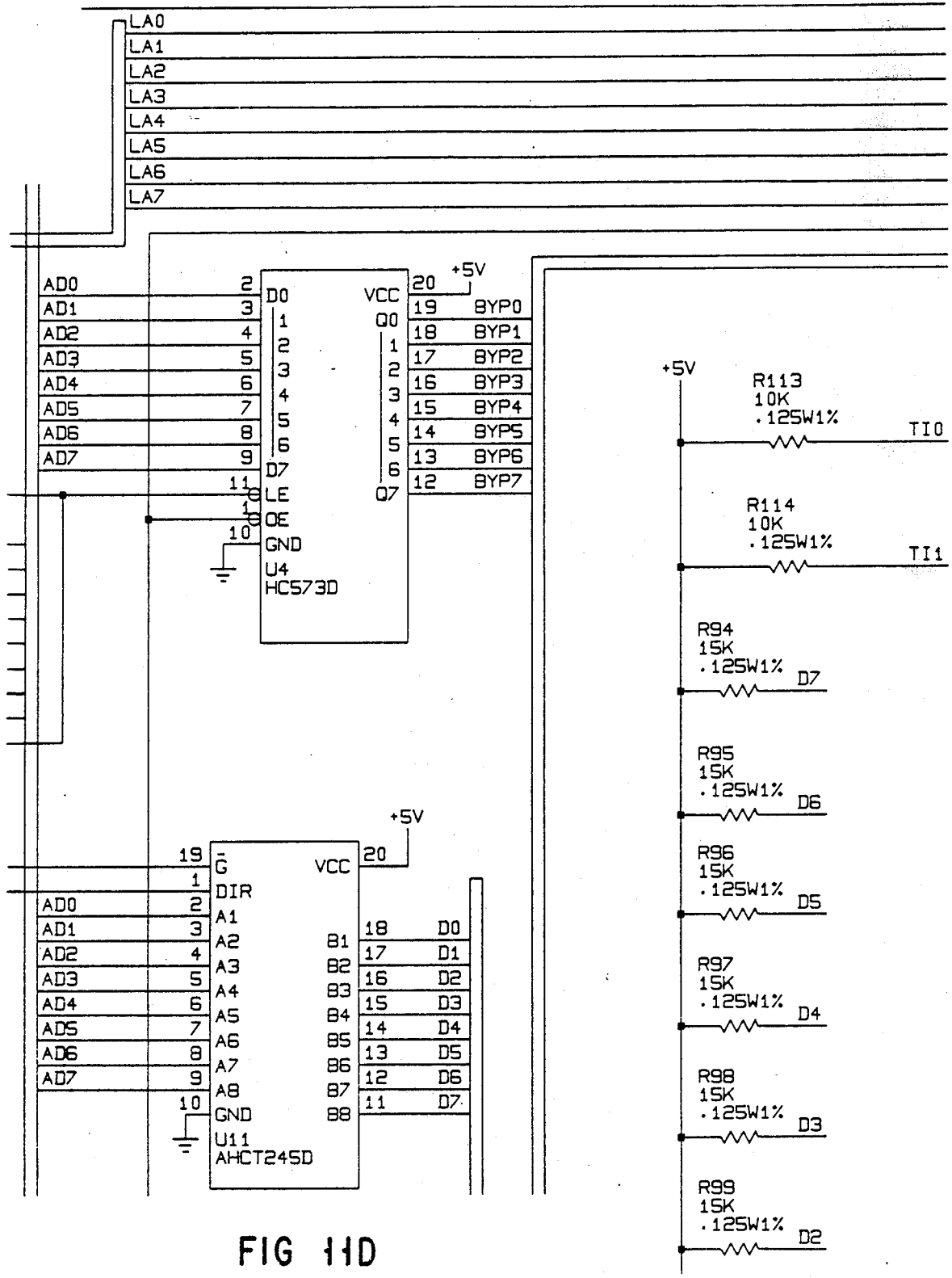
Figure 11E:
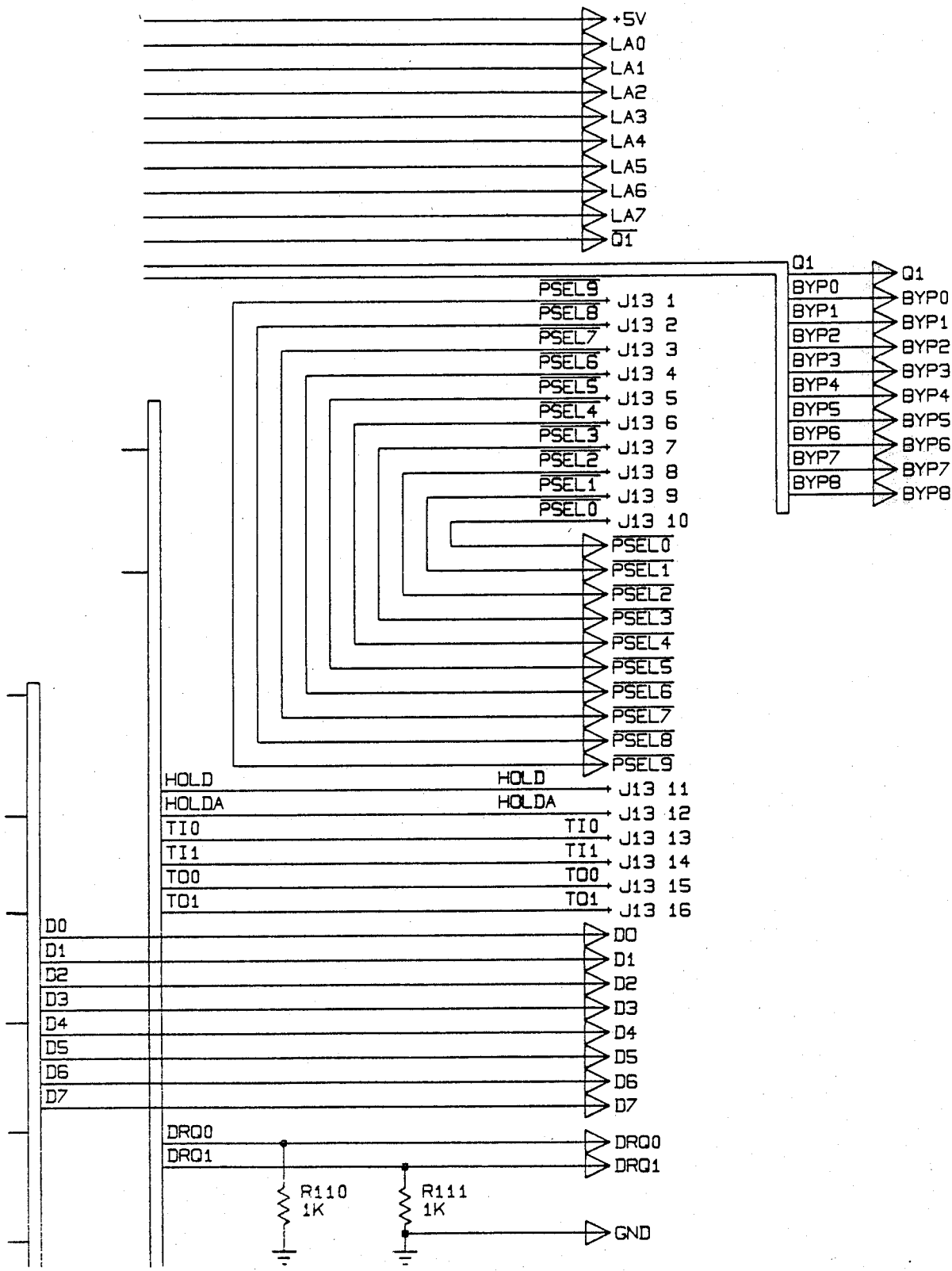
Figure 11F:
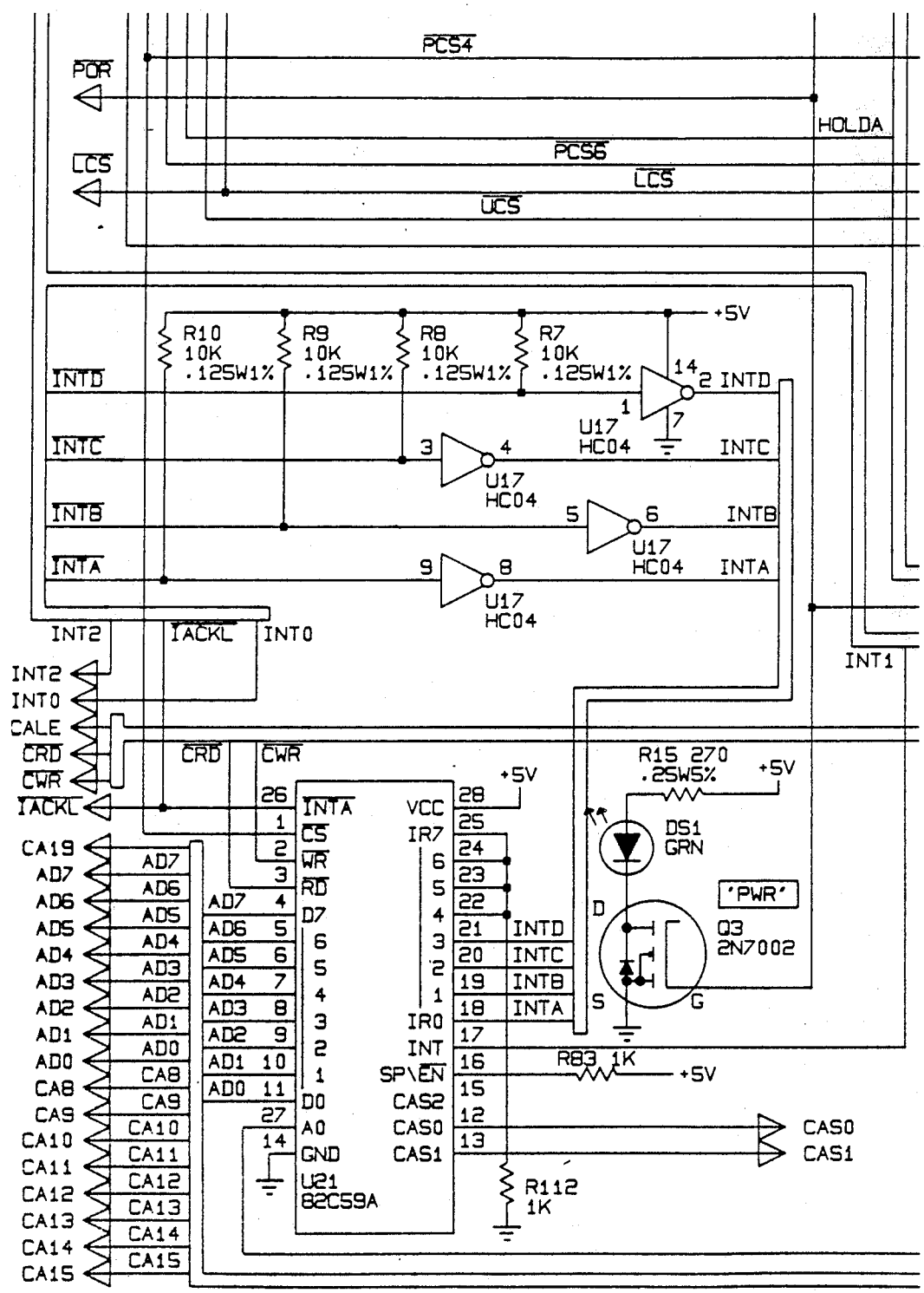
Figure 11G:
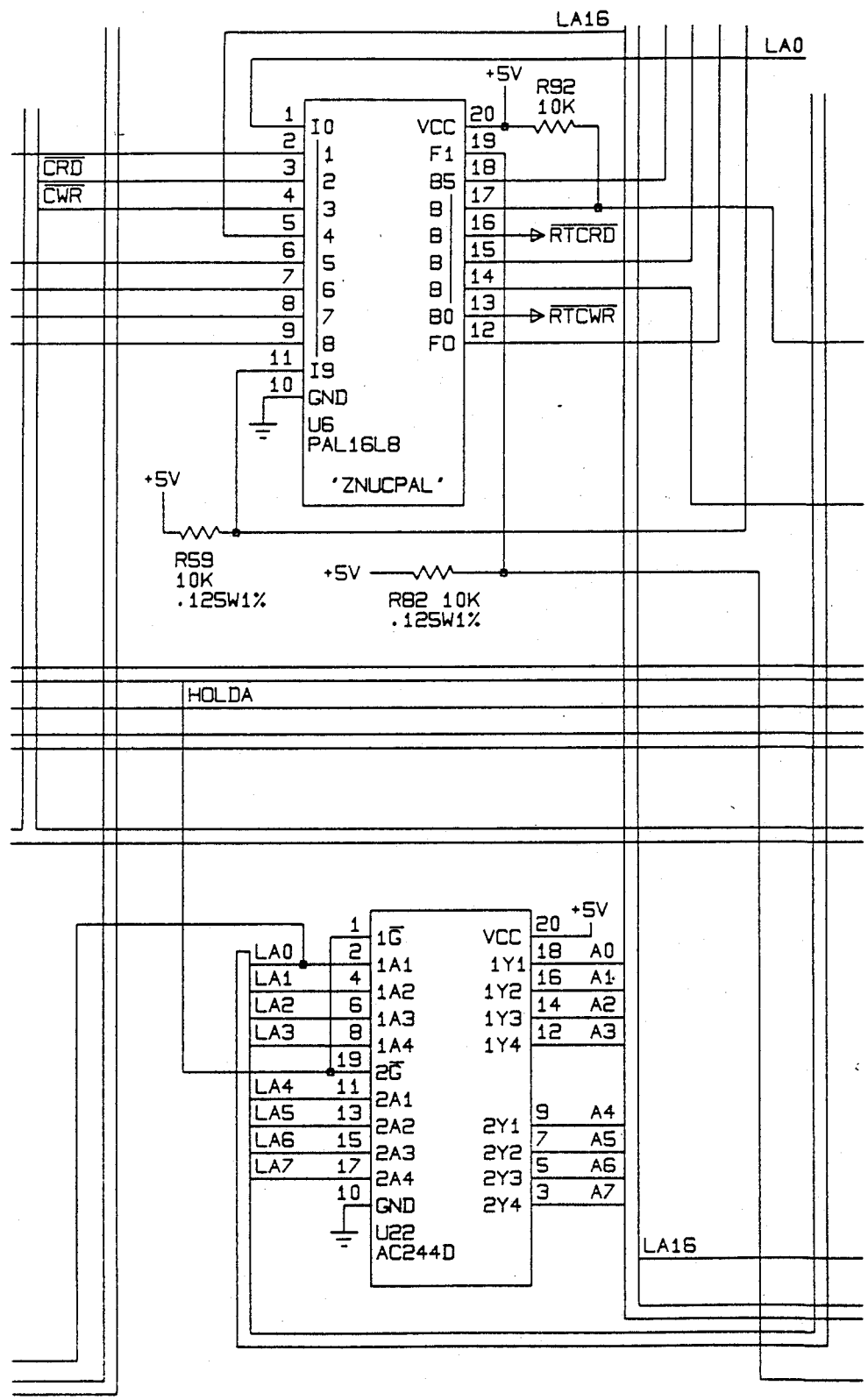
Figure 11I:
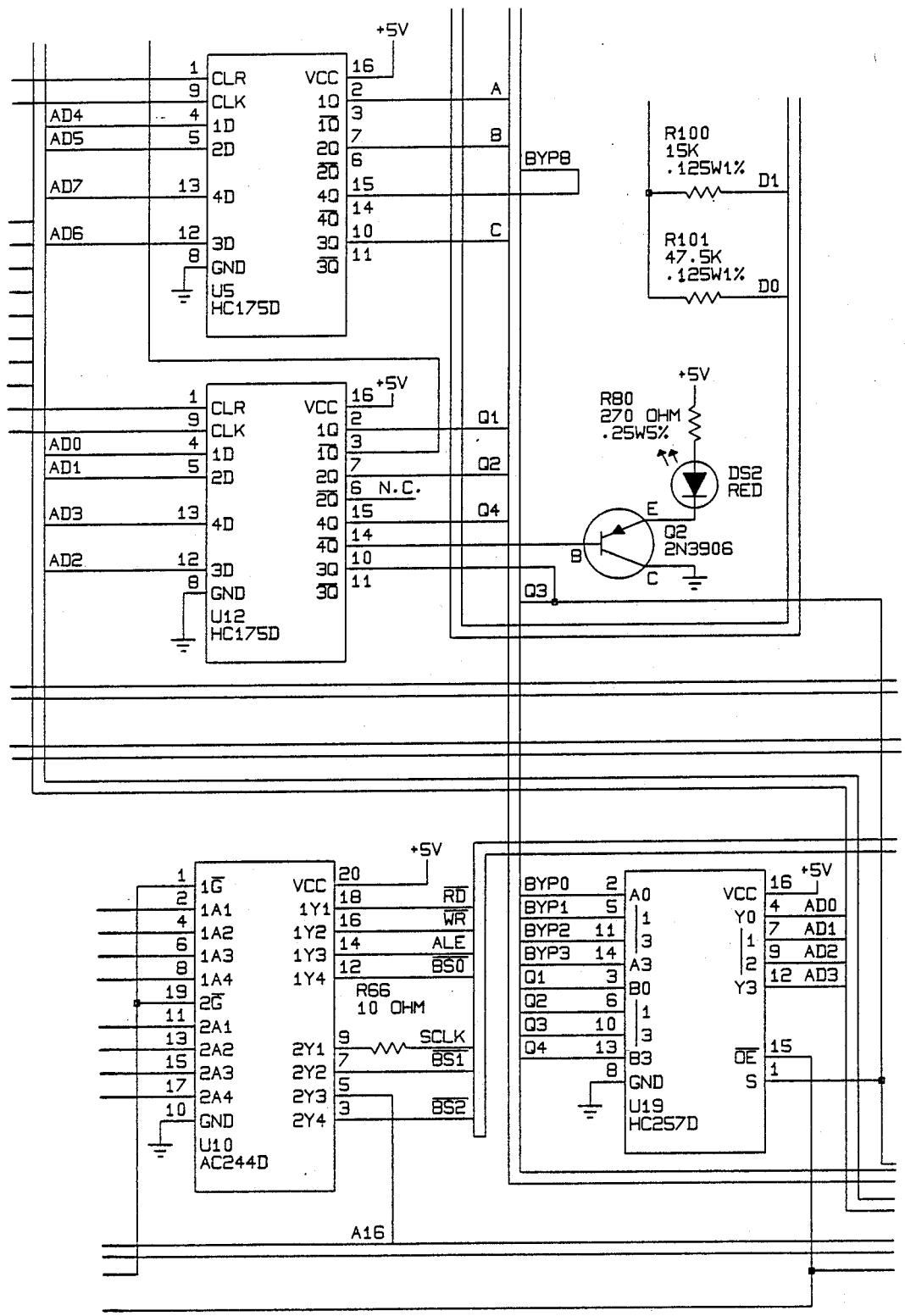
Figure 11J:
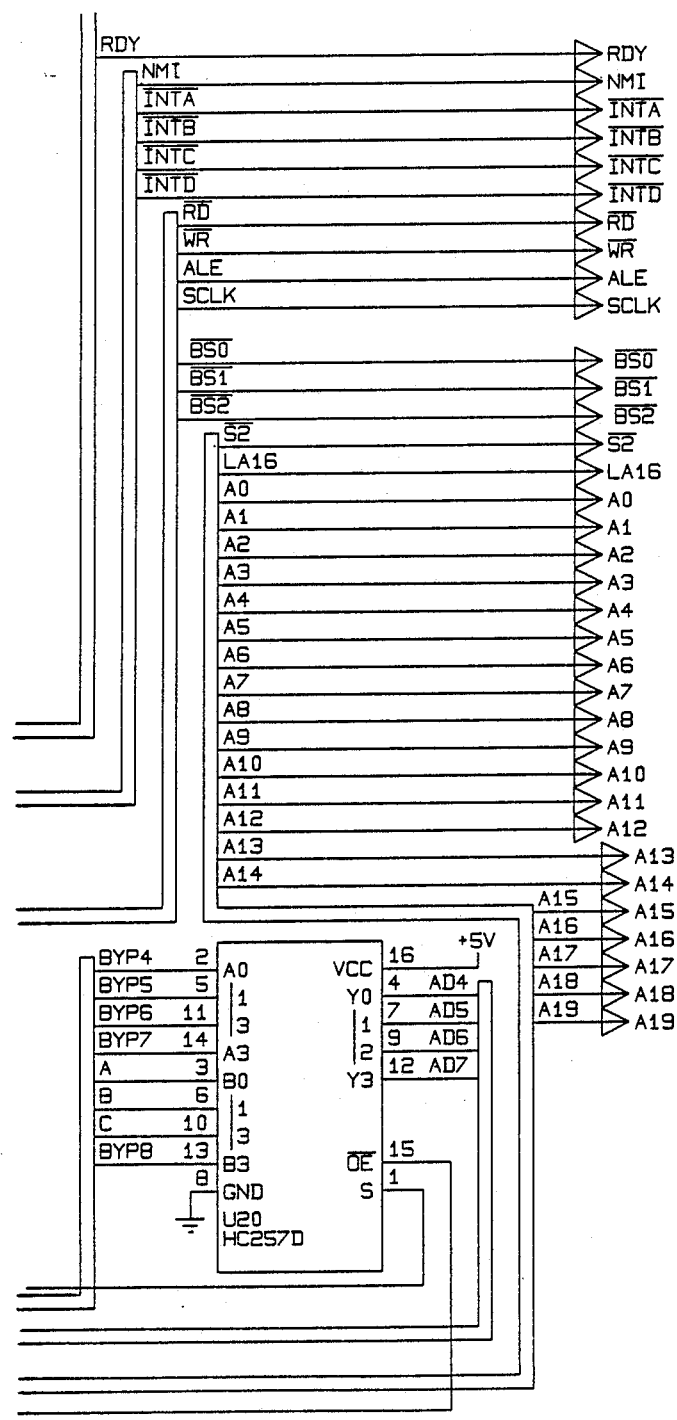
Figure 12A:
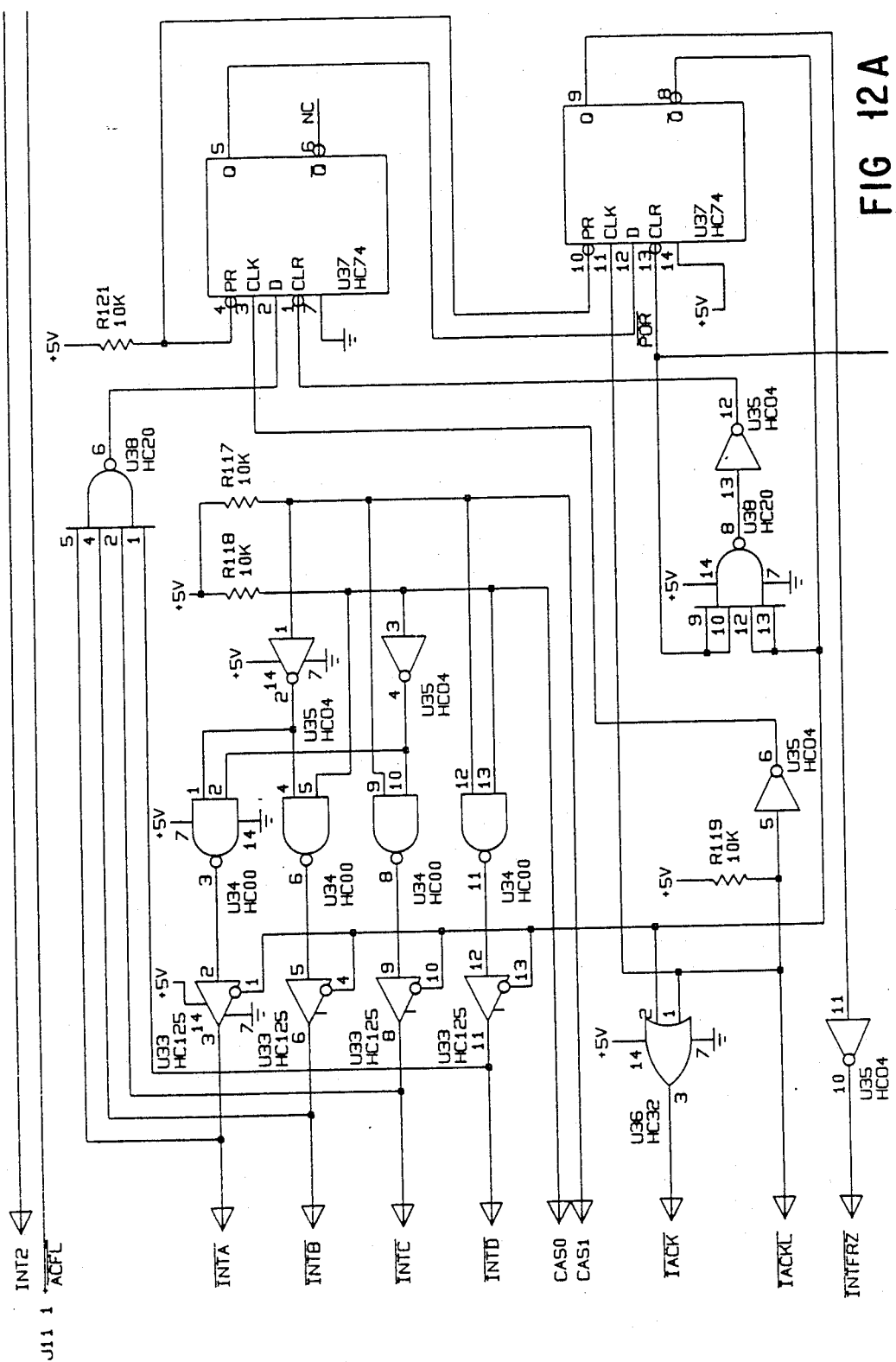
FIGS. 12A throuh 12I show further circuitry for the primary processor means of FIGS. 11A et seq., FIG. 12B being a continuation of FIG. 12A to the right, FIG. 12C being a continuation of FIG. 12B to the right, FIG. 12E being a continuation of FIGS. 12A and 12B in a downward direction and being a continuation of FIG. 12D to the right, FIG. 12F being a continuation of FIG. 12E to the right, FIG. 12G being a continuation of FIG. 12F to the right, FIG. 12H being a continuation of FIG. 12C in a downward direction and being a continuation of FIG. 12G to the right.
Figure 12B:
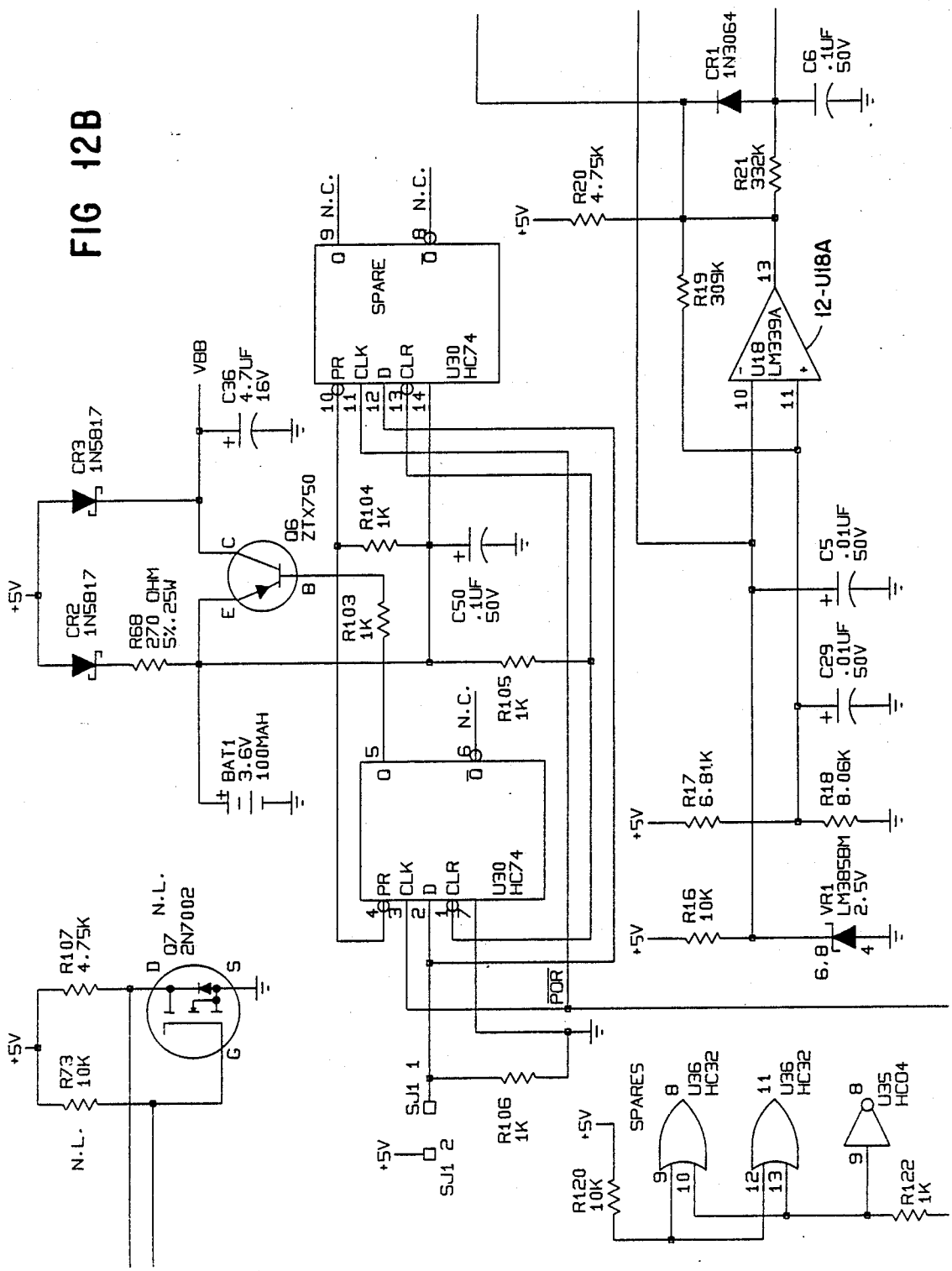
Figure 12C:
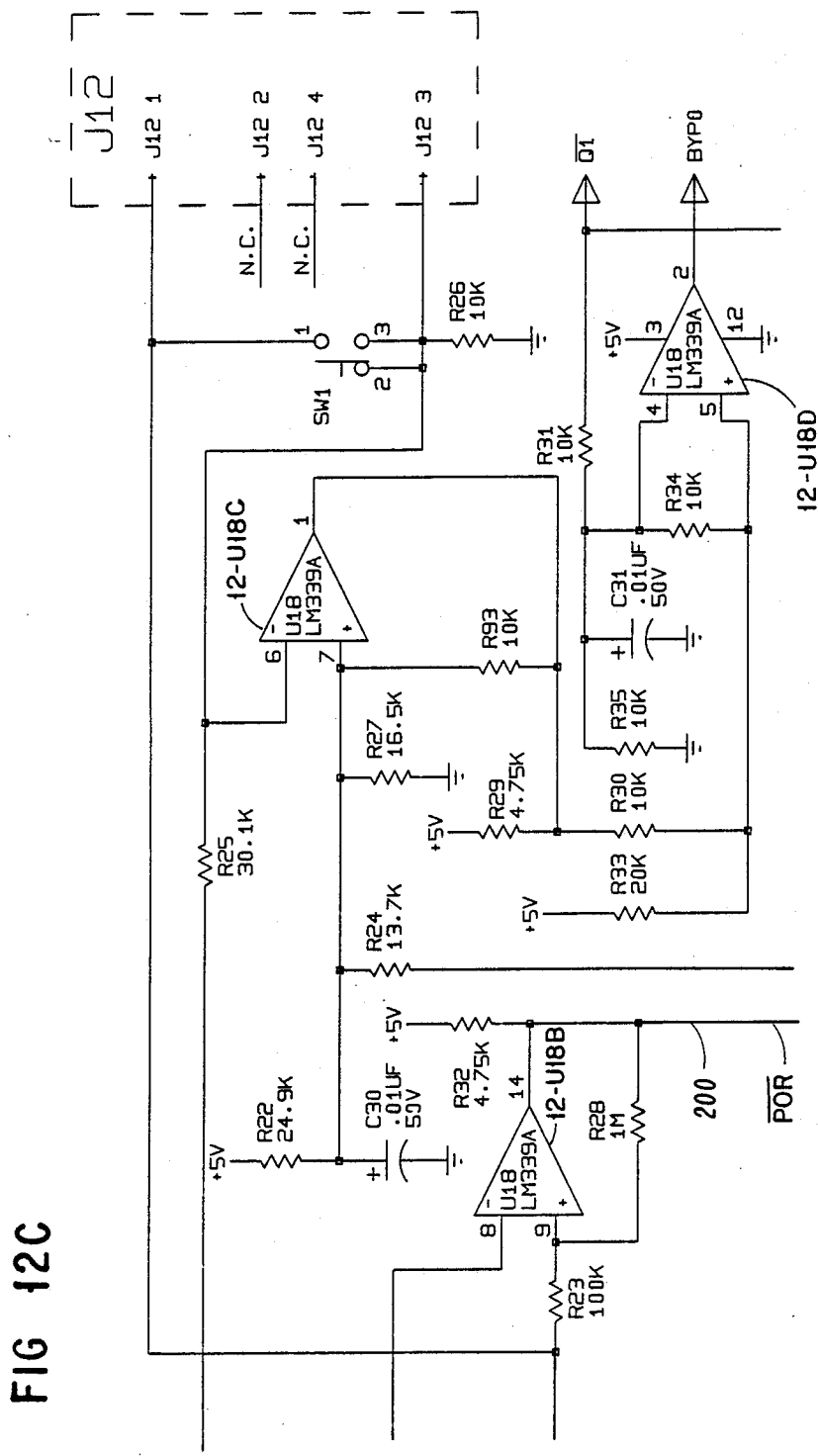
Figure 12D:
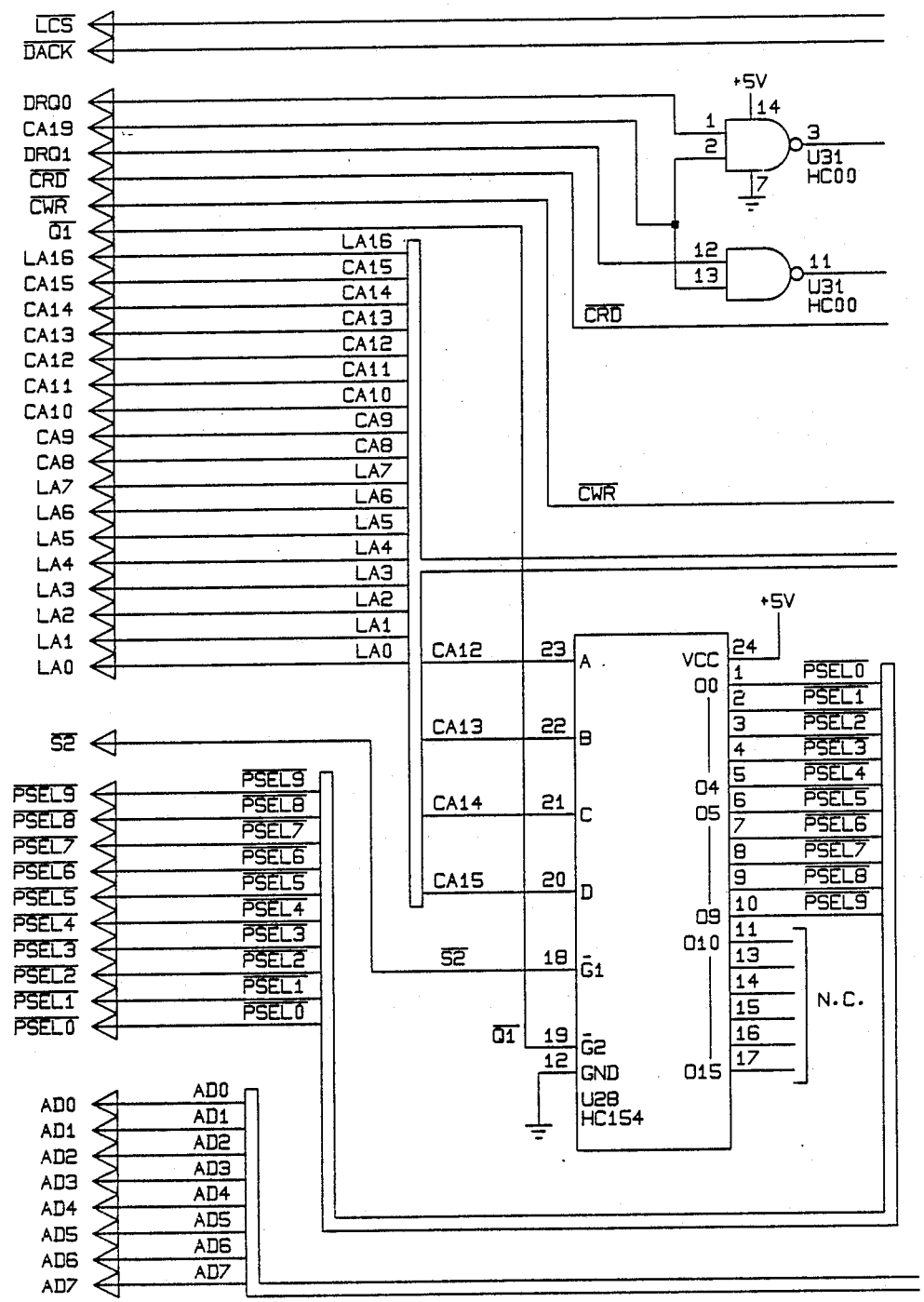
Figure 12E:
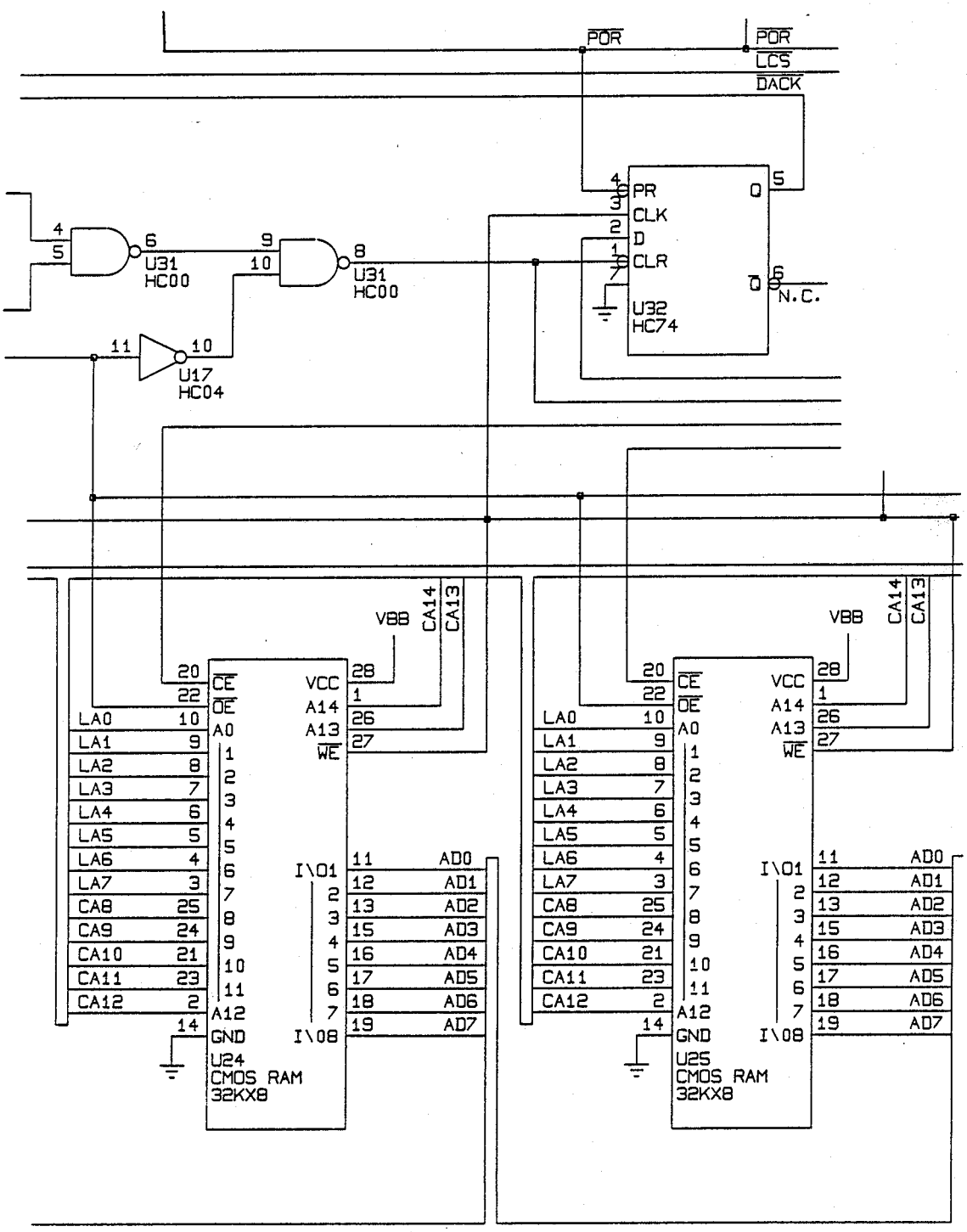
Figure 12F:
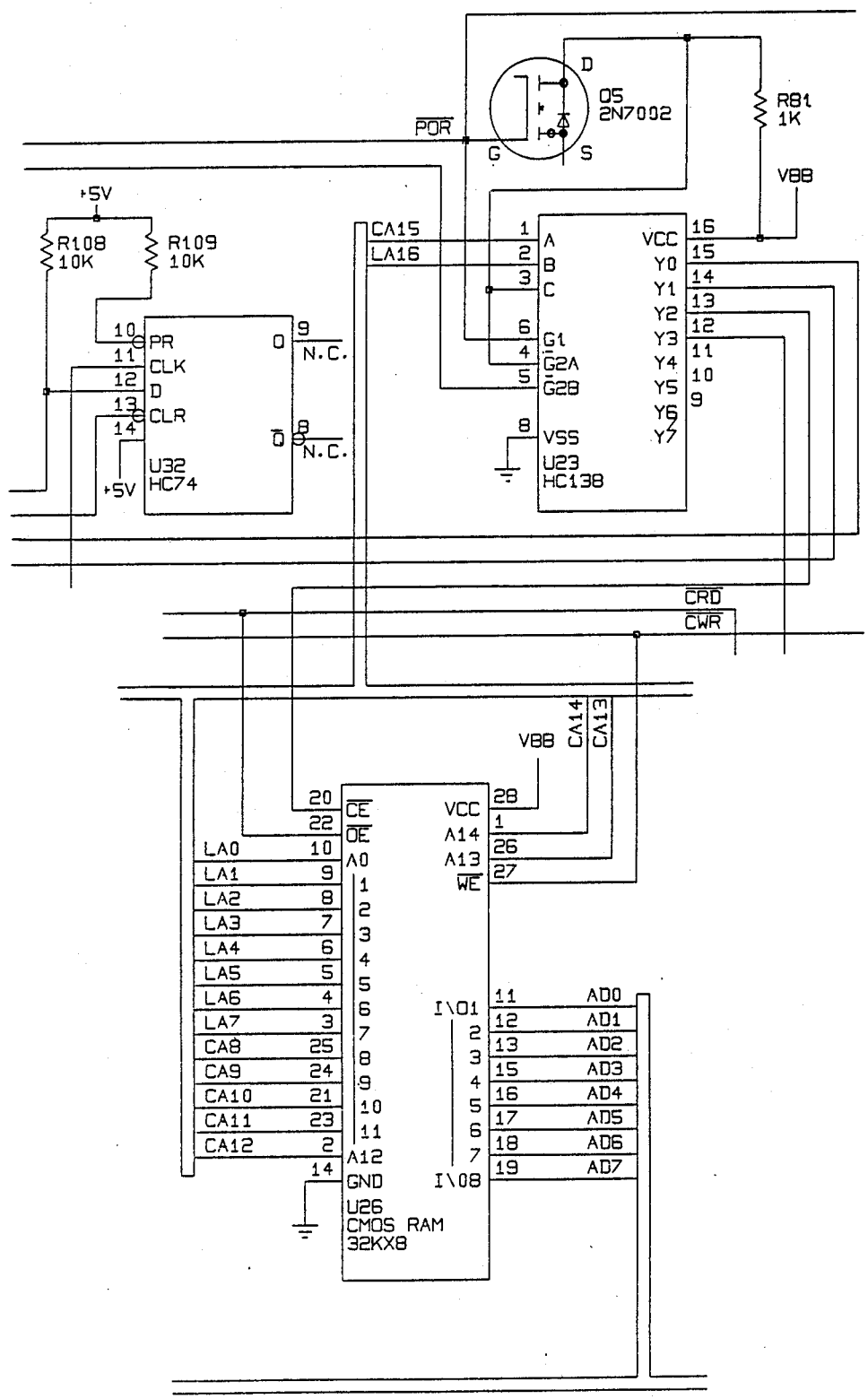
Figure 12G:
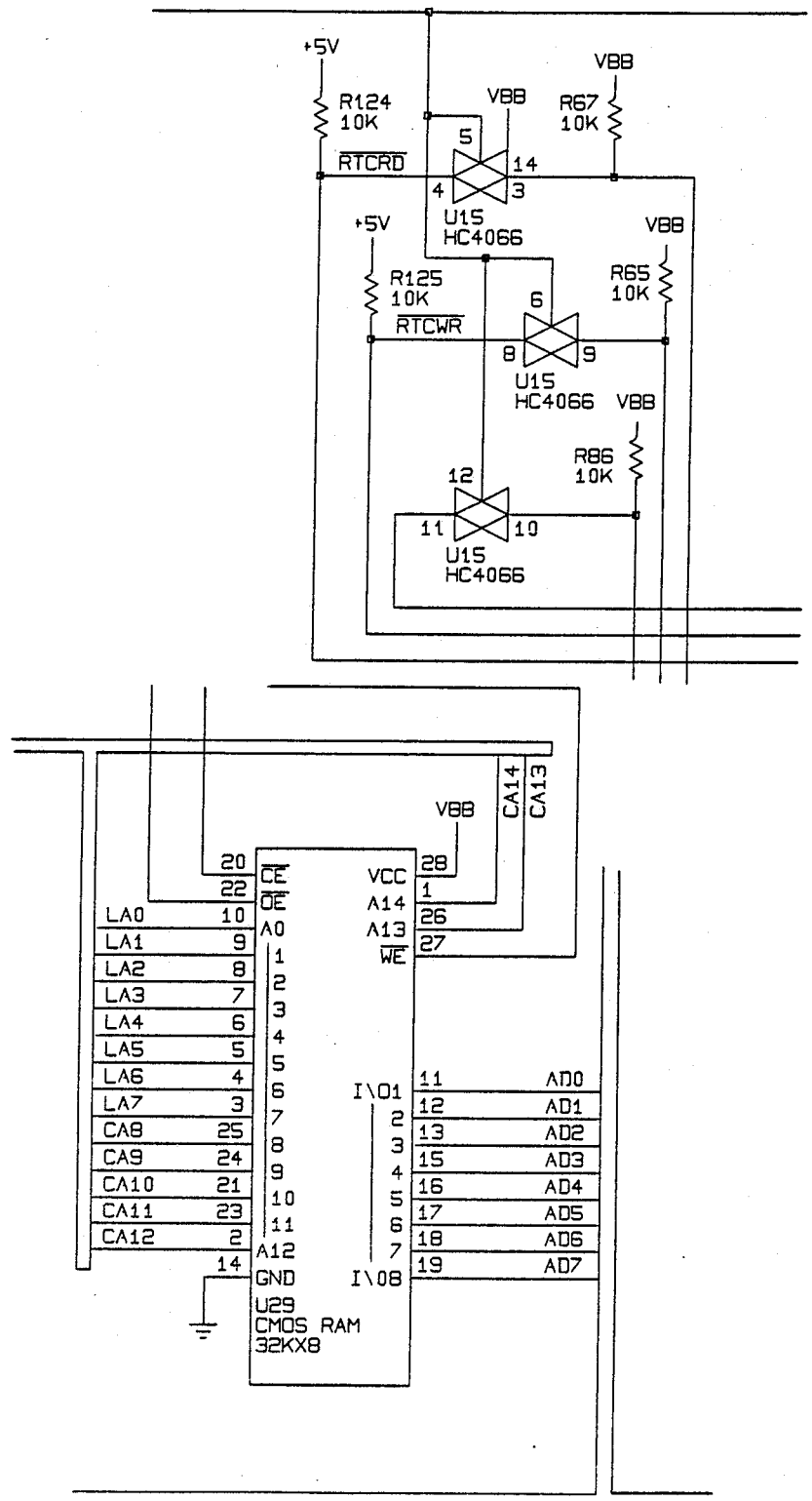
Figure 12H:
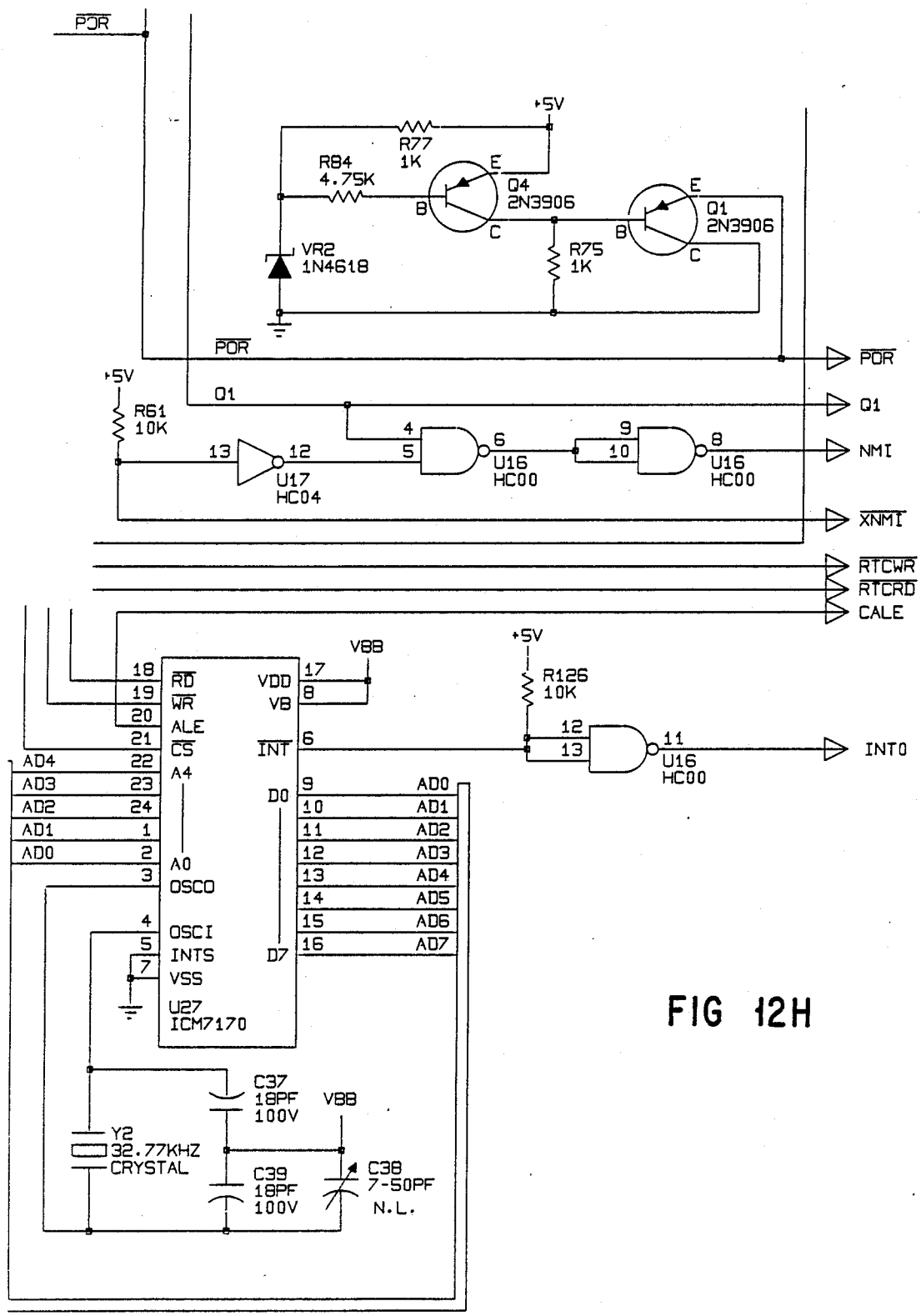
Figure 12I:
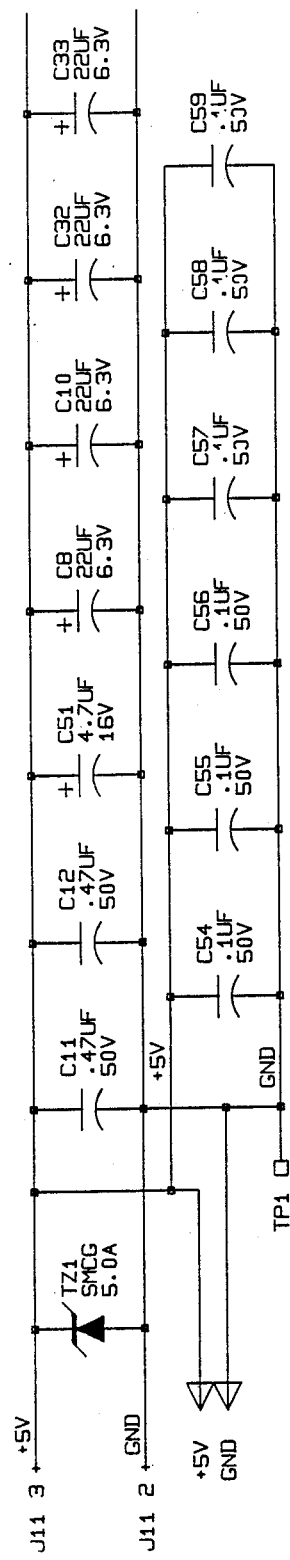
Figure 13A:
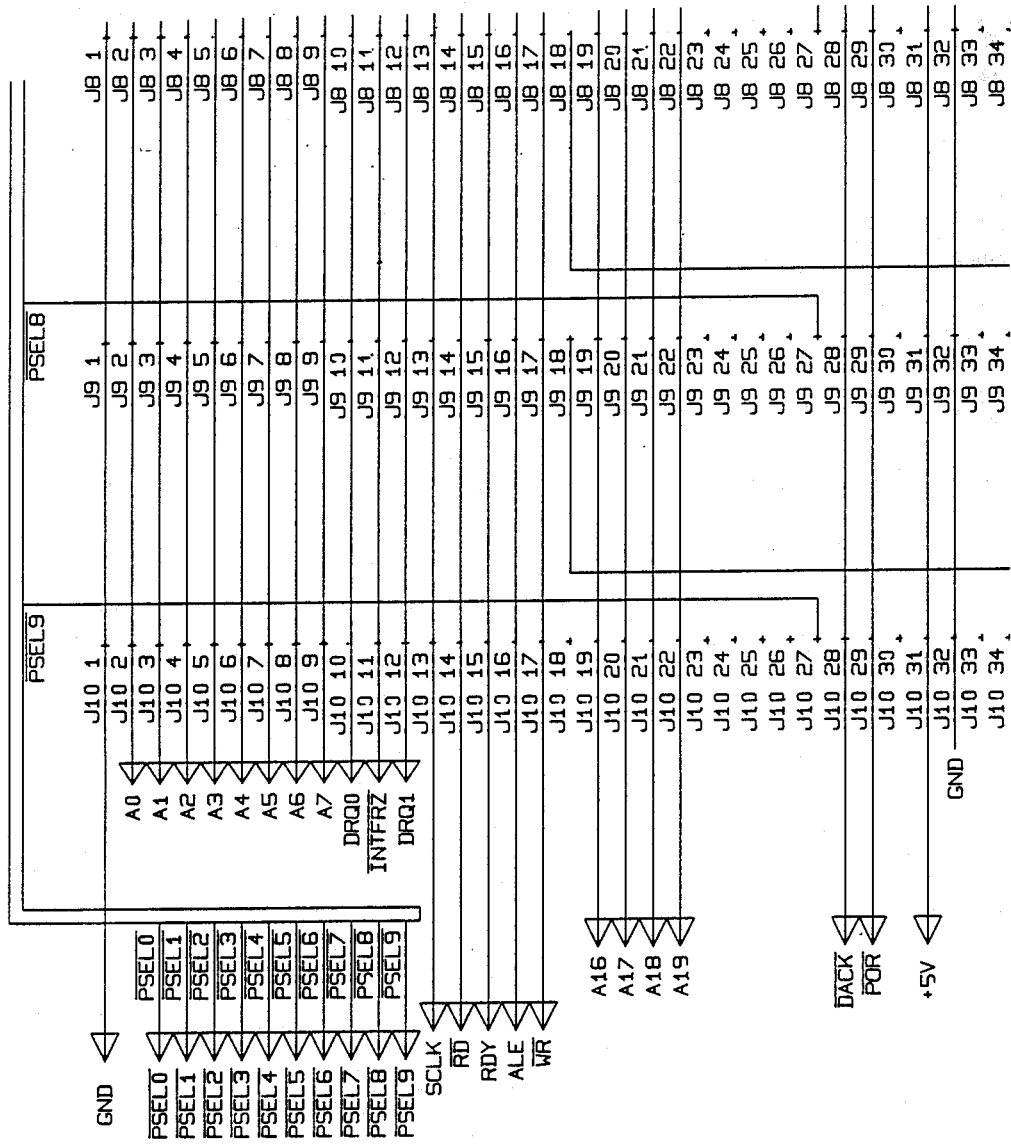
FIGS. 13A and 13B show a portion of the peripheral device connectors of the primary processor means of FIGS. 11A et seq.
Figure 13B:
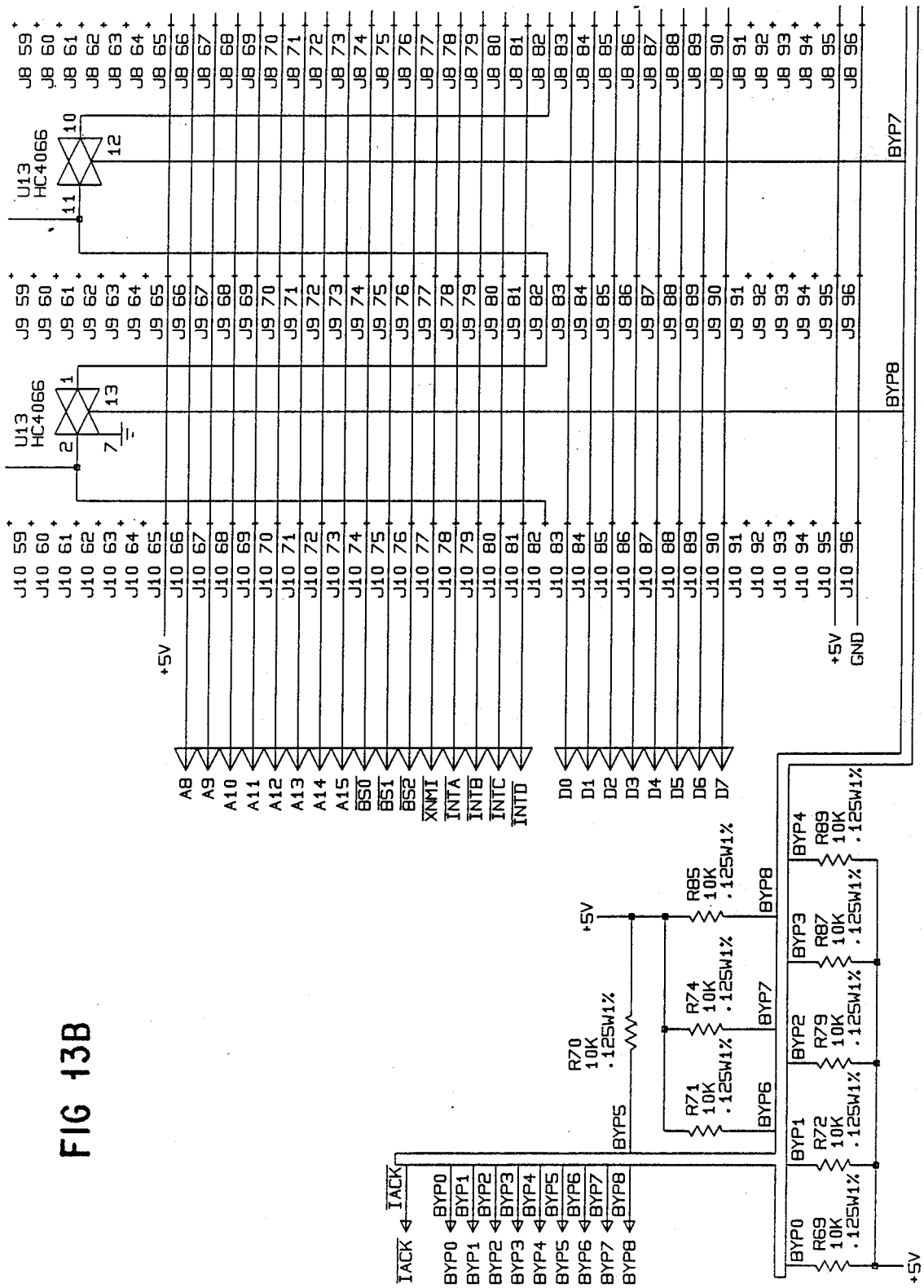

| Component | Description (with Exemplary Type or Value |
|---|---|
| U1 FIG. 11B | CPU, 80188 |
| U2, 3 FIG. 11C | Latch, 74HC573 |
| U7 FIG. 11D | EPROM, 64KX8, 27512 |
| U4 FIG. 11C | Latch, 74HC573 |
| U11, FIG. 11F | Transceiver 74AHCT245 |
| U17 | Inverter, 74HC04 |
| U21 | Interrupt Controller, 82C59A |
| DS1 | LED, Green |
| G3 FIG. 11G | Transistor, FET-2N7002 |
| U6 | Programmable Logic Array, PAL 16L8 |
| U22 FIG. 11H | Buffer, Driver, 74AC244 |
| U8 | EPROM 64K x 8, 27C512 |
| U9 FIG. 11I | Buffer, Driver, 74AC244 |
| U5, U12 | Quad Flip-Flop, 74HC175 |
| DS2 | LED, Red |
| Q2 | Transistor, 2N3906 |
| U10 | Buffer Driver, 74ACZ44 |
| U19 FIG. 11J | Quad Mux, 74HC257D |
| U20 FIG. 12A | Quad Mux, 74HC257D |
| U33 | Quad Buffer, 74HC125 |
| U37 FIG. 12B | Dual Flip-Flop, 74HC74 |
| Q7 | Transistor, 2N7002 |
| BAT1 | Battery, 3.6 volts, 100 milliampere-hours |
| CR2, 3 | Zener Diode, 1N5817 |
| Q6 | Transistor, ZTX750 |
| U30 | Flip-Flop, 74HC74 |
| VR1 | Zener Diode, LM3858M |
| U18 FIG. 12C | Comparator, LM339A |
| U18 | Comparator, LM339A |
| SW1 FIG. 12D | Switch, SPST |
| U28 FIG. 12E | Decode, 74HC154 |
| U32 | Dual Flip-Flop, 74HC74 |
| U24, 25 FIG. 12F | CMOS RAM, 32K × 8 |
| U32 | Dual Flip-Flop, 74HC74 |
| Q5 | Transistor, 2N7002 |
| U23 | Decoder, 74HC138 |
| U26 FIG. 12G | CMOS RAM, 32K × 8 |
| U15 | Analog Switch, 74HC4066 |
| U29 FIG. 12H | CMOS RAM, 32K × 8 |
| VR2 | Zener Diode, 1N4618 |
| Q1, Q4 | Transistor, 2N3906 |
| U27 | Real Time Clock, ICM7170 |
| Y2 FIG. 13B | Crystal, 32.77KHZ |
| U13 | Analog Switch 74H4066 |

Discussion Re FIGS. 11A-11J, 12A-12I, and 13A-13B, 14A-14-C, and 15-17

The primary processor U1, FIG. 11A may be the Intel 80188. This processor may run at eight megahertz. This CPU does the applications (point of sale) processing and handles all the communication between devices in the expansion ports and the rest to the system. In addition to the microprocessor, the 80188 also has a two channel direct memory access (DMA) controller, three sixteen-bit timers, a clock generator, programmable wait state generator and programmable chip select generation logic. These integrated features may be used to enhance the processing capability of the primary processing means (FIG. 2) while reducing the board size, or module size, and component count.

The 80188 is a complex microprocessor and has many internal registers which dictate how it will function internally and the manner in which its outputs will function. Reference is made for example to the Intel 80188 Hardware and Programmers Users Reference Manuals.

Power Control/Monitor

This block of circuitry includes components in FIGS. 12B and 12C which monitor the incoming plus five volt supply to ensure proper operational supply limits. If the supply falls outside these limits, the primary processing means and any expansion port devices will be reset. This block of circuitry will also filter and clamp transients on the five volt line, and may define the following parameters:

Vcc lower limit =4.5V
Vcc clamp limit =7V
Reset pulse width =20ms minimum

The output of this circuit (POR) is indicated at line 200, FIG. 12C, and is an active low bi-directional line. This signal goes to the 80188 and the configuration registers as well as each expansion port connector. When activated (either by the reset circuit or from an expansion port) it will reset the 80188, any devices in the expansion ports and disable the configuration registers. There is a connector available which is in parallel with the reset switch. This will enable an external chassis mounted reset button to be incorporated into the system when desired.

The primary stages of the reset circuit are similar to reset circuits used on other A-Line products. There are two additional stages which will allow the microprocessor to determine whether a manual (push button) reset has occurred or whether a power on reset has occurred. This information can be obtained using the B control register of the primary processor means.

With respect to detection of a low supply voltage, reference is made to a copending patent application of David C. Hacker U.S. Ser. No. 797,235 filed Nov. 12, 1985, attorney's case 85,1870; and the disclosure of this patent application including the drawings is hereby incorporated herein by reference in its entirety.

Power Requirements

The maximum current required by a fully loaded primary processor means, excluding expansion port devices, is 750 milliamperes. Only a single five volt supply is required by the primary processor means and distributed to the expansion ports.

Power Supply

A preferred power supply for the point of sale terminal 50, FIG. 5 et seq., is shown in detail in an application for patent of David C. Conway entitled "UNIVERSAL POWER SUPPLY, PARTICULARLY FOR COMPUTERIZED POINT OF SALE CONSOLE OR THE LIKE", attorney's case DN6080, being filed of even date herewith, and the disclosure including the drawings of said application for patent is hereby incorporated herein by reference in its entirety.

Primary Processor Board Memory

EPROM's are used to contain a basic boot strap routine, interrupt vector pointers, and other pertinent information. The boot strap EPROM is located at the upper end of memory and has a maximum size of 128K bytes. Refer for example to FIGS. 11C and 11H.

Two sockets ar available to load memory devices. The maximum size part compatible with these sockets is 64K bytes. The smallest device that can be loaded is 64K bytes. Upon power-up both slots can be activated by the 80188 (via UCS). (Only 1K byte of the uppermost slot U7, FIG. 11C, will be active until reprogrammed. The 80188 must immediately program its internal control registers to select the size and location of memory in these slots.

The UMCS register in the 80188 must be programmed to be the sum of the size of the memory chips installed or larger. If not, only a portion of the memory will be accessed.

80188 CPU (U1, FIG. 11A, hereafter referred to as the 80188 or '188). The RTC can interrupt the 80188 independently of the expansion port interrupt lines and is fed into the 80188 INTO input.

Expansion Ports

The ten expansion ports are designed with all the address, data, power, and control lines that will enable different types of devices to be inserted. The flexibility of the expansion ports allows memory or peripherals to be inserted. The expansion ports also allow for future upgrading to a thirty-two bit system. The electrical parameters of the expansion ports have been set up to take advantage of CMOS devices. Each expansion port is independent of the others and can be I/0 mapped, memory mapped or automatically selected.

The Table on the following page gives a listing of the signals on each pin of the expansion ports such as indicated in FIGS. 13A ad 13B:

TABLE I

Primary Processor Expansion Port Pinout

| Row C | Pin | Row B | Pin | Row A | Pin | Definition |
|---|---|---|---|---|---|---|
| +5 V | 65 | Reserved | 33 | GND | 1 | Power |
| A8 | 66 | (A24) | 34 | A0 | 2 | |
| 99 | 57 | (A25) | 35 | A1 | 3 | |
| A10 | 68 | (A26) | 36 | A2 | 4 | Address |
| A11 | 69 | (A27) | 37 | A3 | 5 | Lines |
| A12 | 70 | (A28) | 38 | A4 | 6 | A0 thru A15 |
| A13 | 71 | (A29) | 39 | A5 | 7 | |
| A14 | 72 | (A30) | 40 | A6 | 8 | |
| A15 | 73 | (A31) | 41 | A7 | 9 | |
| BS0 | | | | | | |
| BS1* | 74 | (D24) | 42 | DRQ0ERZ | 10 | |
| BS2** | 75 | (D25) | 43 | | 11 | |
| XNMI | 76 | (D26) | 44 | DRQ1 | 12 | Status |
| INTA | 77 | (D27) | 45 | SGLK | 13 | Control & |
| INTB | 78 | (D28) | 46 | | 14 | Interrupt |
| INTC | 79 | (D29) | 47 | RDY | 15 | Lines |
| INTD | 80 | (D30) | 48 | ALE | 16 | |
| JACKIN | 81 | (D31) | 49 | JACKOUT | 17 | |
| D0 | 83 | Reserved | 51 | A16 | 19 | |
| D1 | 84 | (D9) | 52 | A7 | 20 | |
| D2 | 85 | (D10) | 53 | A18 | 21 | Data lines |
| D3 | 86 | (D11) | 54 | A19 | 22 | D0 thru D15 |
| D4 | 87 | (D12) | 55 | (A20) | 23 | Address lines |
| D5 | 88 | (D13) | 56 | (A21) | 24 | A16 thru A23 |
| D6 | 89 | (D14) | 57 | (A22) | 25 | |
| D7 | 90 | (D15) | 58 | (A23) | 26 | |
| | | | | PSEL | 27 | |
| (D20) | 91 | (D16) | 59 | DACK | 27 | |
| (D21) | 92 | (D17) | 60 | POR | 28 | |
| (D23) | 94 | (D18) | 61 | Reserved | 30 | Power |
| +5 V | 95 | Reserved | 63 | +5 V | 31 | |
| GND | 96 | Reserved | 64 | GND | 32 | |

RAM Memory

FIGS. 12E, 12F and 12G show 128K bytes of CMOS static RAM with battery backup, for example as indicated at 24, FIG. 2 and at 37, FIGS. 3 and 4, and at BAT1, FIG. 12B. The static RAM is located at the lower end of the memory space as shown in FIG. 14A. It consists of four 32K×8 RAM chips. Battery backup is provided by a 3.6 volt nickel cadmium battery pack. Minimum battery backup time is two weeks.

Real Time Clock (RTC)

This component conforms with the description of RTC chip 25, FIG. 2. The RTC will keep accurate time as long as the battery maintains at least a two volt supply (measured at the RTC chip). The RTC (U27, FIG. 12H) is accessed via the chip select line PCS5 of the In a first generation of primary processor module, Row B is not loaded. These pins (thirty-three through sixty-four, Table I) are to be used on future thirty-two bit designs. This connector scheme allows eight bit expansion port devices designed presently to carry over into thirty-two bit designs in the future, which are also specifically disclosed hereby, reducing development time and cost.

Address lines (A24) through (A3)) in conjunction with address lines A0 to A19 and (A20) through (A23), and in conjunction with a thirty-two bit primary processor system, may be used e.g, to address a large capacity random access memory whose output connects with all thirty-two data lines. The lines shown in parentheses in Table I are to be used for example in this type of enhanced point of sale system. Such enhanced point of sale systems are hereby specifically disclosed herein.

Expansion Port Electrical Specifications

The majority of the signals on the expansion ports are common to each port. There are some differences on certain functions on the ports. These differences are intended to utilize the 80188 capabilities to the maximum while keeping system cost to a minimum, but all signals at each of the expansion ports is hereby also specifically disclosed herein.

The characteristics of the lines associated with the expansion port signals of Table I are summarized as follows (wherein "mA" stands for milliamperes; "uA" stands for microamperes, "pF" means picofarads; and "K" means "kilobytes", i.e., 1024 bytes): $D_0$–$D_{15}$ - Bi-directional data bus which is active whenever an expansion port is selected. Any expansion port device on a data line must be able to sink 4mA and source 4mA. The load presented by any expansion port device must not exceed 400uA or 50pF.

$A_0$–$A_{23}$ - Unidirectional buffered address bus. All addressing is generated from the 80188. This bus is active whether or not an expansion port is selected. Any expansion port device on an address line must not exceed an input load current of 400uA or capacitance of 50pF.

$PSEL_0$–$PSEL_9$ - Port select lines which can be used to select a particular expansion port. These lines are mapped into the lower 40K of the '188 I/O space. Refer to FIG. 14B for mapping. Maximum allowable load current is 4mA.

INTA-INTD - These signals allow an expansion port device to interrupt the '188. These are maskable interrupts. Any device connecting to these lines must be able to sink 4mA. All ports are considered as wired-or. See the Interrupt section hereafter which is headed "Interrupts" for more information.

INTFR2 - This is the interrupt freeze line. It is a unidirectional signal output during the interrupt sequence. See the Interrupt section for more details. The load presented by any expansion port device must not exceed 400uA.

IACKIN, IACKOUT - These signals form part of the interrupt acknowledge change IACKIN is the acknowledge signal from the previous board and IACKOUT is the output from the particular expansion port slot a board is in. Maximum input load for IACKIN is 0.4mA. IACKOUT should be able to source 4mA.

NMI - This signal is the non-maskable interrupt on the '188. This signal is considered a wired-or. Devices on this line must be able to sink 2mA.

SCLK - This single is the buffered 8MHZ output provided by the '188. The load presented by any expansion port device must not exceed 400A or capacitance of 50pF.

ALE - This signal is the buffered address latch enable output of the '188. The maximum load on this line should not exceed 400uA or 50pF.

DMARQ0-DMARQ1 - These are the DMA request lines. This line is considered a wired-or. Any device connecting to this lien must be able to source 4mA.

DACK - This signal provides a DMA acknowledge for both DMA channels. The maximum load on this line should not exceed 400uA or 50pF.

BS0, BA1, BS2 - These buffered status lines indicate the type of cycle being executed by the '188. The coding of these lines is shown in FIG. 15. The maximum loading allowable on these lines is 400uA.

RDY - This signal allows slower peripherals to insert wait states into the '188 machine cycles. This line need not be terminated if unused. Any device connecting to this signal must be able to source 4mA. This signal is also a wired-or.

RD - Signal indicates a read operation Maximum loading is

WR - Signal indicates a write operation. Maximum loading is 400uA.

5V - Five volt power supply to expansion port devices. Limit expansion port device current consumption to one ampere.

POR - Active low reset signal. This signal is a wired-or and therefore allows an expansion port device to reset the processor system. Any connecting device must be capable of sinking 4mA.

The following Table II give exemplary expansion port device operating conditions, and indicates exemplary functions which may be obtained by writing different bit values into the A and B Expansion Registers:

TABLE II

Exemplary Maximum Expansion Port Device Operating Conditions and Exemplary Expansion Port Control As A Function of A anc B Register Bit Configuration

| Description | Maximum Expansion Port Device Operating Conditions | | | | |
|---|---|---|---|---|---|
| | $I_{IL}$ | $I_{OH}$ | $I_{IH}$ | $I_{OL}$ | $C_L$ |
| $A_0$–$A_{23}$, $\overline{INTFRZ}$, $\overline{IACKIN}$ | .4 mA | — | .4 mA | — | 50 pF |
| $D_0$–$D_8$ | .4 mA | 4 mA | .4 mA | 4 mA | 50 pF |
| $\overline{PSEL_0}$–$\overline{PSEL_9}$ | 4 mA | — | 4 mA | — | 50 pF |
| NMI | — | — | — | 2 mA | — |
| $\overline{WR}$, SCLK, ALE, RD, DACK | .4 mA | — | .4 mA | — | 50 pF |
| DRQ0, DRQ1, IACKOUT | — | 4 mA | — | 2 mA | — |
| $\overline{BS0}$, $\overline{BS1}$, $\overline{BS2}$ | .4 mA | — | .4 mA | — | — |
| POR, INTA–INTD | .4 mA | .4 mA | .4 mA | 4 mA | — |

$I_{IL}$ = Current flow out of device when in input mode at Vin low level.
$I_{OH}$ = Current flow out of device when in output mode at Vout high level.
$I_{IH}$ = Current flow into device when in input mode at Vin high level.
$I_{OL}$ = Current flow into device when in output mod at Vout low level.
$C_L$ = Load capacitance including stray capacitances

| Exp. Port Register A | | | Exp. Port Register B | | |
|---|---|---|---|---|---|
| Bit | Port | Definition | Bit | Port | Definition |
| 0 | 0 | 1 = Bypass | 0 | — | 1 = Reg. A, NMI Enable |
| 1 | 1 | 1 = Bypass | 1 | — | Not Used |
| 2 | 2 | 1 = Bypass | 2 | — | Reg. A/B Select (0=A) |

TABLE II-continued
Exemplary Maximum Expansion Port Device Operating Conditions and Exemplary
Expansion Port Control As A Function of A anc B Register Bit Configuration

| 3 | 3 | 1 = Bypass | 3 | — | 1 = Software LED On |
|---|---|---|---|---|---|
| 4 | 4 | 1 = Bypass | 4 | — | Not Used |
| 5 | 5 | 1 = Bypass | 5 | — | Not Used |
| 6 | 6 | 1 = Bypass | 6 | — | Not Used |
| 7 | 7 | 1 = Bypass | 7 | 8 | 1 = Bypass |

Expansion Port Control

The expansion ports can be accessed two ways. One is direct decoding of the address bus by the peripheral (if capable). The second, from select line (PSEL) on each expansion port which will be automatically activated by I/O accesses after setting up the two expansion port configuration registers. This feature reduces the amount of decoding logic needed on the peripheral boards.

The expansion port configuration registers are mapped into the 80188's $PCS_6$ portion of the I/O or memory map. They can be written by accessing the addresses shown below.

| | Address |
|---|---|
| Register A | XXXXXX00 |
| Register B | XXXXXX01 |

Writing the data bit values shown in the lower part of Table II to configure expansion port register B will provide the indicated functions.

Configuration registers A and B can be read by setting up register B as shown in Table II and then reading any address mapped into $PCS_6$ of XXXXXX00. (NOTE: To get the contents of registers A and they must be enabled.) Reading the same address (XXXXXX00 is $PCS_6$ with configuration registers A and B disabled but register A selected, will return the status of the reset circuit on Bit 0. (NOTE: This is the power-up condition of register B.) If Bit 0 is a "1", then a power on reset has occurred. If Bit 0 is a "0", then a pushbutton reset has occurred.

NOTICE: Reading of this bit must be done before registers A and B are enabled. After registers A and B are enabled, the flip-flop containing the reset status will be set to a "1".

Upon power-up, all expansion port select lines are disabled. Expansion port configuration registers A and B must be programmed before the expansion ports are enabled.

Figure 14C:
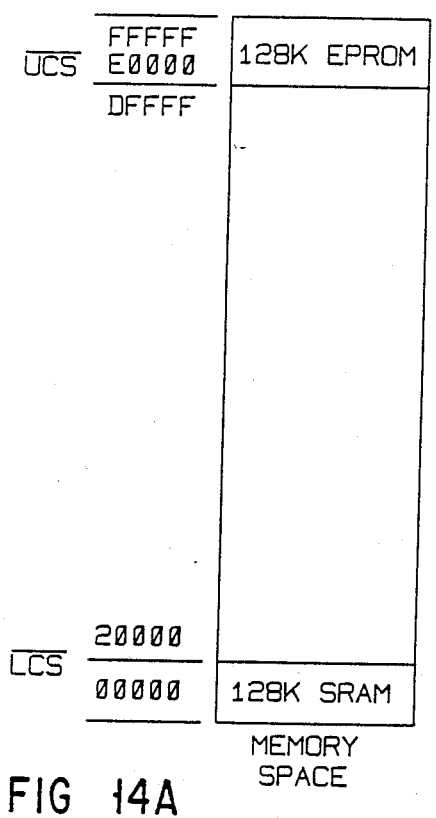

FIGS. 14A, 14B and 14C show the basic memory map and how the chip selects and port selects can be programmed to access desired components of the illustrated point of sale system.

In FIG. 16, the buffered eight megahertz SCLK clock waveform is indicated at 401 add the RDY signal is shown at 402 in properly timed relation thereto. The time interval TARYCL, the ready Active Set-Up Time required to guarantee recognition of the next clock, has a minimum value of seventy-two nanoseconds, measured at 1.5 volts, with Vcc equal to plus five volts plus or minus ten percent. The READY Inactive Set-Up Time, TARYCH, which is the minimum time interval required to guarantee recognition of the next clock, is fifty-six nanoseconds. The Intel development system I$^2$ICE is very sensitive to these timing parameters. Also there must never be any glitches in the RDY line during a T4 cycle.

Expansion Port Peripheral Requirements

These are three identification bytes which are always located at I/O (PSEL) addresses 0-3 on the peripheral card. These byte encode the class, type, version and revision level of the peripheral card. The bit assignments are shown in FIG. 17. In FIG. 17, the mark "x" indicates the presence of a logical one in a matrix such as shown in FIG. 18F, where columns "IDEN0", "IDEN1" and "IDEN2", FIG. 18F, correspond with ID Bytes 0, 1, and 2 in FIG. 17.

| | The class categories are: |
|---|---|
| Class | Description |
| 1 | Displays |
| 2 | Printers |
| 3 | Mass Storage Devices |
| 4 | Sensors |
| 5 | Masters |
| 6 | Special Devices |
| 7 | Telecommunications |
| 8 | Keyboards |
| 9 | Communications |
| A-F | Available for future development |

The selection of type, PC version, revision and reserved fields is dependent on many factors specifically related to the individual peripheral card, and need not be discussed herein.

Boards which require the us of interrupts and/or the DMA channels should adhere to the following guidelines. The interrupt circuitry for such boards may correspond with the circuitry of FIGS. 18A, 18F, 18G, 18H and 18I.

The vector priority register bit assignments are:

| Bit | Name | Description |
|---|---|---|
| 0 | Int. Priority | 00 Connect to INTA (highest Priority) |
| 1 | Int. Priority | 01 Connect to INTB |
| | | 10 Connect to INTC |
| | | 11 Connect to INTD (Lowest Priority) |
| 2 | Interrupt Enable | 0 = disable, 1 = enable |
| 3 | Not Used | |
| 4 | DMA Channel | 0 = Channel 0, 1 = Channel 1 |
| 5 | DMA Enable | 0 = Disable, 1 = Enable |
| 6 | Not Used | |
| 7 | Not Used | |

The unused bits can be assigned to other functions for the particular peripheral if needed.

Interrupts

The illustrated primary processor provides five interrupts lines which are connected to each expansion port connector. One is a non-maskable interrupt, XNMI. (XNMI is disabled to the microprocessor from an interrupt before the '188 has time to install the interrupt service routines. NMI is enabled when the expansion port registers are enabled.) The other four (INTA thru INTD) are general purpose maskable interrupts with programmable priority. These range in priority with INTA being the highest priority. Multiple peripherals can be assigned the same priority or assigned different priorities within the system by means of the interrupt priority register on the peripheral card. (Refer to previous section on peripheral requirements). If several cards are assigned the same priority, the hardware will resolve which interrupting device gets serviced should multiple interrupts occur.

Any device using these interrupt lines must respond with an interrupt vector when an IACK is issued by the '188. The interrupt vector is loaded into the vector register on the peripheral card. This direct vectoring capability gives the fastest response to interrupts in the system.

The primary processor system can also be interrupted by the power supply to indicate a power failure. This interrupt is fed into the INT2 input of the 80188. This signal comes from the power supply on the main power connector input and is independent of the expansion port interrupts.

Description of FIGS. 18A-18I and 19A-19J

Figure 19B:
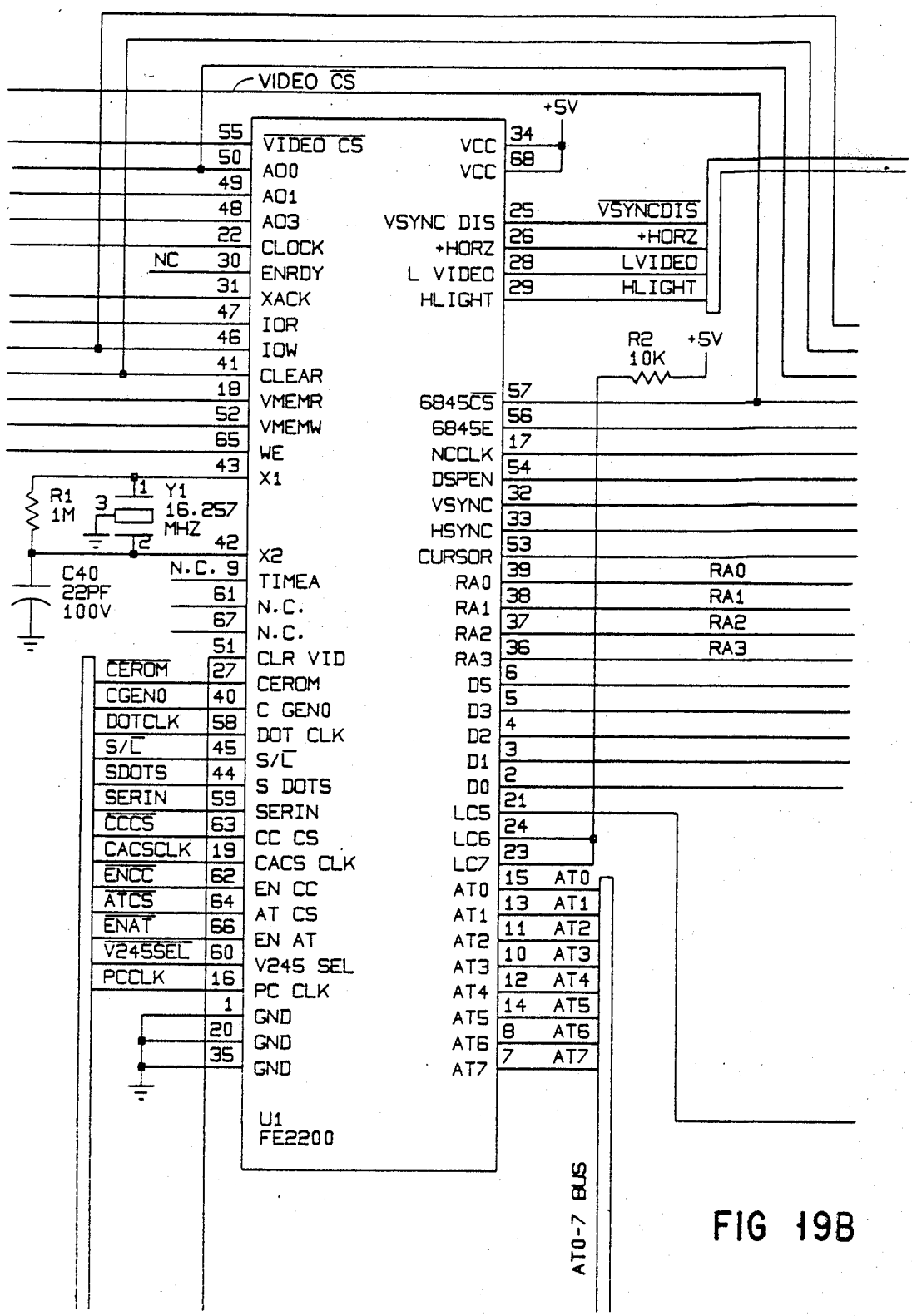
Figure 19C:
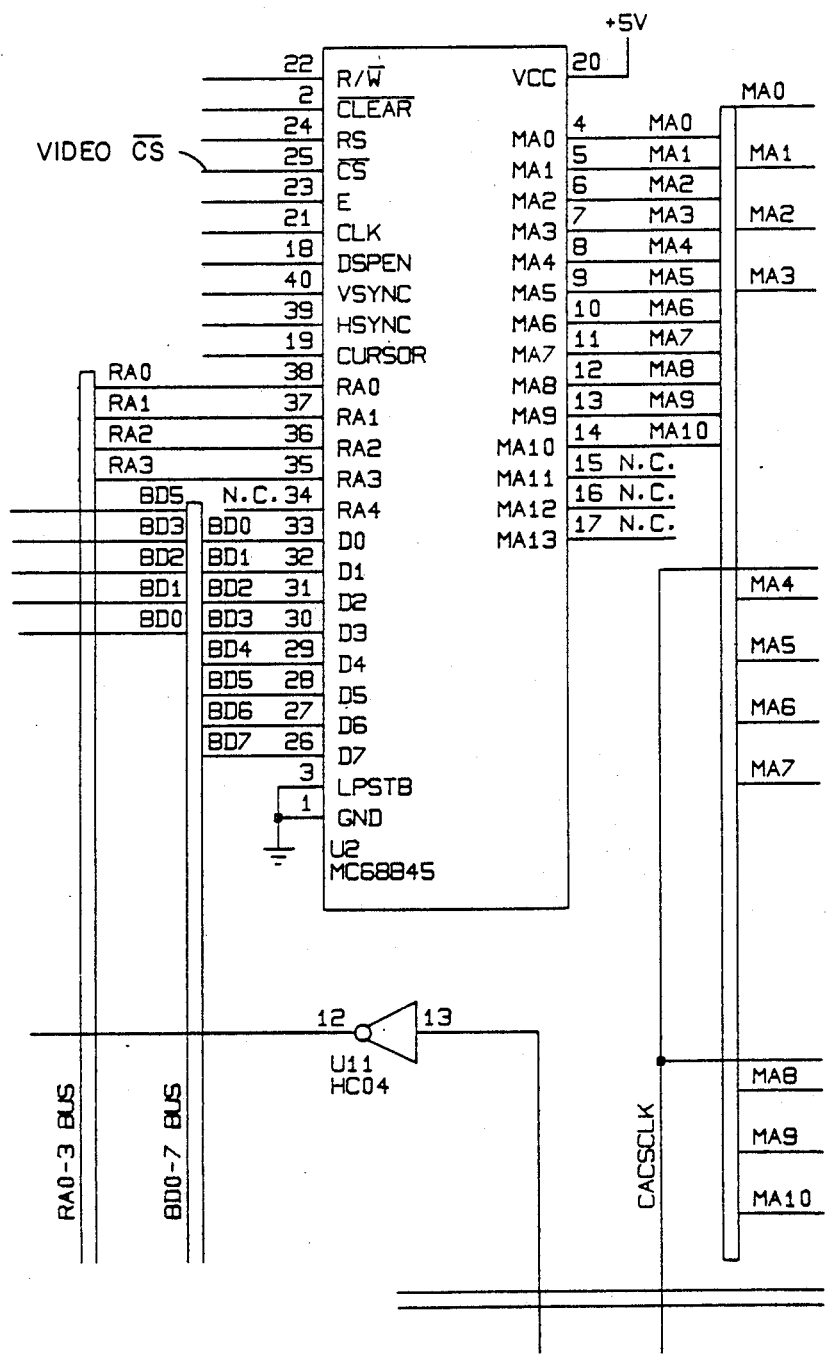
Figure 19D:
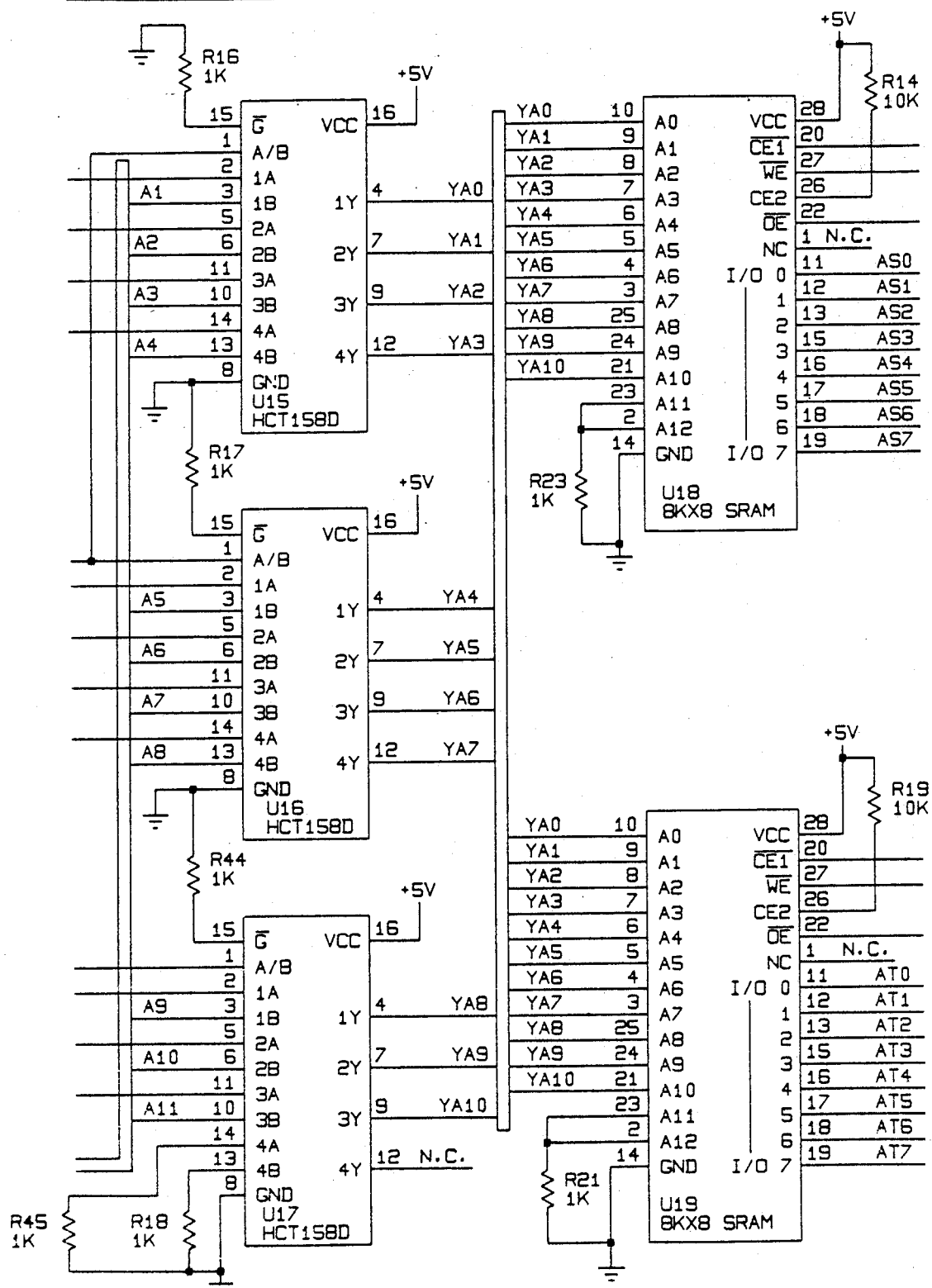
Figure 19E:
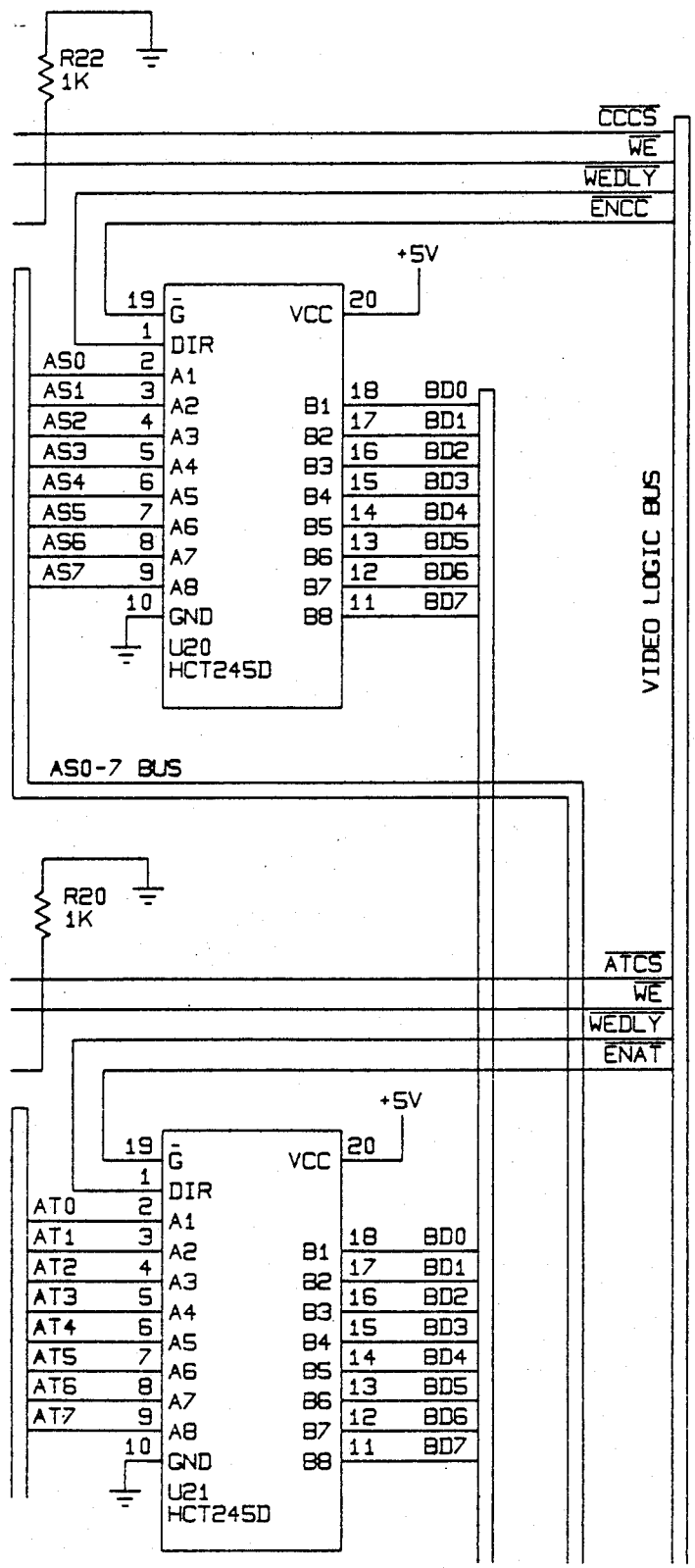
Figure 19F:
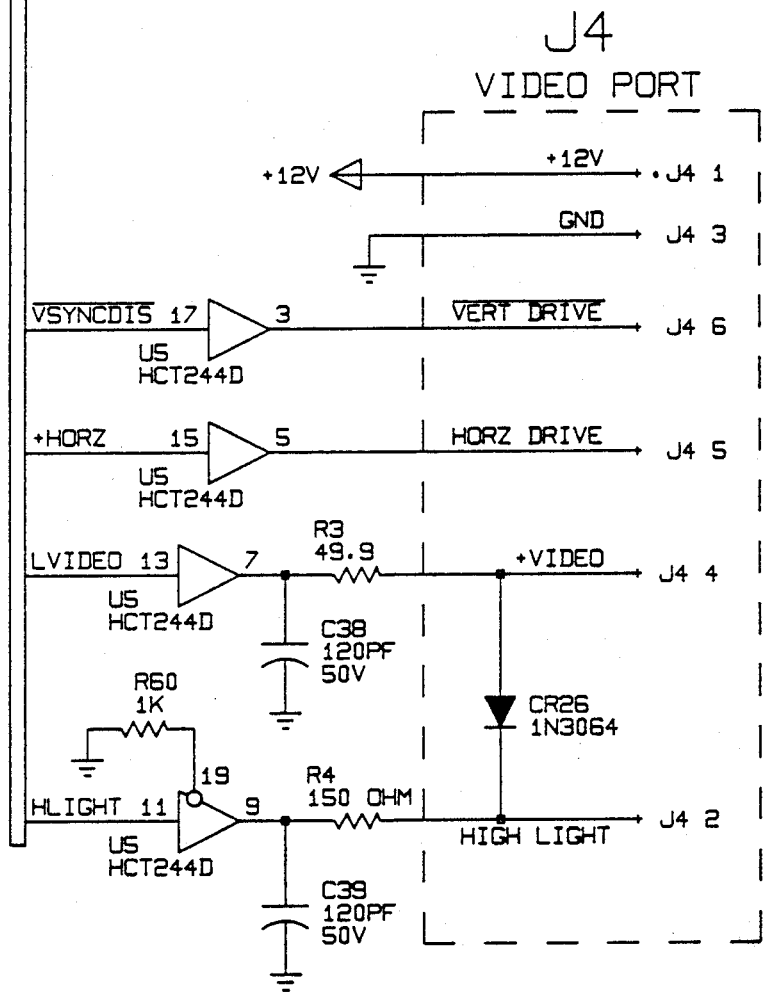
Figure 19G:
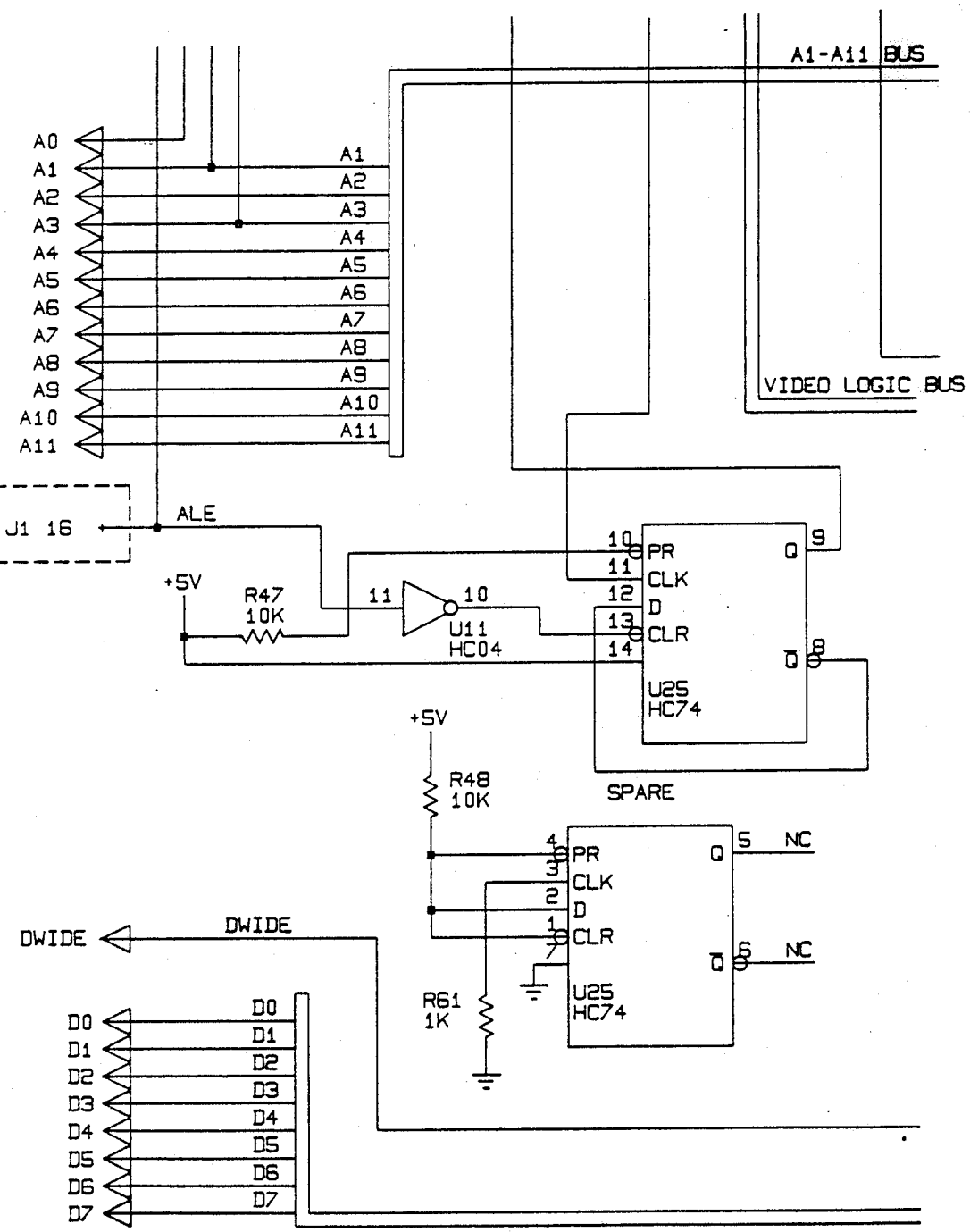
Figure 19H:
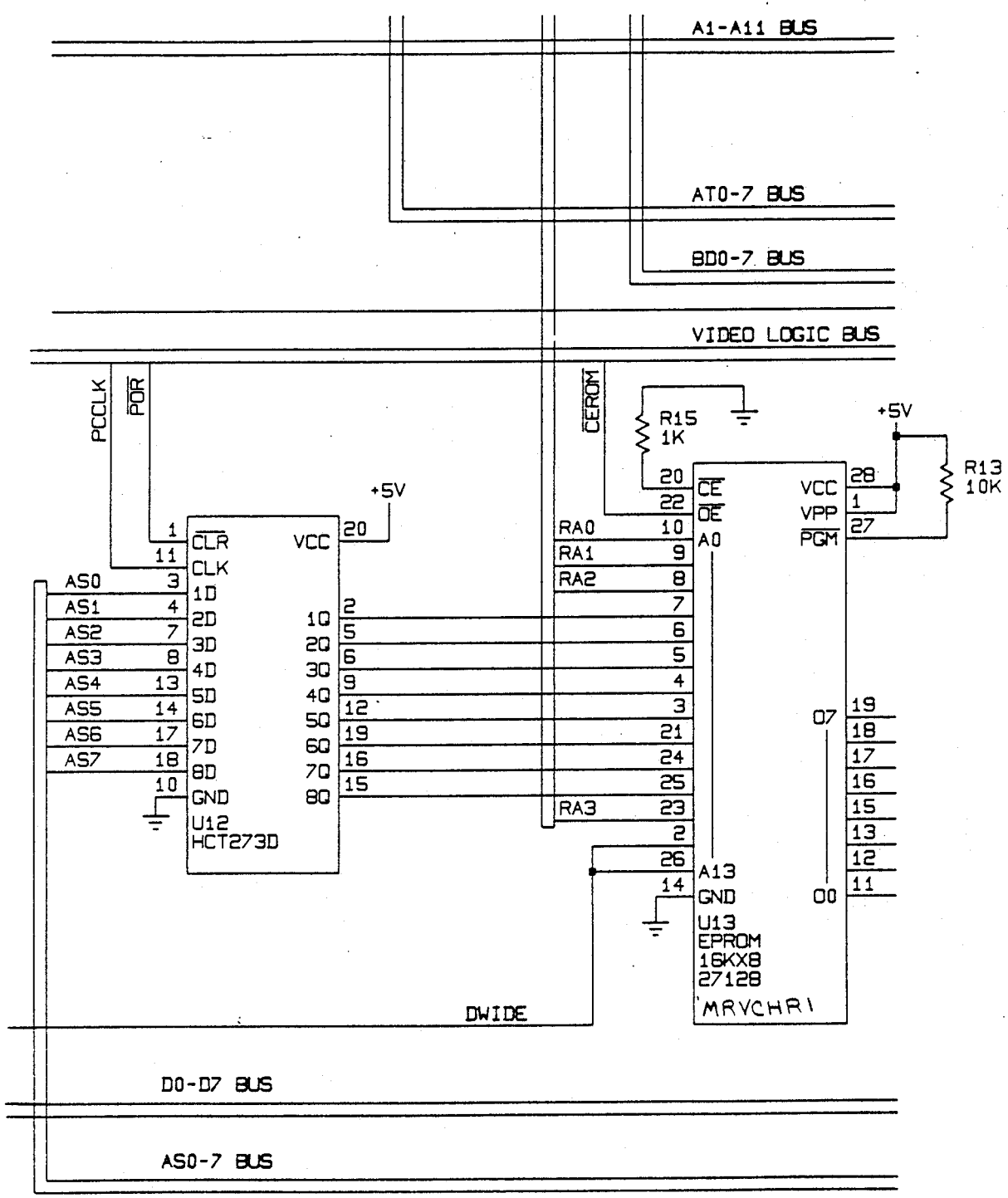
Figure 19I:
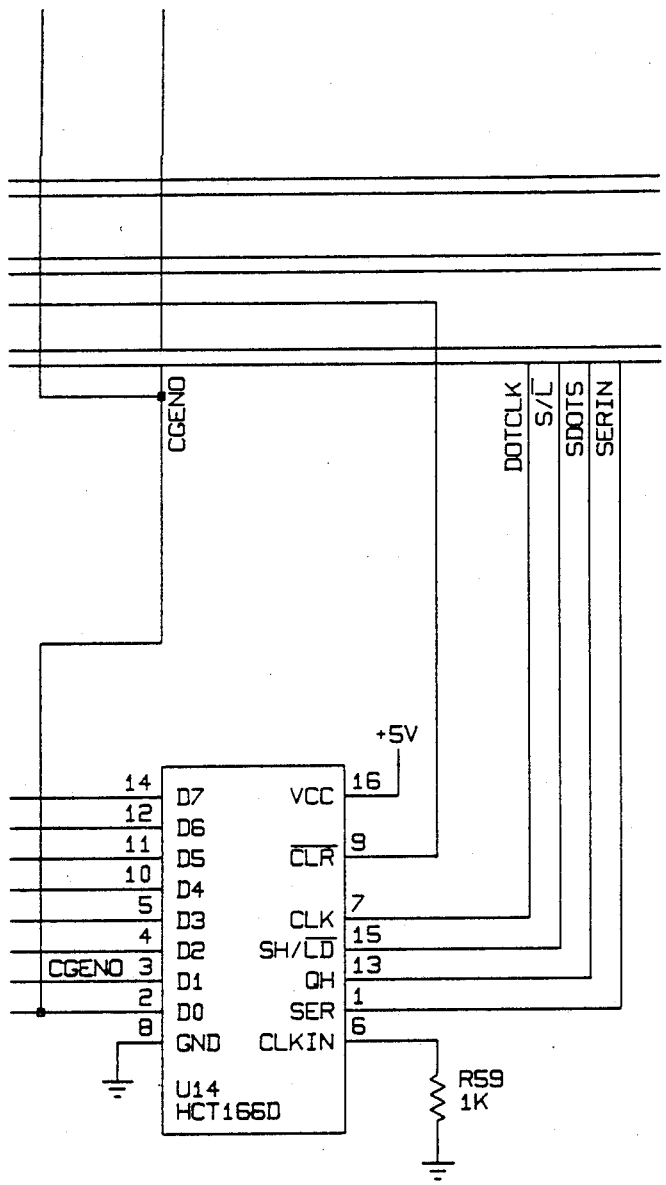

An exemplary detailed circuit for an expansion board having video, keyboard and cash drawer controller circuitry, and coupled with one of the expansion connectors such as shown in FIGS. 13A-13B, had the following parameters:

| Component | Description | (With Exemplary Type or Value) |
|---|---|---|
| FIG. 18A | | |
| U32 | Decoder, 74HC138 | |
| FIG. 18B | | |
| U3 | Interface Adapter, | CXQ1055 |
| FIG. 18C | | |
| Q1 | Transistor, | 2N7002 |
| U10 | Shift Register, | 74LS322AD |
| U9 | Quad Flip-Flop | 74HCT175 |
| U8A, U8B | Flip-Flop | 74HCT74D |
| FIG. 18D | | |
| U7, | Hex Inverter | 74HCT14 |
| FIG. 18E | | |
| U37 | Buffer Driver | 7407 |
| TZ2 | Diode | SMCG, 12.0 amperes |
| Q3 | Transistor | NPN-TIP122 |
| CR17 | Rectifier | IN4005 |
| TZ1 | Diode | SMCG, 5.0 amperes |
| FIG. 18F | | |
| U38 | Dual Demultiplexer | 74HC139 |
| CR1, CR4-CR15, CR18, CR20-CR25 | Diode | MBAL99 |
| FIG. 18G | | |
| U31 | Register | 74HC299 |
| U24 | Buffer | 74HC244D |
| U28 | Octal Flip-Flop | 74HC574 |
| FIG. 18H | | |
| U29 | Buffer | 74HC244D |
| FIG. 18I | | |
| U33 Array | Programmable Logic | PAL16L8 |
| FIG. 19A | | |
| U7 | Hex Inverter | 74HCT14 |
| U5 | Buffer | 74HCT244D |
| FIG. 19B | | |
| U1 | Display Controller | FE2200 |
| FIG. 19C | | |
| U2 | CRT Controller | MC68B45 |
| FIG. 19D | | |
| U15, U16 U17 | Quad Multiplex | 74HCT158D |
| U18, U19 | CMOS Static Ram (8K × 8) | |
| FIG. 19E | | |
| U20, U21 | Transceiver | 74HCT245D |
| FIG. 19F | | |
| U5 | Buffer | 74HCT244D |
| CR26 | Diode | IN3064 |
| FIG. 19G | | |
| U25 | Dual Flip-Flop | 74HC74 |
| FIG. 19H | | |
| U12 | Octal D Flip-Flop | 74HCT273D |
| U13 | EPROM 16K × 8 | 27128 |
| FIG. 19I | | |
| U14 | Parallel/Serial | 74HCT166D |
| FIG. 19J | | |
| U22 | Transceiver | 74HCT245 |
| U23 | Octal D Flip-Flop | 74HCT574 |

Discussion Re FIGS. 18A-18I, 19A-19J, 20 and 21

The expansion module means of FIGS. 18A-18I add 19A-19J may be considered to be functionally composed of essentially the function decoder, board identification, keyboard interface adapter, interrupt vector, interrupt latch and read buffer, PAL interrupt, data storage and retrieval, character generator, and video display circuits.

Function Decoder (U32, FIG. 18A)

The function decoder circuit involves the U32 address select integrated circuit along with the associated inputs and outputs. Any one of Y0 through Y4 can provide an enabling output depending on the occurrence of PSEL and the appropriate input on the A4 through A6 address lines. When Y1 is made active, it provides an enable for the keyboard interface circuit. Y2 is the enable for the VIDEO CS (video select) signal output. Y3 provides the enable for the interrupt vector storage circuit. And the last output, Y4 provides the enable for the read or write signal to the U28 data latch and to the U29 data buffer. FIG. 21 shows the address boundaries for these functions.

Board Identification (U38 and CR1-CR8, CR9-CR16, and C118-CR25, FIG. 18F; and U24, FIG. 18G)

Lines 430, 432 and 433 show exemplary interconnections between FIG. 18A and 18F.

Functionally, the U24 buffer is enabled by the 1G and 2G inputs. The buffer outputs data whenever it is enabled by the 1G and 2G inputs. The buffer outputs the IDEN0 diode field, then the IDEN1 field, and then the IDEN2 field. This selection is determined by the RD (read) and A0 and A1 (address) signals. The Y0 output from U32 provides the enabling for the board identification circuit. The identity diode fields have some diodes loaded and some no loaded. If a diode is loaded, a logic 0 will be read in its bit position on the data bus. The diodes are loaded to encode information (in the factory) as to the board type, class and revision status.

Keyboard Interface (U3, FIG. 18B; U8A, U8B, U9, U10, FIG. 18C)

Line 440 shows the keyboard interface enable line from Y1 of U32, FIG. 18A, to U3, FIG. 18B.

The keyboard interface circuit involves the U3 peripheral interface adapter, U10 shift register, D-type flip-flop U9, dual D-type flip-flop U8, the J2 keyboard connector, and the related circuitry.

The U3 peripheral interface adapter has three I/O interface ports and a data input/output port. Provided the keyboard interface circuit is enabled by the Y1 input from the U32 address select IC, the appropriate A0 and A1 address input occurs, and either the WR or RD signal occur, data can be placed on or taken from the data bus. Port 0 can receive from or send data to the U10 shift register. The P17 output provides an enable for the DE U10 input. The same output is inverted by the U11 inverter to provide the CLR (clear) input to both U10 and to the U8A D-type flip-flop. The P16 output becomes the KB CLK (clock signal for the keyboard). That signal is also applied to the D1 input of U9.

When enabled by the DE input, the U10 shift register IC can accept serial data from the keyboard on the KB DATA signal input and shift it out to the U3 interface adapter in parallel. Clocking for U10 is derived from the SCLK (system clock) signal. SCLK is applied to the CLK Input of U8B. U8B is a D-type flip-flop that performs the divide by two function. Its Q output is at 4 MHz. This then becomes the CLK input to U9 to provide another division by two. The U9 1Q output is then at 2 MHz and is applied to both the U10 and U8A CLK inputs. When the U8A Q output occurs it is applied to the G input of U10 and as an enable for the interrupt circuit.

Port 2 provides inputs/outputs for connection to both the cash drawer and keyboard. The P21 is the CLK2 output. P20 is the DATA2 output. P22 and P27 are connections to the cash drawer. The U3 IC is RESET when the PR signal occurs.

Interrupt

The interrupt circuit is described in the following sections (a), (b) and (c).

(a) Interrupt Vector (U30A, U30C, U26, FIG. 18F; U31, IIG. 18G)

Line 450 conducts the enable output signal from Y3 of U32, FIG. 18A, to gate U30A and U30C of FIG. 18F.

U31 is a bidirectional shift register. It is used here to hold the interrupt vector. Whenever the board is powered up, U31 is reset by the POR (power on reset) signal. When the Y3 output from the U32 function decoder and the WR signal occur, the interrupt vector data is taken from the data bus and stored in the U31 register. This information is then available to the data bus any time the Y3 enable and the RD signal occur. The interrupt vector stored in the U31 register can also be made available to the data bus by the occurrence of the interrupt acknowledge signal from the U33 PAL.

(b) Interrupt Latch and Read Buffer (U27A, U27B, U28, FIG. 18G; U99, FIG. 18H)

Line 460 designates the line from output Y4 of function decoder U32, FIG. 18A, to gates U27A and U27B, FIG. 18G. With the occurrence of the Y4 enable from the U32 function decoder and the WR signal, the U28 latch is enabled to accept data from the data bus. When it does, the data is latched and held at the U28 Q0 through Q7 outputs. With the occurrence of the Y4 and the RD signal, the U29 read buffer is enabled to take data from U28 and place it on the data bus. The IA0 through IA2 outputs from U28 provide interrupt information for the input to the U33 PAL interrupt control circuit, FIG. 18I.

(c) PAL Interrupt Control (U33, FIG. 18I)

The IA0 through IA2 outputs from the U28 interrupt latch, FIG. 18G, are applied to the U33 PAL and establish the conditions of program interrupt. The U33 outputs are the result of the PAL programming and its input signals. The interrupt level enable outputs are EA through ED, with EA having the highest priority and ED the lowest. When the interrupt from the U8A receiving keyboard circuit occurs, FIG. 18C, the appropriate U34 NAND gate, FIG. 18I, will be enabled and the interrupt will be gated back to the U33 input and of the board as the INTA, INTB, INTC or INTD outputs. When the U33 INTAX output occurs at line 191, it is applied to the U26 AND gate (FIG. 18F) as the interrupt acknowledge signal.

During the initial system power-up, the main processor writes the desired interrupt vector into U31 (FIG. 18G). It also writes data into the U29 latch (FIG. 18H) that assigns the board interrupt level according to Table III below. After that, whenever a key is available for decoding the board generates an interrupt to he processor on its assigned interrupt level. The processor responds with an IACK (interrupt acknowledge) and the interrupt vector is placed on the data bus. The CPU uses the vector to determine which interrupt service routine (program) it is to use to get the keycode information.

TABLE III

Board Interrupt Level Assignment

| Bit | Name | Description |
| --- | --- | --- |
| 0 | INT. PRIORITY 0 | 00 Connect to INTA (Highest Priority) |
| 1 | INT. PRIORITY 1 | 01 Connect to INTB |
|   |   | 10 Connect to INTC |
|   |   | 11 Connect to INTD (Lowest Priority) |
| 2 | Interrupt Enable | 0 = disable, 1 = enable |
| 3 | Not Used |   |
| 4 | DMA Channel | Not used on CRT |
| 5 | DMA Enable | Not used on CRT |
| 6 | DMA Priority | Not used on CRT |
| 7 | Double Wide | 0 = normal characters |
|   |   | 1 = double wide |

Cash Drawer (Q3 and J3, FIG. 18E)

The cash drawer circuitry associated with transistor Q3 provides control for energizing the cash drawer latching solenoid. Pin 4 of board connector J3 connects to the +12 volt DC supply. When Q3 is biased on by the output from the U3 (FIG. 18B) peripheral interface adapter IC, pin 3 of J3 is grounded and completes the circuit to energize the cash drawer solenoid and allow the drawer to open. When Q3 is biased off, the solenoid is not energized and the drawer is held closed. Diode CR17 is connected across the solenoid to provide an inductive discharge path. Zener TZ2 along with capacitor C53 provides transient protection. Pins 1 and 2 of connector J3 also connect to the cash drawer. With tee drawer closed, pin 1 is grounded by the ground on pin 2 through contacts at the cash drawer. With the drawer open, pin 1 is not grounded and is pulled to the +5 volt supply by resistor R10. The resulting voltage level at the junction of capacitor C57 and resistor R9 is then available to U3 via line 470, FIGS. 18E, FIG. 18C and FIG. 18B, to indicate the condition (open or closed) of the cash drawer.

Video Display (FIGS. 19A-19J)

The video select line from the Y2 output of U32, FIG. 18A is designated 480 in FIGS. 18A, 18B, 18C, 18D nd FIG. 19A for aid in correlating these figures.

The circuits involving video display on the video interface board for convenience may be divided into the data storage and retrieval and character generator circuits, and are discussed in parts (a) and (b) below.

(a) Data Storage and Retrieval (U1, FIG. 19B; U2, FIG. 19C; U15-U19, FIG. 19D; U20-U21, FIG. 19E; U22, U23, FIG. 19J)

The U1 glue logic and U2 CRT controller perform the majority of the tasks involved in controlling the storing, accessing and retrieving of information to be displayed. They also work together to create the appropriate timing signals to control the "painting" of data on the CRT phosphor.

U1 controls the "arbitration" of access into the U18 and U19 RAMs. The main CPU (FIG. 11A) accesses the RAM to store the codes of the information to be displayed. The U2 CRT controller also accesses RAM so that the stored character codes can be obtained for video display. This video RAM is physically located in the memory map of the primary processor (FIG. 14A) from address $DF000_H$ through $DFFFF_H$. When the processor wants to store information in video RAM it outputs the appropriate address on the $A_0$-$A_{19}$ data bus. U36 decodes address lies $A_{12}$-$A_{19}$ and the VRAM signal goes low (only if it is between DF000 and $DFFFF_H$). U1 determines if the CPU can access the RAM at this time. If not, the RDY (ready) line to the CPU is pulled low. This suspends operation of the CPU until access to the RAM can be accomplished.

NOTE:
CPU access is restricted so that "snow" will not be observed on the video display. Stopping the CPU operation is not as bad as it sounds. U1 will give the CPU access as soon as the current video character is displayed. At most six wait states (859 ns) are inserted into the CPU access.

When CPU accessing can proceed, U1 pulls the CACSCLK line low and pulls the RDY line high. While the CACSCLK line is low the CPU address lines $A_1$-$A_{11}$ are output on the YA0 trhough YA10 bus. When high, the $MA_0$-$MA_{10}$ lines are output. U1 then enables the U20, U21, and U22 buffers as appropriate to allow data into the RAMs. When the U15 through U17 multiplexors are appropriately enabled, either the A1 through A11 address, or the MA through MA10 input addresses are made available to both the U18 and U19 RAM. Each of the RAMs have 2048 addressable locations. Each addressable location correlates with a location on the terminal video display. RAM U18 is used to store character selections; U19 to store attribute selections. And so, after the address location has been selected, data on the D0 through D7 data bus is available to the U22 buffer. This data is output from the U22 buffer on the BD0 through BD7 data bus and made available to either the U20 character buffer of the U21 attribute buffer (depending whether the data is character or attribute). If the data is a character, the U20 buffer outputs data on the AS0 through AS7 data bus and makes it available to the selected address location in the U18 character RAM. If the data is an attribute, the U21 attribute buffer outputs data on the AT0 through AT7 data bus to the U19 attribute RAM. The addressing of video characters by the CPU is set up so that character data is accessed at even addresses; attributes are accessed at odd addresses. U1 controls which RAM data is stored. This is based on A0. If character data is being accessed, U18, U20, and U22 are enabled. If attribute data is accessed, U19, U21, and U22 are enabled. The character data stored in the U18 RMM is in the form of an ASCII character code.

The U2 CRT controller also selects HEX address locations in the U18 and U19 RAMs. To make these selections, U2 outputs an address location on the MA through MA10 address bus to the U15 through U17 multiplexers inputs. The address is output from the multiplexers on the YA0 through YA10 address bus and applied to the U18 and U19 RAMs in the same way as an address originating on the A2 through A11 address bus. When the U2 CRT controller outputs an address, it makes the access for the purpose of showing a character/attribute on the terminal video display at the particular selected address. The character at that location gets put on the AS0 through AS7 address bus and sent to the U12 latch. The attribute at that location gets put on the AT0 through AT7 address bus and sent to the U1 glue logic device.

Note that when the CRT controller is accessing video memory, both character data and attribute data are output from the RAMs at the same time.

Character Generator (U1, FIG. 19B; U2, FIG. 19C; U12, U13, FIG. 19H; U14, FIG. 19I)

The character generator circuit is considered to include the U12 latch, U13 character generator, U14 shift register, and the associated buses and connections. The U13 character generator is a ROM that contains the dot codes for any characters that will be displayed. Each character is formed within an 8 by 14 (112 dots) dot pattern. The top row of the character block (defined as R0) and the bottom four rows (defined as R12 through R13) are all zeros. The right column (defined as C0) is all zeros. Thus the character is defined by a box bounded by R1 to R11 and C0 to C6. The input to this circuit is an ASCII character output from the U18 RAM as a result of a U2 CRT controller having selected a particular address in RAM on its MA0 through MA10 address lines. The ASCII output from the U18 RAM is applied to the AS0 through AS7 bus and applied to the U12 latch where it is held until changed by some succeeding input. When enabled, the ASCII character held by U12 is made available to the U13 character generator from its Q outputs. The ASD0 through ASD7 data bus input from the character RAM and U12 latch is an address that selects 1 of the characters held in ROM. The ASCII character applied to the U13 character generator selects the appropriate dot pattern of the selected character. (The ASCII character actually "addresses" the dot pattern for itself in U13, along with the $RA_0$-$RA_3$ address inputs.) $RA_0$ through $RA_3$ are output by the U2 CRT controller to access the particular dot row of the character being displayed. $RA_0$ through $RA_3$ are synchronized to be valid at the same time the U12 outputs are valid. The first row of the selected character data pattern is loaded from the ROM into shift register U14. When the S/L signal goes low the shift register is enabled. The DOTCLK signal then shifts the dot pattern out though U1 to the terminal video display. U1 will modify the dot pattern according to the attribute code on the $AT_0$ through $AT_7$ bus. Data shifts start with column C7 and continue to C0. In order to have enough space between characters, C0 (CGEN0, character generator bit 0) is applied to U1 and is repeated to create a 9th bit for the character cell. (Note: Because bit 0 is repeated, it must be a zero in the character ROM. Otherwise, characters will "run together". The exception is when double wide characters are accessed. Here we want the left half of the character and the right half of the character to meet.)

Fuses (FIGS. 19A-19J)

The two fuses on this board are required to meet U.L. (Underwriters Laboratories) guidelines for energy limited circuits. A DC energy limited circuit must be fused for current capability exceeding eight amperes. (Note: The power supply will supply over eleven amperes on both the 5V and 12V outputs.) Since neither the cash drawer nor keyboard require over two amperes to operate, they are fused for two amperes.

Keyboard Block Diagram, FIG. 20

A keyboard matrix control board provides key sensing from the membrane keypad and reception of data and transmission of the keystrokes to keyboard connector J2, FIG. 18E, FIG. 20 is provided as an aid to understanding the following circuit descriptions.

This circuit provides for operation of an 8 row ×16 column keyboard to form a keyboard matrix of 128 contact closure points. The keyboard control circuit scans the keyboard looking for a key closure When one is found, a coding of the closure is stored in keyboard microprocessor 500 and made available serially for the main microprocessor in the terminal 50, FIG. 5 et seq.

In operation, the keyboard microprocessor 500 provides the (P20 through P23 and PROG) outputs to the port expander 501. These inputs control the column scanning (COL0 through COL15) of the 16 column output lines to the keyboard. Each row of the keyboard has a row line (ROW0 thru ROW7). The column scanning provides a ground to the column line. The ground occurs in a time interval shorter than it is possible to release the key. When a key is pressed, a ground returns on the row line. The keyboard microprocessor 500 correlates the row with the column of the key pressed and stores a coding of the key in its output register. Periodically, the main microprocessor (FIG. 11A) enables the keyboard microprocessor to output the stored key coding serially for transfer.

It will be apparent that many modifications and variations may be effected without departing from the scope of the teachings and concepts of the present disclosure.

WE CLAIM AS OUR INVENTION:

1. In a point of sale system,
 a point of sale terminal having input/output means comprised of the following:
 data input means accommodating input of data by an operator concerning point of sale transactions,
 coded data input means accommodating input of machine readable data concerning point of sale transactions,
 on-line display means for displaying point of sale transaction information, and
 hard copy output means for outputting data in human readable form concerning point of sale transactions,
 said point of sale terminal further comprising:
 primary processing module means operable for interacting wit the aforesaid input/output means in the processing of point of sale transactions,
 said primary processing module means having a series of expansion connector means each having data bus, address bus, and control bus connection means coupled with said primary processing module means and providing for the coupling of data, address and control signals with peripheral devices, and
 peripheral expansion module means detachably engaged with said expansion connector means for data processing interaction with said primary processing module means in connection with point of sale transactions.

2. In a point of sale system according to claim 1,
 each of said expansion connector means having address bus connection means for at least about thirty-two address lines,
 said peripheral expansion module means having function decoder means coupled with only a few of said address lines, and operable for selectively addressing at least one of said input/output means.

3. In a point of sale system according to claim 1, each of said peripheral expansion module means having individual identification circuit means for uniquely identifying its functional constituents, such that any of a plurality of different peripheral expansion module means with respective different functional constituents can be placed at any one of a plurality of said series of expansion connector means and then automatically identified by the primary processing module means via the respective individual identification circuit means.

4. In a point of sale system according to claim 3,
 each of said expansion connector means having address bus connection means for at least about sixteen address lines,
 said peripheral expansion module means having function decoder means coupled with only a few of said address lines, and operable for selectively addressing each of said series of expansion connector means, so as to sequentially examine the same for the identity of associated peripheral expansion module means.

5. In a point of sale system according to claim 1,
 each of said expansion connector means having address bus connection means for at least about sixteen address lines,
 said peripheral expansion module means having function decoder means coupled with only a few of said address lines, and operable for selectively addressing each of said series of expansion connector means, so as to sequentially examine the same for the identity of associated peripheral expansion module means.

* * * * *